(12) United States Patent
Gosset et al.

(10) Patent No.: US 12,293,368 B2
(45) Date of Patent: May 6, 2025

(54) SYSTEMS AND METHODS FOR AUTHENTICATING ONLINE USERS AND PROVIDING GRAPHIC VISUALIZATIONS OF AN AUTHENTICATION PROCESS

(71) Applicant: MASTERCARD INTERNATIONAL INCORPORATED, Purchase, NY (US)

(72) Inventors: Julia Sharon Gosset, Tarrytown, NY (US); Warda Zahid Khan, Yorktown Heights, NY (US); Felix Johannes Flory, Wildwood, MO (US); Adam Kenneth Hosp, Lake St. Louis, MO (US); Chengxi Li, Chesterfield, MO (US); Christopher John Merz, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 66 days.

(21) Appl. No.: 17/567,015

(22) Filed: Dec. 31, 2021

(65) Prior Publication Data

US 2022/0122087 A1 Apr. 21, 2022

Related U.S. Application Data

(63) Continuation-in-part of application No. 16/448,822, filed on Jun. 21, 2019, and a continuation-in-part of
(Continued)

(51) Int. Cl.
*G06Q 20/40* (2012.01)
*G06F 9/54* (2006.01)
(Continued)

(52) U.S. Cl.
CPC ......... *G06Q 20/4016* (2013.01); *G06F 9/543* (2013.01); *G06Q 20/027* (2013.01);
(Continued)

(58) Field of Classification Search
None
See application file for complete search history.

(56) References Cited

U.S. PATENT DOCUMENTS

| 7,290,288 B2 | 10/2007 | Gregg et al. |
| 7,314,167 B1 | 1/2008 | Kiliccote |

(Continued)

FOREIGN PATENT DOCUMENTS

| AU | 2005266964 B2 | 2/2011 |
| CN | 1407426 A | 4/2003 |

(Continued)

OTHER PUBLICATIONS

EP Search Report in EP Application No. 19182075.2, dated Oct. 18, 2019. 11 pages.
(Continued)

*Primary Examiner* — Christine M Behncke
*Assistant Examiner* — Henry H Jung
(74) *Attorney, Agent, or Firm* — Armstrong Teasdale LLP

(57) ABSTRACT

A computer-implemented method for authenticating an online user includes steps including receiving, from a requestor server in communication with a merchant website, an authentication request message including authentication data collected from a user computing device during an online interaction with the merchant website. The steps also include extracting the authentication data from the authentication request message, and applying a risk-based authentication (RBA) engine to the authentication data to obtain RBA result data including a reason code that includes no more than three bytes of data. The steps further include causing the reason code to be embedded in an authorization request message generated during the online interaction and routed to a decisioning server via a payment network. The authorization request message is formatted according to a set
(Continued)

of proprietary communications standards promulgated by the payment network for exchange of data between institutions that are members of the payment network.

14 Claims, 19 Drawing Sheets

Related U.S. Application Data application No. 16/448,596, filed on Jun. 21, 2019, and a continuation-in-part of application No. 16/448,884, filed on Jun. 21, 2019, and a continuation-in-part of application No. 16/448,572, filed on Jun. 21, 2019, now Pat. No. 11,875,349.

(60) Provisional application No. 62/688,532, filed on Jun. 22, 2018, provisional application No. 62/688,546, filed on Jun. 22, 2018, provisional application No. 62/688,529, filed on Jun. 22, 2018, provisional application No. 62/688,528, filed on Jun. 22, 2018.

(51) Int. Cl.
*G06Q 20/02* (2012.01)
*H04L 9/40* (2022.01)

(52) U.S. Cl.
CPC ............ *H04L 63/08* (2013.01); *H04L 63/101* (2013.01); *H04L 63/1425* (2013.01)

(56) References Cited

U.S. PATENT DOCUMENTS

| | | | |
|---|---|---|---|
| 7,614,078 B1 | 11/2009 | Stieglitz | |
| 7,913,300 B1 | 3/2011 | Flank et al. | |
| 8,020,763 B1 | 9/2011 | Kowalchyk et al. | |
| 8,150,762 B1* | 4/2012 | Reed | G06Q 40/03 705/38 |
| 8,170,953 B1 | 5/2012 | Tullis et al. | |
| 8,256,664 B1 | 9/2012 | Balfanz et al. | |
| 8,271,395 B2 | 9/2012 | Dominguez et al. | |
| 8,423,466 B2 | 4/2013 | Lanc | |
| 9,160,742 B1 | 10/2015 | Ackerman | |
| 9,330,416 B1 | 5/2016 | Zaslavsky et al. | |
| 9,390,445 B2 | 7/2016 | Sheets et al. | |
| 9,779,236 B2 | 10/2017 | Abrams | |
| 10,366,378 B1 | 7/2019 | Han et al. | |
| 10,515,366 B1 | 12/2019 | Gorelik | |
| 10,614,452 B2 | 4/2020 | Tomasofsky et al. | |
| 10,867,303 B1 | 12/2020 | Manapat et al. | |
| 2002/0194138 A1 | 12/2002 | Dominguez et al. | |
| 2004/0054622 A1 | 3/2004 | Strayer et al. | |
| 2004/0199456 A1* | 10/2004 | Flint | G06Q 30/02 705/38 |
| 2004/0199462 A1 | 10/2004 | Starrs | |
| 2004/0249767 A1* | 12/2004 | Perrin | G06Q 20/24 705/64 |
| 2005/0097320 A1 | 5/2005 | Golan et al. | |
| 2006/0179007 A1 | 8/2006 | Davis | |
| 2006/0277185 A1 | 12/2006 | Sato et al. | |
| 2008/0034092 A1 | 2/2008 | Kikuchi et al. | |
| 2008/0288299 A1 | 11/2008 | Schultz | |
| 2009/0144213 A1 | 6/2009 | Patil | |
| 2010/0057622 A1* | 3/2010 | Faith | G06Q 20/3829 705/38 |
| 2010/0114776 A1 | 5/2010 | Weller et al. | |
| 2011/0023857 A1 | 2/2011 | Grace | |
| 2011/0196791 A1 | 8/2011 | Dominguez | |
| 2011/0218879 A1 | 9/2011 | Roche et al. | |
| 2011/0270756 A1 | 11/2011 | Tullis et al. | |
| 2012/0101930 A1* | 4/2012 | Li | G06Q 40/00 705/35 |
| 2012/0144461 A1* | 6/2012 | Rathbun | G06Q 20/4014 726/5 |
| 2012/0197802 A1* | 8/2012 | Smith | G06Q 20/4016 705/44 |
| 2013/0197998 A1 | 8/2013 | Buhrmann et al. | |
| 2013/0218769 A1* | 8/2013 | Pourfallah | G06Q 20/325 705/44 |
| 2014/0279477 A1 | 9/2014 | Sheets et al. | |
| 2015/0019410 A1 | 1/2015 | Canis | |
| 2015/0120560 A1 | 4/2015 | Fisher et al. | |
| 2015/0161608 A1 | 6/2015 | Gilbert et al. | |
| 2015/0206146 A1* | 7/2015 | Siddens | G06Q 40/12 705/30 |
| 2015/0269578 A1 | 9/2015 | Subramanian et al. | |
| 2015/0269579 A1 | 9/2015 | Subramanian et al. | |
| 2015/0339477 A1 | 11/2015 | Abrams et al. | |
| 2015/0379515 A1 | 12/2015 | Hammad et al. | |
| 2016/0034900 A1 | 2/2016 | Nelsen et al. | |
| 2016/0042354 A1 | 2/2016 | Canis et al. | |
| 2016/0078436 A1 | 3/2016 | Tomasofsky et al. | |
| 2016/0078443 A1 | 3/2016 | Tomasofsky et al. | |
| 2016/0078444 A1 | 3/2016 | Tomasofsky et al. | |
| 2016/0104163 A1 | 4/2016 | Aquino et al. | |
| 2016/0140558 A1 | 5/2016 | Groarke et al. | |
| 2016/0203490 A1 | 7/2016 | Gupta et al. | |
| 2016/0210633 A1 | 7/2016 | Epelman et al. | |
| 2016/0239771 A1 | 8/2016 | Gukal et al. | |
| 2016/0260100 A1 | 9/2016 | Wiesman | |
| 2016/0364728 A1* | 12/2016 | DeLawter | G06F 21/6218 |
| 2016/0379216 A1* | 12/2016 | Wang | G06Q 20/407 705/44 |
| 2017/0046701 A1 | 2/2017 | Hey et al. | |
| 2017/0076288 A1* | 3/2017 | Awasthi | G06Q 20/3821 |
| 2017/0109752 A1 | 4/2017 | Hubbard et al. | |
| 2017/0228635 A1 | 8/2017 | Diev et al. | |
| 2017/0344964 A1* | 11/2017 | Garlick | G06Q 20/108 |
| 2017/0357957 A1 | 12/2017 | Mehta et al. | |
| 2018/0089665 A1 | 3/2018 | Wright | |
| 2018/0108012 A1 | 4/2018 | Kohli | |
| 2018/0232694 A1 | 8/2018 | Boding et al. | |
| 2018/0374152 A1 | 12/2018 | Dominguez | |
| 2019/0188715 A1 | 6/2019 | Hey et al. | |
| 2019/0392440 A1 | 12/2019 | Ederle et al. | |
| 2019/0392448 A1 | 12/2019 | Gosset et al. | |
| 2019/0392449 A1 | 12/2019 | Gosset et al. | |
| 2019/0392450 A1 | 12/2019 | Gosset et al. | |
| 2021/0090074 A1 | 3/2021 | Powell et al. | |
| 2022/0122087 A1 | 4/2022 | Gosset | |

FOREIGN PATENT DOCUMENTS

| | | |
|---|---|---|
| CN | 105814592 A | 7/2016 |
| CN | 106575400 A | 4/2017 |
| CN | 107533705 A | 1/2018 |
| CN | 108140190 A | 6/2018 |
| JP | 2017021816 A | 1/2017 |
| WO | 2005004026 A1 | 1/2005 |
| WO | 2017035460 A1 | 3/2017 |

OTHER PUBLICATIONS

IN First Examination Report; App. No. 201914024764, Jun. 10, 2021; 7 pages.
IN First Examination Report; App. No. 201914024865, Mar. 23, 2021; 5 pages.
IN First Examination Report; App. No. 201914024867, Feb. 24, 2021; 5 pages.
China First Office Action, Application No. 201910548590.4, dated Sep. 30, 2022, 29 pps.: with English translation.
China First Office Action, Application No. 201910549310.1, dated Sep. 30, 2022, 20 pps.: with English translation.
China First Office Action, Application No. 201910548622.0, dated Sep. 28, 2022, 16 pps.: with English translation.
China First Office Action, Application No. 201910548602.3, dated Sep. 30, 2022, 23 pps.: with English translation.
China Second Office Action, Application No. 201910548622.0, dated Jan. 18, 2023, 9 pps.: with English translation.
China Second Office Action, Application No. 201910549310.1, dated Apr. 22, 2023, 19 pps.: with English translation.

(56) References Cited

OTHER PUBLICATIONS

Huang Xuan, "Research on Mobile Security and Smart Systems: Fuzzy Logic and Identity Recognition", Xidian University Press, May 31, 2016, pp. 29-31.: with English Abstract.
PCT Search Report for Appl. No. PCT/US2022/052201 dated Apr. 13, 2023, 11 pgs.
CA Viewpoint, "Summary of 3D Secure 2.0 and How CA Can Help", CA Technologies, 2016, 3 pages.
"Frictionless Authentication with 3D Secure 2", 3DSecure2, The Wayback Machine dated Apr. 23, 2018, https://3dsecure2.com/frictionless-flow/, 2018, 6 pages.
China Second Office Action, Application No. 201910548602.3, dated Apr. 29, 2023, 37 pps.: with English translation.
China Rejection Decision, Application No. 201910549310.1, dated Aug. 5, 2023, 19 pps.: with English translation.
Yao Qian, "A Glimpse of Digital Money", China Finance Publishing House, May 31, 2018, 6 pps.: with English Abstract.

\* cited by examiner

SYSTEMS AND METHODS FOR AUTHENTICATING ONLINE USERS AND PROVIDING GRAPHIC VISUALIZATIONS OF AN AUTHENTICATION PROCESS

CROSS REFERENCE TO RELATED APPLICATIONS

This application is a continuation-in-part of, and claims priority to, each of U.S. patent application Ser. No. 16/448,572, filed Jun. 21, 2019, entitled "SYSTEMS AND METHODS FOR AUTHENTICATING ONLINE USERS WITH AN ACCESS CONTROL SERVER"; U.S. patent application Ser. No. 16/448,596, filed Jun. 21, 2019, entitled "SYSTEMS AND METHODS FOR AUTHENTICATING ONLINE USERS"; U.S. patent application Ser. No. 16/448,822, filed Jun. 21, 2019, entitled "SYSTEMS AND METHODS FOR AUTHENTICATING ONLINE USERS"; and U.S. patent application Ser. No. 16/448,884, filed Jun. 21, 2019, entitled "SYSTEMS AND METHODS FOR AUTHENTICATING ONLINE USERS IN REGULATED ENVIRONMENTS", the entire contents and disclosure of all of which are hereby incorporated by reference herein in their entirety; and moreover, each of the above-listed U.S. Patent Applications claims the benefit of, and priority to, each of U.S. Provisional Patent Application No. 62/688,528, filed Jun. 22, 2018, entitled "SYSTEMS AND METHODS FOR AUTHENTICATING ONLINE USERS," U.S. Provisional Patent Application No. 62/688,529, filed Jun. 22, 2018, entitled "SYSTEMS AND METHODS FOR AUTHENTICATING ONLINE USERS WITH AN ACCESS CONTROL SERVER," U.S. Provisional Patent Application No. 62/688,546, filed Jun. 22, 2018, entitled "SYSTEMS AND METHODS FOR AUTHENTICATING ONLINE USERS IN REGULATED ENVIRONMENTS," and U.S. Provisional Patent Application No. 62/688,532, filed Jun. 22, 2018, entitled "SYSTEMS AND METHODS FOR AUTHENTICATING ONLINE USERS," the entire contents and disclosure of all of which are hereby incorporated by reference herein in their entirety.

BACKGROUND

The present application relates generally to authenticating online users over an electronic network, and more particularly, to authenticating online users with an access control server using risk-based authentication.

Transactions conducted over electronic payment networks are growing exponentially. For card-not-present transactions (e.g., transactions in which the consumer does not actually provide a payment card to the merchant), fraud is markedly higher. Accordingly, for such transactions, authentication procedures are often implemented to verify that the alleged cardholder is, in fact, the actual or legitimate cardholder.

In at least some known authentication systems, the bank that issued the payment card for the transaction (referred to as the issuer) contracts with an access control server (ACS) for authentication services. Specifically, the ACS analyzes at least some of the data associated with the transaction, determines whether or not it is likely that the alleged cardholder is, in fact, the actual or legitimate cardholder, and reports that determination to the issuer.

However, contracting with an ACS for authentication services may be relatively expensive for an issuer. Further, different issuers may contract with different ACSs. Accordingly, the amount of data that a particular ACS is able to leverage when performing authentication services may be fairly limited, as that ACS may only have access to a relatively small number of transactions. Further, at least some ACSs do not have the capability to perform more sophisticated (and thus more accurate) authentication procedures. In addition, ACSs that are able to provide some level of fraud detection capability may temporarily lose such capability (e.g., due to equipment malfunction), directly impacting their ability to successfully authenticate online users.

Some authentication systems may also implement strong consumer authentication (SCA) (or just "strong authentication") for certain transactions. For example, an issuing bank may insist on authenticating consumers during online transactions (e.g., with a username and password, or by SMS text message). Such tools may help issuers verify identity and authenticate cardholders, but they may also increase friction with the cardholders, which sometimes leads to transactions being abandoned. This can result in losses to the merchant and to the underlying payment card network. Further, some SCA methods such as passwords may be less trustworthy than others, which may lead to increased risk in transactions.

In some markets, regulators may require SCA on digital transactions. For example, the Reserve Bank of India (RBI), India's central bank, requires that certain classes of digital transactions (e.g., those involving more than 2,000 Rupees) are authenticated using SCA. While these regulations have reduced fraud in India, they create considerable friction during the check-out experience. Cardholders get frustrated with having to provide a password or being timed out of the transaction, and merchants are dissatisfied when cardholders abandon transactions due to their frustrations.

Accordingly, it is desirable to have a computer-implemented authentication platform that is capable of performing sophisticated authentication services on behalf of ACSs that are unable to do so.

BRIEF DESCRIPTION

In one aspect, a computer-implemented method for authenticating an online user is provided. The method is implemented using a computing system including at least one processor and a memory device. The method includes steps performed by the at least one processor including receiving, from a requestor server in communication with a merchant website, an authentication request message including authentication data collected from a user computing device during an online interaction with the merchant website. The steps also include extracting the authentication data from the authentication request message, and applying a risk-based authentication (RBA) engine to the authentication data to obtain RBA result data including a reason code. The reason code includes no more than three bytes of data. The steps further include causing the reason code to be embedded in an authorization request message generated during the online interaction and routed to a decisioning server via a payment network. The authorization request message is formatted according to a set of proprietary communications standards promulgated by the payment network for exchange of data between institutions that are members of the payment network.

In another aspect, a computing system for authenticating an online user is provided. The computing system includes at least one processor and a memory device. The at least one processor is programmed to perform steps including receiving, from a requestor server in communication with a merchant website, an authentication request message including authentication data collected from a user computing device during an online interaction with the merchant website. The steps also include extracting the authentication data from the authentication request message, and applying a risk-based authentication (RBA) engine to the authentication data to obtain RBA result data including a reason code. The reason code includes no more than three bytes of data. The steps further include causing the reason code to be embedded in an authorization request message generated during the online interaction and routed to a decisioning server via a payment network. The authorization request message is formatted according to a set of proprietary communications standards promulgated by the payment network for exchange of data between institutions that are members of the payment network.

In another aspect, at least one non-transitory computer-readable medium including instructions stored thereon for authenticating an online user is provided. The instructions are executable by at least one processor to cause the at least one processor to perform steps including receiving, from a requestor server in communication with a merchant website, an authentication request message including authentication data collected from a user computing device during an online interaction with the merchant website. The steps also include extracting the authentication data from the authentication request message, and applying a risk-based authentication (RBA) engine to the authentication data to obtain RBA result data including a reason code. The reason code includes no more than three bytes of data. The steps further include causing the reason code to be embedded in an authorization request message generated during the online interaction and routed to a decisioning server via a payment network. The authorization request message is formatted according to a set of proprietary communications standards promulgated by the payment network for exchange of data between institutions that are members of the payment network.

BRIEF DESCRIPTION OF THE DRAWINGS

FIGS. 1-17 show example embodiments of the methods and systems described herein.

FIG. 1 is a schematic diagram illustrating an example RBA platform in communication with a multi-party payment card system for processing payment transactions in accordance with one embodiment of the present disclosure.

FIG. 2 is an expanded block diagram of an example embodiment of a computer system used in processing payment transactions that includes a server system in accordance with one example embodiment of the present disclosure.

FIG. 3 illustrates an example configuration of a server system such as the server system shown in FIG. 2.

FIG. 4 illustrates an example configuration of a client system shown in FIG. 2.

FIG. 5 is a schematic diagram illustrating transaction flow in an example authentication system.

FIG. 6 is a schematic diagram illustrating transaction flow in another example authentication system.

FIG. 7 is a flow diagram of an example method for authenticating a user on behalf of an access control server (ACS).

FIG. 8 is a data flow diagram of another example method for authenticating an online user.

FIG. 9 is a flow diagram of another example method for authenticating an online user.

FIG. 10 is a flow diagram of a further example method for authenticating an online user.

FIG. 12 is a flow diagram of a further example advanced authentication process for authenticating an online user and for increasing approvals, reducing fraud, and improving consumer experience.

FIG. 13 is a schematic diagram illustrating transaction flow in another example authentication system.

FIG. 14 is an example of a graphic visualization generated by a visualization engine in communication with the authentication system.

FIG. 16 is another example of a graphic visualization generated by the visualization engine.

FIG. 17 is another example of a graphic visualization generated by the visualization engine.

Figure 1:
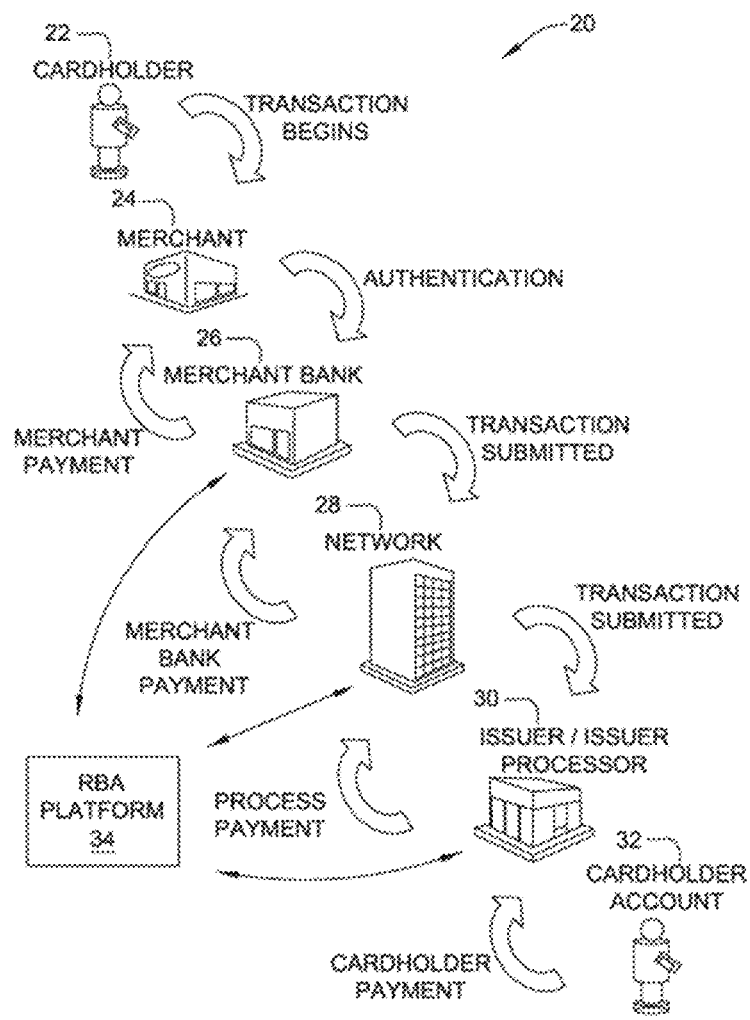

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein are directed to authenticating an online user on behalf of an access control server (ACS). A risk-based authentication enabled (RBA-enabled) directory server receives an authentication request message, the authentication request message includes authentication data. The RBA-enabled directory server extracts the authentication data from the authentication request message, and transmits the extracted authentication data to an RBA engine. The RBA engine then generates, based at least in part on the extracted authentication data, RBA result data including a risk score, a risk analysis, and at least one reason code, and transmits the RBA result data to the RBA-enabled directory server. The RBA-enabled directory server embeds the RBA result data into the authentication request message to generate an enhanced authentication request message, and transmits the enhanced authentication request message to the ACS to enable the ACS to make an authentication decision based on the RBA result data.

As noted above, in at least some known authentication systems, a bank that issued a payment card for a transaction (referred to as the issuer) contracts with an ACS for authentication services. Specifically, the ACS analyzes at least some of the data associated with the transaction, determines whether or not it is likely that the alleged cardholder is, in fact, the actual or legitimate cardholder, and reports that determination to the issuer. In some markets, regulators may mandate strong consumer authentication on certain types of transactions, such as card-not-present (CNP) transactions. Such regulation is directed at reducing online fraud, but often at the expense of customer and merchant satisfaction. For example, forcing customers to provide password or pin information or respond to a text message for 100% of transactions within that market increases friction in online purchasing environments, leading to increased rates of abandonment due to the customers' frustrations.

However, in at least some known authentication systems, contracting with an ACS for authentication services may be relatively expensive for an issuer. Further, different issuers may contract with different ACSs. Accordingly, the amount of data that a particular ACS is able to leverage when performing authentication services may be fairly limited, as that ACS may only have access to a relatively small number of transactions. Further, at least some ACSs do not have the capability to perform more sophisticated (and thus more accurate) authentication procedures. In addition, ACSs that are able to provide some level of fraud detection capability may temporarily lose those capabilities (e.g., due to equipment malfunction), directly impacting their ability to successfully authenticate online users.

Further, at least some ACSs rely on their associated issuers for updated and accurate fraud information. Accordingly, those ACSs can only improve their fraud detection and authentication procedures if they receive the necessary data from those issuers. Also, at least some ACSs do not have sufficient resources to develop more sophisticated authentication procedures, and accordingly, are unable to compete with more sophisticated entities.

In addition, some issuers only contract with an ACS for specific ranges of payment card numbers. Therefore, a specific payment card involved in a transaction might not be enrolled on the directory server with a vendor authentication solution or issuer implemented authentication solution, such as an ACS. In some situations, the ACS may be unavailable for authentication processing. This may be due to network connectivity issues between the directory server and the ACS. The ACS may be shut down. The ACS may also be overloaded and unable to process authentications in a timely manner. In some embodiments, the ACS may not return a response from any request in a timely manner. In other embodiments, the ACS may return a response indicating that it was unable to authenticate the cardholder. This response may indicate that the cardholder is not enrolled with the ACS or that the ACS is unavailable.

Accordingly, to address these limitations of known authentication systems, the systems and methods described herein allow the authentication process to be performed whether or not an ACS is available and allow an ACS to realize the benefits of RBA procedures, even if the ACS lacks the capability to perform more sophisticated authentication procedures, such as RBA. Furthermore, the systems and methods described herein allow for reduced messaging traffic and processing load on the ACS by filtering the authentications to determine if the ACS is necessary to the authentication process.

In example embodiments described herein, the RBA-enabled directory server allows low-risk, low-value transactions to avoid SCA step-up challenges to the consumer, while forcing SCA for transactions above a particular transaction value (e.g., above 2,000 rupees), or for transactions that are above a particular risk threshold (e.g., "medium" or "high" risk transactions).

More specifically, in an example embodiment, the RBA-enabled directory server allows regulators to set both a transaction value threshold and a risk threshold for when SCA may be avoided. Some regulators may agree that, for certain low-risk, low-value transactions, the increased friction that SCA adds to the transaction process may not be worth the marginal reduction in fraud in those situations. For example, the occurrence of fraud in low-value transactions may be relatively small and, with the value of those transactions being low, the amount of loss due to low-value transactions may also be relatively small. Further, if transactions can be evaluated for risk by a risk-based decision engine, those transactions with a low level of risk may represent only a small fraction of fraud, thereby further marginalizing their contribution to overall fraud. As such, regulators may configure the RBA-enabled directory server to avoid SCA when the transaction value is low and when the risk that the transaction is fraudulent is determined to be low.

In some embodiments, the RBA-enabled directory server provides a graphical user interface (GUI) to the regulators that provides an insight into fraud within their regulated market, and may allow the regulators to directly configure operational aspects of the RBA-enabled directory server, such as changing threshold values used in the conditional SCA process for their market. The GUI may allow the regulators to evaluate current performance of existing thresholds, displaying and comparing fraud data on transactions above or below the configured thresholds, such as the basis points of fraud lost during a particular period of time. The GUI may also allow regulators to evaluate potential threshold values, providing an estimate of fraud levels based on a set of prospective threshold values. As such, regulators may use such simulations to determine how they may set or change threshold values for their market.

As described herein, RBA refers to performing authentication on transactions using a rich, comprehensive data set that is generally not available to an issuer or ACS. For example, as described herein, RBA may include performing authentication using the 3DS 2 Protocol (for example versions 2.0, 2.1, 2.2, and subsequent versions of the 3DS Protocol). The 3DS Protocols are owned and updated by EMVCo. Further, as described herein, RBA may be performed by an authentication platform that is operated by a payment processing network. Thus, for authentication purposes, the authentication platform is capable of leveraging large volumes of historical transaction data for all transactions previously processed by the payment processing network (as compared to the relatively small number of transactions processed by a particular ACS).

Specifically, in the systems and methods described herein, the authentication system uses the 3DS 2 Protocol (or subsequent versions of the 3DS Protocol) for authentication, and performs RBA and potentially authentication on behalf of ACS providers that are unable to perform RBA. An RBA-enabled directory server is communicatively coupled to a RBA engine (which may be collectively referred to as an authentication platform). The RBA-enabled directory server and the RBA engine facilitate performing RBA behalf of ACS providers, as described herein. The RBA-enabled directory server and the RBA engine may be operated, for example, by an interchange network (e.g., a payment processing network).

The RBA-enabled directory server receives an authentication request (AReq) message from a 3DS server. However, instead of immediately forwarding the AReq message to an ACS, the RBA-enabled directory server transmits at least some of the data in the AReq message (e.g., authentication data) to the RBA engine. Alternatively, the RBA-enabled directory server may evaluate the transaction to determine with which market(s) the transaction is associated (e.g., based on merchant, merchant bank, issuing bank, consumer, and so forth). If the transaction is associated with a regulated market that is configured for "conditional SCA" as described herein, then the RBA-enabled directory server compares the transaction value with the configured transaction value threshold set by the regulators of the associated market. If the transaction value is below the transaction value threshold, then the RBA engine evaluates the risk of the transaction using transaction data and other data available to the RBA-enabled directory server.

In some embodiments, the RBA-enabled directory server determines whether or not the ACS available by transmitting the authentication request message to the ACS. In these embodiments, the RBA-enabled directory server waits a predetermined period of time for a response from the ACS. The RBA-enabled directory server determines that the ACS is unavailable if no response is received from the ACS after the predetermined period of time. Alternatively, the RBA-enabled directory server may receive a response from the ACS that indicates that the ACS is unable to perform authentication. The response from the ACS may indicate that the online user is not enrolled with the ACS, that the ACS is currently unavailable, or that the ACS was unable to authenticate the online user. In other embodiments, the RBA-enabled directory server may transmit periodic status check messages to the ACS to determine whether or not the ACS is available.

In the example embodiment, the RBA engine analyzes the data in the AReq message to generate RBA result data. For example, the RBA engine may compare the data in the AReq message to one or more long term variables ("LTV"). The one or more LTV may include historical authentication data associated with the payment account number (PAN) at issue, historical authorization data associated with the PAN, other historical data associated with the PAN, etc. The LTV may be associated with both card present and card not present historical transactions. For example, the LTV may include cardholder shipping address, cardholder billing address, cardholder email address, cardholder phone number, merchant name, merchant category, merchant location, and/or at least one environment-related variable (e.g., device details, browser details) including device ID, IP address, device channel, etc. Further, the LTV may be stored in a database accessible by the RBA engine and operated by the interchange network. In some embodiments, the LTV data will be hashed prior to storing to protect the security of this personally identifiable information.

In addition, the data in the AReq message may also be compared to other parameters. For example, to monitor consistency and changes in behavior, the data may be compared to short term variables (e.g., on the order of minutes, hours, or days), including velocities and ratios of PAN authorization and authentication. This may include comparing to recent transaction frequency, amount spent, declines, historical risk scores, etc. Alternatively, the data in the AReq message may be analyzed using any suitable techniques to generate RBA result data, as described herein.

In the example embodiment, the RBA result data generated by the RBA engine includes a risk score, a risk analysis, and at least one reason code. The risk score is a score representing a determined riskiness of the transaction, with lower scores indicating lower risk and higher scores indicating higher risk. In other words, the risk score represents a likelihood that the suspect cardholder (e.g., the person attempting to perform a transaction) is the legitimate cardholder having the privileges to use the payment card to perform a payment transaction. For example, the risk score may be represented by a number from 0-999 and/or by a risk threshold category from 0-19. In certain embodiments, the risk score is represented between 0 and 950 in twenty increments of 50 (i.e., the potential risk scores are 0, 50, 100, 150, . . . , 950). In some embodiments, risks assessments that will be shared, such as through the authorization field of one or more messages will be quantified on a scale of 0-9. Those of skill in the art will appreciate that any suitable risk score may be used.

The risk analysis is a description of a level of risk corresponding to the risk score (e.g., low risk, medium risk, or high risk). Further the reason codes include one or more factors that influenced the risk score. In some embodiments, the reason codes are generated using reason code categories and anchors, as described herein. In some embodiments, the reason codes are affected by rules and/or a combination of the rules and the model. The RBA engine transmits the RBA result data to the RBA-enabled directory server.

The RBA-enabled directory server embeds the RBA result data into the AReq message to generate an enhanced or enriched AReq message. For example, in some embodiments, the RBA result data is appended to the AReq message as an extensible markup language (XML) extension of the AReq message. For example, the extension may have the following format:

```
"name": "ACS RBA",
"id": "A000000004-acsRBA",
"criticalityIndicator" : "true",
"data": {
    "status": "success",
    "score" : "150",
    "decision": "low risk",
    "reasonCode1":"Y",
    "reasonCode2":"J"}
``` where "score" is the risk score, "decision" is the risk analysis, and "reasonCode1" and "reasonCode2" are the reason codes. In the exemplary embodiment, the reason codes are transmitted as a single letter each. In other embodiments, the reason codes may be represented in different methods. In some embodiments, reasonCode2 is transmitted by the merchant to provide the merchant's assessment of the transaction. Additionally or alternatively, additional bytes may be used to include codes from an additional reviewing platform and/or a field signifier to identify the platform that provided the code in reasonCode1, reasonCode2, and/or another code field. Alternatively, the RBA result data may be embedded into the AReq message to generate an enhanced or enriched AReq message using any suitable process.

The enhanced AReq message is then transmitted from the RBA-enabled directory server to the ACS. The ACS then analyzes the RBA result data in the enhanced AReq message to make an authentication decision. That is, in the example embodiment, the ACS may determine to fully authenticate the transaction, deny authentication for the transaction, or perform additional authentication (e.g., by issuing a step-up challenge to the cardholder) for the transaction, based on at least one of a risk score, the risk analysis, and the reason codes. Accordingly, the ACS does not perform the RBA analysis, but is still able to leverage the results of that analysis to make an authentication decision (e.g., by using the results in their own fraud analysis platform), generally resulting in more approvals with less fraud. Thus, the RBA-enabled directory server and the RBA engine perform the RBA analysis on behalf of the ACS. In some embodiments, the ACS receives authentication data from a plurality of sources.

In an example embodiment, the authentication platform compares the RBA result data to a stored authentication profile. The authentication profile contains a plurality of rules for the processing of authentication requests. In some embodiments, the authentication profile is provided by an issuer computing device associated with an issuer bank. Examples of the rules include, but are not limited to, how to proceed when the ACS is unavailable, information to include in the RBA, risk level thresholds for the risk score and risk levels, decision making risk thresholds, and specialized rules (such as all cross-border transactions are to be submitted to the ACS). In some embodiments, the authentication profile may include regulator-imposed threshold values for risk categories or transaction threshold values for particular markets that define when SCA is mandated. The authentication profile is stored at the RBA platform, and can be accessed whenever a risk score is determined.

In an example embodiment, the authentication platform compares the RBA result data to the authentication profile to determine the risk level associated with the transaction associated with the authentication request. In some embodiments, the authentication platform compares the risk score to one or more thresholds in the authentication profile to determine the risk level associated with the transaction. In other embodiments, the authentication platform compares the risk analysis, the reason codes, and/or any other combination of data from the RBA result data and potentially some or all of the authentication data to the authentication profile to determine the risk level associated with this transaction. For example, a risk score of 900 or less may be considered low risk, a risk score between 900 and 980 may be considered medium risk, and a risk score above 980 may be considered high risk. Those skilled in the art will appreciate that any suitable risk score thresholds and any number of risk levels may be used.

In an example embodiment, the authentication platform determines if the risk level is high risk. In the example embodiment, in the case of a high risk transaction, the authentication platform may not fully authenticate the transaction. The authentication platform may transmit an authentication response (ARes) message indicating the failed authentication to the 3DS server. The 3DS server may transmit the Ares message indicating the failed authentication to the merchant, and the merchant determines whether or not to proceed with the authorization process in the absence of full authentication. In these circumstances, the merchant's acquirer or the merchant may decide to forgo authentication and submit the transaction to authorization. If authorization is approved, liability remains with the merchant (i.e., the merchant assumes the risk for the transaction) since there is no successful authentication.

In other cases the authentication platform determines that the transaction is medium risk or low risk. If the transaction is low risk, the authentication platform may fully authenticate the transaction and transmit an authentication response (ARes) message indicating the full authentication to the 3DS server, where at least one of the 3DS server and the merchant may initiate the authorization process. In some embodiments, if the transaction is subject to a regulated market, the transaction may be authorized without SCA if the transaction is below the transaction value threshold for that market, or the transaction may be mandated to be subject to SCA if the transaction value is above the threshold for that market. If the transaction is medium risk, the authentication platform may issue a step-up challenge to the cardholder. If the transaction is subject to a regulated market, SCA may be mandated in that market. Based on the results of the step-up challenge, the authentication platform may fully authenticate or fail to fully authenticate the transaction. In some embodiments, if the transaction is medium risk, the authentication platform transmits the RBA result data to the ACS, so that the ACS will perform the step-up challenge. In other embodiments, the authentication platform may take different steps at different risk levels and have additional or fewer risk levels to analyze based on the authentication profile.

In some embodiments, the authentication platform determines that the online user is not associated with the ACS based on the extracted authentication data. In these embodiments, the issuer associated with the online user has not registered with an ACS. In these embodiments, the authentication platform generates an authentication decision based on the RBA result data.

The 3DS 2 Protocol (and subsequent versions of the 3DS Protocol) provides a number of benefits to cardholders, issuers, and merchants. It reduces risk of unauthorized transactions through an approach that incorporates a rich, comprehensive set of data to make authentication decisions. For cardholders, it provides a simple, secure, and familiar online authentication experience, regardless of payment channel or device. For issuers, it allows for "frictionless" authentication, in which an explicit cardholder step-up authentication is not required or performed. This enables more intelligent risk assessment decisions and the ability to selectively challenge the cardholder as needed. This also improves cardholder experience and overall cardholder loyalty to issuers. For merchants, the 3DS 2 Protocol decreases fraud on all authenticated transactions, and increases revenue potential from reduced friction and reduced cart abandonment (i.e., cardholders deciding not to complete a transaction after they have already selected one or more items to be purchased), especially for mobile payment channels. This also improves cardholder experience and overall cardholder loyalty to merchants. The 3DS 2 Protocol and RBA may support additional payment channels, such as, but not limited to, card-on-file, wallet, mobile, in-app, and Internet of Things (IoT).

Using 3DS 2 Protocol (or subsequent versions of the 3DS Protocol), payment networks see 100% of all authentication requests globally on all cards on their brands. No other party, including issuers and ACS providers, is able to provide this global visibility. This global visibility may be leveraged to provide a consistent, standards-based risk analysis of transactions on behalf of issuers, enabling a market-wide risk-based authentication approach.

As compared to previous authentication methods (e.g., 3DS 1.0), the 3DS 2 Protocol (and subsequent versions of the 3DS Protocol) allows for approximately ten times the amount of transaction data to be gathered, analyzed, and utilized to prevent fraud. The additional data included in the 3DS Protocol increases data exchange between merchants and issuers, and improves risk-based authentication (RBA) decisioning. RBA allows issuers to examine every authentication request through transaction risk analysis, while focusing fraud prevention efforts on transactions that prevent the most risk. Further, RBA utilizes both behavioral and transactional inputs in conjunction with a risk engine to determine riskiness of a transaction. The RBA method of cardholder authentication dynamically calculates a risk assessment for any given e-commerce transaction in real time. The assessment can then be used to authenticate the cardholder in a frictionless manner.

The RBA methodology includes three components that work together to provide authentication of cardholders. First, the underlying data model is used to provide a basis for the authentication. The underlying data model may include 3DS data, which may include cardholder data, behavioral data, location data, merchant data, and device data. The underlying data model may also include interchange network data, such as, but not limited to, past risk scores, authentication approvals, authorization history, chargeback data, and fraud data.

The RBA methodology may use in the underlying data model in one or more measurement methodologies. The measurement methodologies may include short term velocities and ratios, including measuring behavior consistency and changes, such as frequency, amount spent, time, location, and device. The measurement methodologies may also include long term velocities and ratios, which include measurement of behavior and anomaly detection. The measurement methodologies may further include continuous measurement across the payment network.

The RBA methodology may then use the underlying data model and the measurement methodology in a rules engine. The rules engine may include thresholds for interpreting measurement results, rules for combining results of measurements, and rules for combining other data with models and measurements.

Transactions deemed safe or low risk are silently authenticated (i.e., so-called "frictionless" authentication), while higher risk transactions are subjected to step-up authentication. When a low risk transaction is silently authenticated, so much data has already been gathered that further authentication adds little to no value. Accordingly, RBA effectively replaces the need for an explicit interaction with the cardholder for every transaction, but transactions are still fully authenticated, with liability resting with the issuer. Thus, more transactions are completed with minimal cardholder disruption, aiding e-commerce growth.

An example of a safe (or low-risk) transaction may include, where the cardholder has a positive transaction history, is performing the transaction with a known device with a positive association with the cardholder, the cardholder is in a typical geolocation, the device is using a typical IP address, the transaction fits within a typical behavioral and transaction pattern, and the shipping address has been used with the payment account number (PAN) and is the same as the last transaction. The cardholder buys a present to be delivered to his house. An example of a medium risk transaction may include, where the cardholder has a positive transaction history, is using an unknown device with no known association with the cardholder, the device is at a non-typical geolocation and IP address, but is typical behavioral, cardholder, and transaction pattern. For example, the cardholder is on travel and purchases Internet Access at a hotel. An example of a high risk transaction may include, where there are anomalous velocities detected with the cardholder in network, is using an unknown device with no known association with the cardholder, the device is at a non-typical geolocation and IP address, and there is anomalous behavior patterns detected. The cardholder purchases over $600 of clothing in Texas right after the cardholder purchased lunch in St. Louis.

One goal of RBA is to minimize the number of transactions that require active (i.e., step-up) authentication, while keeping fraud to a minimum and improving consumer friction points during the transaction process. The goal of RBA is to silently eliminate unnecessary friction on low risk transactions. In markets where authentication is widely used for a representative range of transactions, approximately 90% of transactions are deemed low risk and would then be authenticated without any action and would proceed to the Authorization process. This greatly decreases the amount of processing and message traffic necessary to authenticate transactions. 5-8% of transactions would be considered medium risk and the cardholder would be asked to authenticate themselves, such as through a step-up challenge. Then 1-2% of transactions would be deemed high risk and would fail authentication. With RBA, the information gathered enables transaction scoring and classification into low, medium, and high risk, allowing the issuer and ACS to take appropriate action.

The 3DS 2 Protocol (and subsequent versions of the 3DS Protocol) enables a market-wide level risk analysis of all transactions that reach directory server 510. Each transaction can be scored and/or flagged based on the global data available using the 3DS 2 Protocol (and subsequent versions of the 3DS Protocol). Additionally, the payment processor operating the directory server 510 has the ability to see cardholder activity across the digital and physical domains, and can utilize this expanded view to improve scoring. In contrast, traditional authentication service providers may only address the digital domain. For example, a payment processor could indicate if a particular device is associated with fraud, and flag that device for issuers in future transactions. The issuer may then reject transactions involving that device or prompt for additional authentication (e.g., through two-factor authentication).

The following Table 1 lists a number of the data elements that are used in the 3DS 2 Protocol for authentication. For example, at least some of these data elements may be included in the authentication data included in the AReq sent to directory server 510. The eighteen data elements that are also part of the 3DS 1.0 Protocol are bolded in Table 1. Those of skill in the art will appreciate that the number of rich data elements could grow beyond those listed below (e.g., in future versions of the 3DS Protocol), and could include over one hundred and seventy data elements. Further, an app-based transaction (e.g., carried out using a mobile computing device) could provide even more data elements than browser-based transactions. In addition, a transaction performed using an Android device could have over one hundred and thirty additional elements. The authentication data may also be divided by category, such as: transaction data (amount, currency, date, and time), device data (IP address, device info, and channel data), cardholder data (account number and shipping address), and merchant data (name, category, and country).

TABLE 1

| | Data Element |
|---|---|
| 1 | 3DS Requestor Authentication Information |
| 2 | 3DS Requestor Challenge Indicator |
| 3 | 3DS Requestor ID |
| 4 | 3DS Requestor Initiated Indicator |
| 5 | 3DS Requestor Name |
| 6 | 3DS Requestor Non-Payment Authentication Indicator |
| 7 | 3DS Requestor Prior Transaction Authentication Information |
| 8 | 3DS Requestor URL |
| 9 | 3DS Server Operator ID |
| 10 | 3DS Server Reference Number |
| 11 | 3DS Server Transaction ID |
| 12 | 3DS Server URL |
| 13 | Account Type |
| 14 | Acquirer BIN |
| 15 | Acquirer Merchant ID |
| 16 | ACS Challenge Mandated Indicator |
| 17 | ACS Counter ACS to SDK |
| 18 | ACS HTML |
| 19 | ACS Operator ID |
| 20 | ACS Reference Number |
| 21 | ACS Rendering Type |
| 22 | ACS Signed Content |
| 23 | ACS Transaction ID |

TABLE 1-continued

| | Data Element |
|---|---|
| 24 | ACS UI Type |
| 25 | Address Match Indicator |
| 26 | Authentication Method |
| 27 | Authentication Type |
| 28 | Authentication Value |
| 29 | Browser Accept Headers |
| 30 | Browser IP Address |
| 31 | Browser Java Enabled |
| 32 | Browser Language |
| 33 | Browser Screen Color Depth |
| 34 | Browser Screen Height |
| 35 | Browser Screen Width |
| 36 | Browser Time Zone |
| 37 | Browser User-Agent |
| 38 | Card/Token Expiry Date |
| 39 | Cardholder Account Identifier |
| 40 | Cardholder Account Information |
| 41 | Cardholder Account Number |
| 42 | Cardholder Billing Address City |
| 43 | Cardholder Billing Address Country |
| 44 | Cardholder Billing Address Line 1 |
| 45 | Cardholder Billing Address Line 2 |
| 46 | Cardholder Billing Address Line 3 |
| 47 | Cardholder Billing Address Postal Code |
| 48 | Cardholder Billing Address State |
| 49 | Cardholder Email Address |
| 50 | Cardholder Home Phone Number |
| 51 | Cardholder Mobile Phone Number |
| 52 | Cardholder Name |
| 53 | Cardholder Shipping Address City |
| 54 | Cardholder Shipping Address Country |
| 55 | Cardholder Shipping Address Line 1 |
| 56 | Cardholder Shipping Address Line 2 |
| 57 | Cardholder Shipping Address Line 3 |
| 58 | Cardholder Shipping Address Postal Code |
| 59 | Cardholder Shipping Address State |
| 60 | Cardholder Work Phone Number |
| 61 | Challenge Additional Information Text |
| 62 | Challenge Cancelation Indicator |
| 63 | Challenge Data Entry |
| 64 | Challenge HTML Data Entry |
| 65 | Challenge Information Header |
| 66 | Challenge Information Label |
| 67 | Challenge Information Text |
| 68 | Challenge Information Text Indicator |
| 69 | Challenge Selection Information |
| 70 | Challenge Window Size |
| 71 | Device Channel |
| 72 | Device Information |
| 73 | Device Rendering Options Supported |
| 74 | DS Reference Number |
| 75 | DS Transaction ID |
| 76 | DS URL |
| 77 | Electronic Commerce Indicator |
| 78 | EMV Payment Token Indicator |
| 79 | Expandable Information Label 1 |
| 80 | Expandable Information Text 1 |
| 81 | Instalment Payment Data |
| 82 | Interaction Counter |
| 83 | Issuer Image |
| 84 | Merchant Category Code |
| 85 | Merchant Country Code |
| 86 | Merchant Name |
| 87 | Merchant Risk Indicator |
| 88 | Message Category |
| 89 | Message Extension |
| 90 | Message Type |
| 91 | Message Version Number |
| 92 | Notification URL |
| 93 | OOB App Label |
| 94 | OOB App URL |
| 95 | OOB Continuation Indicator |
| 96 | OOB Continuation Label |
| 97 | Payment System Image |
| 98 | Purchase Amount |
| 99 | Purchase Currency |
| 100 | Purchase Currency Exponent |
| 101 | Purchase Date & Time |

TABLE 1-continued

| | Data Element |
|---|---|
| 102 | Recurring Expiry |
| 103 | Recurring Frequency |
| 104 | Resend Challenge Information Code |
| 105 | Resend Information Label |
| 106 | Results Message Status |
| 107 | SDK App ID |
| 108 | SDK Counter SDK to ACS |
| 109 | SDK Encrypted Data |
| 110 | SDK Ephemeral Public Key (Qc) |
| 111 | SDK Reference Number |
| 112 | SDK Transaction ID |
| 113 | Submit Authentication Label |
| 114 | Transaction Status |
| 115 | Transaction Status Reason |
| 116 | Transaction Type |
| 117 | Why Information Label |
| 118 | Why Information Text |

In the example embodiment, transactions are categorized "merchant only" or "fully authenticated." "Fully authenticated" transactions are generally considered to be low risk transactions that have been authenticated. "Merchant only" transactions are more risky transactions. In some embodiments, "merchant only" transactions have been authenticated. In the example embodiment, one or more indicators in the authentication response indicate whether a transaction is "merchant only" or "fully authenticated." One or more indicators may also indicate whether or not authentication was attempted on the transaction. This information is used by the merchant to determine whether or not to begin the authorization process for the transaction. In some embodiments, this information is also stored in a database and is referred to by at least one of the interchange network and the issuer processor during the authorization process.

In some further embodiments, the authentication platform determines whether the authentication request message complies with the 3DS 2 Protocol or subsequent versions of the 3DS Protocol. If the authentication request message does not comply with the appropriate 3DS Protocols, the authentication platform bypasses determining if the ACS is available. In this situation, the authentication platform transmits an authentication response message indicating that the transaction is considered merchant only and that no authentication was attempted.

In some embodiments, the authentication platform determines a risk level based on the RBA result data. If the risk level is low, the authentication platform embeds an indicator in the authentication response message indicating that the transaction is "fully authenticated." If the risk level is not low, the authentication platform embeds one or more indicators in the authentication response message indicating that the transaction is a merchant only transaction and that authentication was attempted.

In the example embodiment, the authentication platform performs the authentication process on the transaction, including RBA. This analysis is based on a machine learning model where, over time, the authentication platform is capable of improving its ability to determine the risk level associated with transactions. The authentication platform analyzes transactions that are authenticated by the ACS and compares these transactions with historical data to generate a risk model for each issuer. By comparing the data points in each transaction, the risk model will indicate the amount of risk associated with each transaction based on the authentication data in the corresponding authentication requests. This allows the authentication platform to analyze transactions when the ACS is unavailable and perform authentication on these transactions to provide a response to the authentication request. Accordingly, the authentication platform may determine that a received authorization request is substantially similar to a previous transaction that the ACS scored at low risk. Thus allowing the authentication platform to determine that the received transaction is low risk with a degree of certainty.

A technical effect of the systems and processes described herein is achieved by performing at least one of the following steps: (i) store, in a memory device, an authentication profile for at least one PAN of the plurality of pans; (ii) receive an authentication request message, the authentication request message including authentication data; (iii) extract the authentication data from the authentication request message; (iv) compare the authentication data to at least one long term variable and at least one short term variable, wherein the at least one long term variable includes historical authentication data and historical authorization data; (v) generate, based at least in part on the extracted authentication data, risk-based authentication (RBA) result data including a risk score and at least one reason code that indicates at least one factor that influenced the generated risk score; (vi) route the RBA result data based on the authentication profile and the RBA result data; (vii) transmit the RBA result data to a source of the authentication request message; (viii) determine whether an access control server (ACS) is available; (ix) if the ACS is available, (a) embed the RBA result data into the authentication request message to generate an enhanced authentication request message; and (b) transmit the enhanced authentication request message to the ACS to enable the ACS to make an authentication decision based on the RBA result data; (x) generate an authentication decision based on the RBA result data and the authentication profile if the ACS is unavailable; (xi) determine a risk level based on the RBA result data and the authentication profile; (xii) if the risk level is low, transmit an authentication approval; (xiii) if the risk level is medium, (a) transmit a step-up challenge to the online user; (b) receive a response to the step-up challenge from the online user; and (c) determine an authentication decision based on the response to the step-up challenge and the RBA result data; (xiv) if the risk level is medium, transmit the RBA result data to an access control server (ACS) if the risk level is medium, wherein the ACS is configured to perform a step-up challenge; and (xv) if the risk level is high, transmit an authentication denied message if the risk level is high.

A technical effect of the systems and processes described herein is achieved by performing at least one of the following steps: (i) receiving, at a risk-based authentication enabled (RBA-enabled) directory server, an authentication request message, the authentication request message including authentication data; (ii) extracting, using the RBA-enabled directory server, the authentication data from the authentication request message; (iii) transmitting the extracted authentication data to an RBA engine; (iv) generating, using the RBA engine, based at least in part on the extracted authentication data, RBA result data including a risk score, a risk analysis, and at least one reason code; (v) transmitting the RBA result data to the RBA-enabled directory server; (vi) embedding, using the RBA-enabled directory server, the RBA result data into the authentication request message to generate an enhanced authentication request message; and (vii) transmitting the enhanced authentication request message to the ACS to enable the ACS to make an authentication decision based on the RBA result data.

Another technical problems addressed by this system includes: (i) high network load based at least in part on step-up challenging most or all card-not-present transactions which results in network delays and reduced bandwidth; (ii) allowing fraudulent transactions to be successfully processed if there is no step-up challenge of a card-not-present transaction; (iii) consumer inconvenience during card-not-present transactions based at least in part on having to answer an additional authentication challenge during a transaction; (iv) abandonment of transactions by consumers when faced with a step-up challenge, thus leading to lost sales for merchants and lost processing fees for the other network parties based on those abandoned transactions; (v) unavailability of customizable fraud-related services to merchants and/or merchant acquirers; (vi) increased risk with merchant liability for fraudulent transactions; (vii) digital wallet-related fraud; (viii) issuers having limited access to some data that may be used to fraud-score transactions; (ix) reducing the network load by reducing network traffic to and from the ACS; (x) increasing the speed of the authentication process by reducing the number of steps required; (xi) reducing the processing load of the ACS by pre-filtering authentication requests to prevent redundant or unnecessary processing; (xii) improved transaction approval rates.

Yet another technical effect of the systems and processes described herein is achieved by performing at least one of the following steps: (i) receive an authentication request message for a transaction, the authentication request message including authentication data; (ii) extract the authentication data from the authentication request message; (iii) determine if the ACS is available to process the transaction; (iv) if the ACS is unavailable, the at least one processor programmed to: (a) generate, based at least in part on the extracted authentication data, risk-based authentication (RBA) result data including a risk score and at least one reason code that indicates at least one factor that influenced the generated risk score; (b) compare the authentication data to at least one long term variable and at least one short term variable, wherein the at least one long term variable includes historical authentication data and historical authorization data; and (c) transmit an authentication response message based on the RBA result data; (v) determine that the online user is not associated with the ACS based on the extracted authentication data; (vi) generate an authentication decision based on the RBA result data; (vii) determine a risk level based on the RBA result data; (viii) embed an indicator in the authentication response message indicating that the transaction is fully authenticated if the risk level is low; (ix) embed one or more indicators in the authentication response message indicating that the transaction is a merchant only transaction and that authentication was attempted if the risk level is not low; (x) determine whether the authentication request message complies with the 3DS 2 Protocol or subsequent versions of the 3DS Protocol; and (xi) bypass determining if the ACS is available if the authentication request message does not comply.

In some embodiments, the authentication platform determines that the online user is not associated with the ACS based on the extracted authentication data. In these embodiments, the issuer associated with the online user has not registered with an ACS. In these embodiments, the authentication platform generates an authentication decision based on the RBA result data.

As will be appreciated, based on the description herein the technical improvement in the authentication system as described herein is a computer-based solution to a technical deficiency or problem that is itself rooted in computer technology (e.g., the problem itself derives from the use of computer technology). More specifically, fraud is significant problem for transactions conducted over an electronic payment network, especially for card-not-present transactions. Advanced fraud detection methodologies (e.g., RBA) exist, but at least some ACSs are unable to execute those methodologies and furthermore communication with ACSs increases network traffic and processing load, and in addition the ACS may be unavailable. Accordingly, to address this problem, the systems and methods described herein address this technical problem by using an RBA-enabled directory server and RBA engine to perform RBA and filter the results to determine which authentications need to be forwarded to an ACS and to forward the results of the RBA to the ACS to enable the ACS to make an authentication decision.

The following detailed description of the embodiments of the disclosure refers to the accompanying drawings. The same reference numbers in different drawings may identify the same or similar elements. Also, the following detailed description does not limit the claims.

Described herein are computer systems such as authentication computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to authenticating users for transactions conducted over an electronic payment network.

FIG. 1 is a schematic diagram illustrating an example RBA platform 34 in communication with a multi-party payment card system 20 for processing payment transactions in accordance with one embodiment of the present disclosure. FIG. 1 depicts a flow of data in a financial transaction through system 20. Embodiments described herein may relate to a transaction card system, such as a credit card payment system using the MASTERCARD® interchange network. The MASTERCARD® interchange network is a set of proprietary communications standards promulgated by Mastercard International Incorporated® for the exchange of financial transaction data and the settlement of funds between financial institutions that are members of Mastercard International Incorporated®. (MASTERCARD® is a registered trademark of Mastercard International Incorporated located in Purchase, New York).

In the exemplary transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authentication of the cardholder 22 and authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether the alleged cardholder is actually legitimate cardholder 22 (i.e., authentication), whether cardholder's 22 account 32 is in good standing, and whether the purchase is covered by cardholder's 22 available credit line. Based on these determinations, the requests for authentication and authorization will be declined or accepted. Authentication may be performed prior to authorization. If the requests are accepted, an authorization code is issued to merchant 24.

In the exemplary embodiment, the payment card system 20 includes or is in communication with a risk-based authentication (RBA) server 34. In this embodiment, the RBA platform 34 provides enhanced meta-data collection to capture information, including meta-data from the payment transactions processed by the payment card system 20. The RBA platform 34 stores this meta-data to use to provide as historical data when performing an authentication process prior to performing an authorization process. In the exemplary embodiment, the RBA platform 34 may receive historical data from one or more of the acquirer bank 26, the interchange network 28, and the issuer bank 30. Examples of this data include one or more long term variables ("LTV"). The one or more LTV may include historical authorization data associated with a plurality of PANs, other historical data associated with the plurality of PANs, etc. The LTV may be associated with both card present and card not present historical transactions. For example, the LTV may include cardholder shipping address, cardholder billing address, cardholder email address, cardholder phone number, merchant name, merchant category, merchant location, and/or at least one environment-related variable (e.g., device details, browser details) including device ID, IP address, device channel, etc. Further, the LTV may be stored in a database accessible by RBA platform 34 and operated by an interchange network 28. In some embodiments, the LTV data will be hashed prior to storing to protect the security of this personally identifiable information.

When a request for authorization is accepted, the available credit line of cardholder's 22 account 32 is decreased. Normally, a charge for a payment card transaction is not posted immediately to cardholder's 22 account 32 because bankcard associations, such as Mastercard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction may be settled between issuer bank 30 and interchange network 28, and then between interchange network 28 and merchant bank 26, and then between merchant bank 26 and merchant 24.

As described below in more detail, risk-based authentication (RBA) may be performed by the RBA platform 34 on behalf of an access control server (ACS) or issuer bank 30 in the context of multi-party payment card system 20. Although the systems described herein are not intended to be limited to facilitate such applications, the systems are described as such for example purposes.

Figure 2:
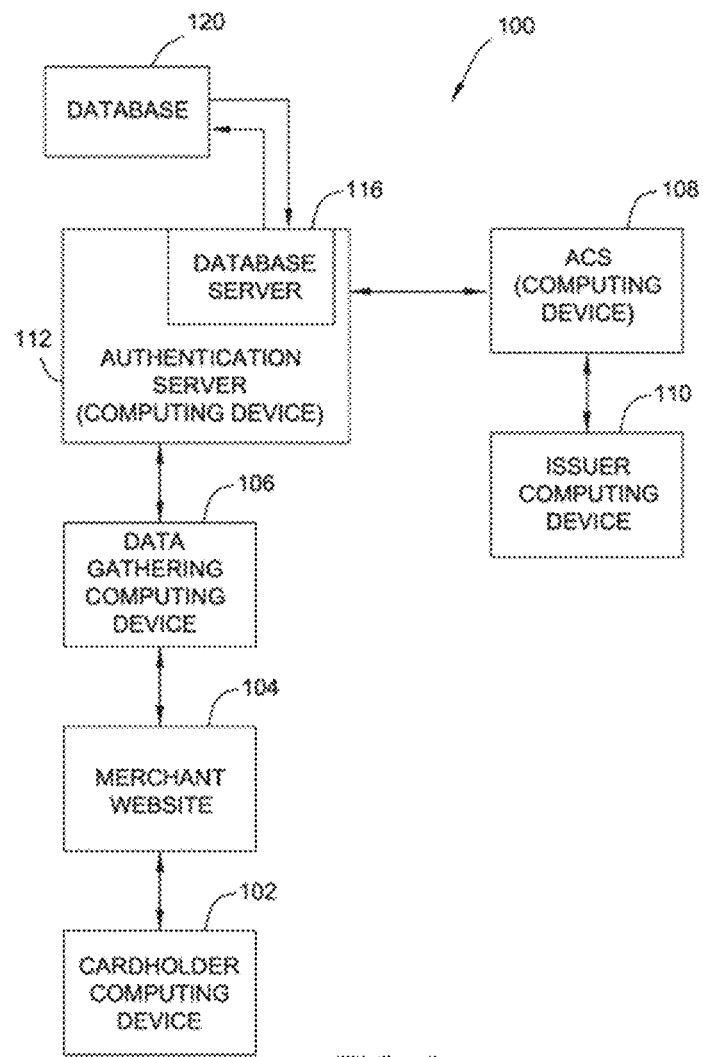

FIG. 2 is an expanded block diagram of an example embodiment of a computer system 100 used in authenticating payment transactions. In the exemplary embodiment, system 100 may be used for authenticating payment transactions either in concert with an ACS or in place of the ACS.

In the exemplary embodiment, cardholder computing devices 102 are computers that include a web browser or a software application, which enables cardholder computing devices 102 to access remote computer devices, such as merchant website 104, using the Internet or other network. More specifically, cardholder computing devices 102 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Cardholder computing devices 102 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, cardholder computing devices 102 are associated with individual cardholders 22 (shown in FIG. 1).

In the exemplary embodiment, merchant website 104 is an online shopping website that is reachable through computers that include a web browser or a software application, such as cardholder computing devices 102, using the Internet or other network. More specifically, merchant website 104 may be hosted on one or more computers that are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Computing devices hosting merchant website 104 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, merchant website 104 is associated with merchant 24 (shown in FIG. 1). In the exemplary embodiment, merchant website 104 allows cardholder 22 to purchase goods and/or services using cardholder computing device 102. In some embodiments, payment transactions performed through merchant website 104 are considered card not present transactions.

In the exemplary embodiment, data gathering computer devices 106 are computers that include a web browser or a software application, which enables data gathering computer devices 106 to access remote computer devices, such as merchant website 104 and authentication server 112, using the Internet or other network. More specifically, data gathering computing devices 106 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Data gathering computer devices 106 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, the data gathering computer devices 106 are associated with a 3DS server or service. In other embodiments, data gathering computer devices 106 are associated with acquirer bank 26 (shown in FIG. 1).

In the exemplary embodiments, authentication server 112 is in communication with a plurality of data gathering computer devices 106 and one or more access control servers (ACS) 108. In some embodiments, authentication server 112 is similar to RBA platform 34 (shown in FIG. 1). In the exemplary embodiment, authentication server 112 receives data from data gathering computer device 106 and uses that data to perform authentication of payment transactions. In some embodiments, authentication server 112 performs authentication with ACS 108. In other embodiments, authentication server 112 replaces the ACS 108 in the authentication process. In the exemplary embodiment, authentication server 112 is associated with the interchange network 28 (shown in FIG. 1). In other embodiments, the authentication server 112 is merely in communication with the interchange network 28.

In the exemplary embodiment, issuer computing devices 110 are computers that include a web browser or a software application, which enables issuer computing devices 110 to access remote computer devices, such as ACS 108 and authentication server 112, using the Internet or other network. More specifically, issuer computing devices 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Issuer computing devices 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, issuer computing devices 110 are associated with the issuer bank 30 (shown in FIG. 1).

A database server 116 is connected to database 120. In one embodiment, centralized database 120 is stored on server system 112 and can be accessed by potential users at one of client systems (not shown) by logging onto authentication server 112 through one of client systems. In an alternative embodiment, database 120 is stored remotely from authentication server 112 and may be non-centralized. Database 120 may be a database configured to store information used by authentication server 112 including, for example, historical payment transaction records.

Database 120 may include a single database having separated sections or partitions, or may include multiple databases, each being separate from each other. Database 120 may store transaction data generated over the processing network including data relating to merchants, consumers, account holders, prospective customers, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authentication and authorization request data. Database 120 may store one or more authentication profiles, where each authentication profile includes one or more authentication rules, one or more risk level thresholds, and one or more routing rules based on the risk level thresholds.

Figure 3:
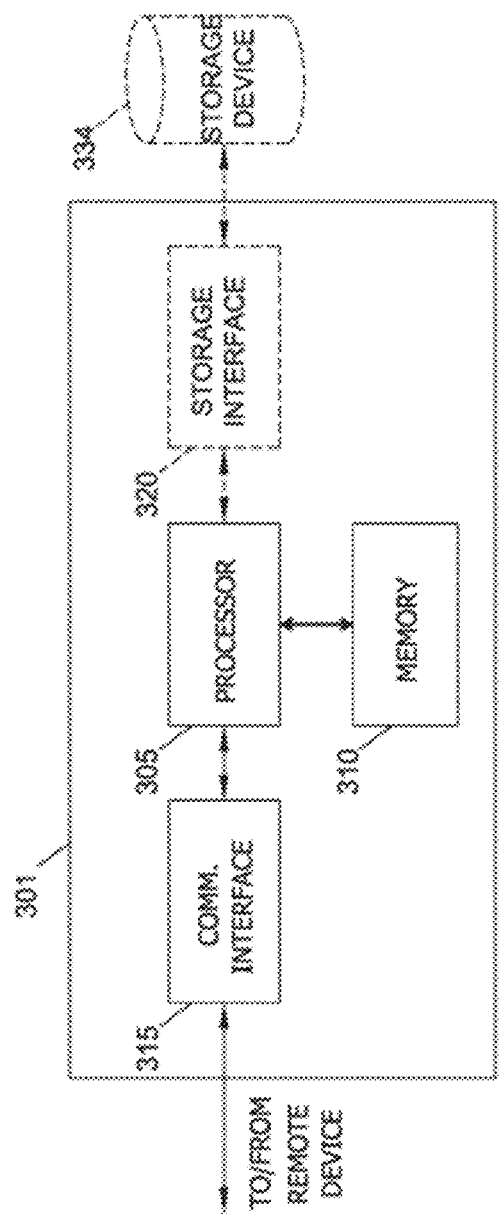

FIG. 3 illustrates an example configuration of a server system 301 such as RBA platform 34 (shown in FIG. 1), in accordance with one example embodiment of the present disclosure. Server system 301 may also include, but is not limited to, merchant website 104, data gathering computer device 106, ACS 108, issuer computing device 110, authentication server 112, and database server 116 (all shown in FIG. 2). In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from a client system (not shown) via the Internet, as illustrated in FIG. 2.

Processor 305 may also be operatively coupled to a storage device 334. Storage device 334 is any computer-operated hardware suitable for storing and/or retrieving data. In some embodiments, storage device 334 is integrated in server system 301. For example, server system 301 may include one or more hard disk drives as storage device 334. In other embodiments, storage device 334 is external to server system 301 and may be accessed by a plurality of server systems 301. For example, storage device 334 may include multiple storage units such as hard disks or solid state disks in a redundant array of inexpensive disks (RAID) configuration. Storage device 334 may include a storage area network (SAN) and/or a network attached storage (NAS) system.

In some embodiments, processor 305 is operatively coupled to storage device 334 via a storage interface 320. Storage interface 320 is any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 4:
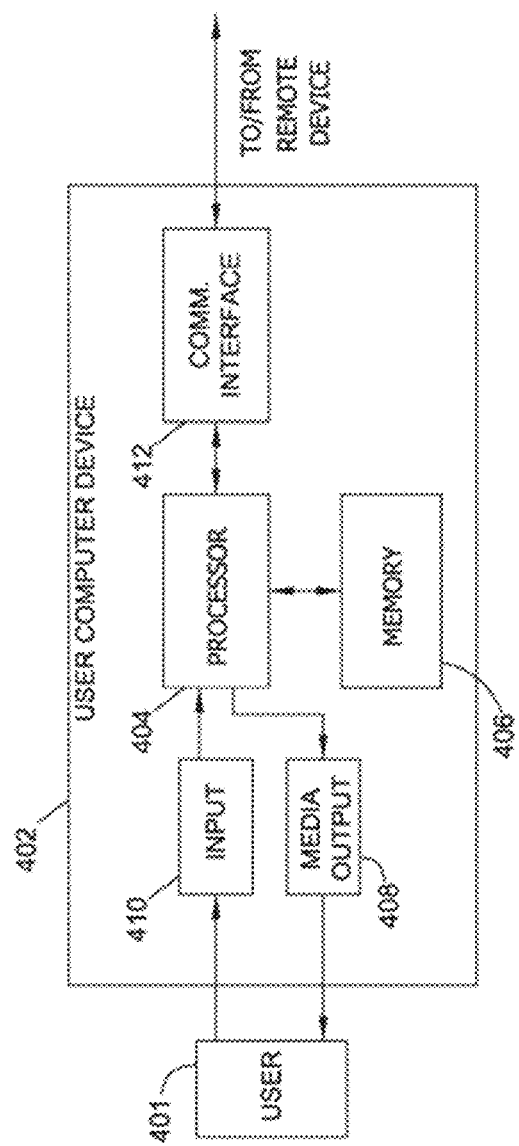

FIG. 4 illustrates an example configuration of a client computing device 402. Client computing device 402 may include, but is not limited to, cardholder computing device 102 (shown in FIG. 1). Client computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 400. Media output component 408 is any component capable of conveying information to user 400. In some embodiments, media output component 408 includes an output adapter such as a video adapter and/or an audio adapter. An output adapter is operatively coupled to processor 404 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 410 for receiving input from user 400. Input device 410 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 410.

Client computing device 402 may also include a communication interface 412, which is communicatively couplable to a remote device such as server system 301 or a web server operated by a merchant. Communication interface 412 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Figure 5:
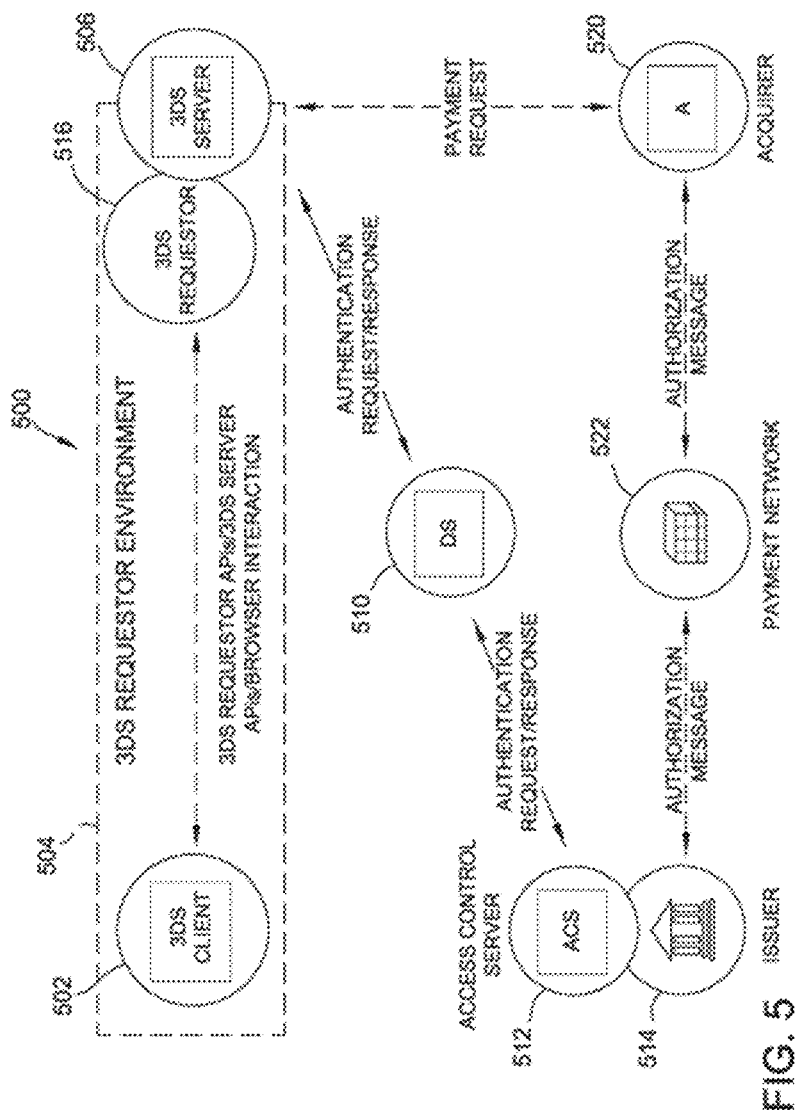

FIG. 5 is a schematic diagram illustrating transaction flow in an example authentication system 500 that uses the 3DS 2 Protocol (or subsequent versions of the 3DS Protocol) for authentication. Information regarding the 3DS Protocol, including the current version of the protocol, can be found at https://www.emvco.com. System 500 includes a directory server 510 that facilitates authenticating a cardholder for a transaction, as described herein. Directory server 510 may be operated, for example, by interchange network 28 (shown in FIG. 1).

A cardholder (e.g., cardholder 22, shown in FIG. 1) initiates a transaction (e.g., an online transaction) on a cardholder computing device 102 (shown in FIG. 2), such as, for example, a mobile computing device. During initiation of the transaction, the cardholder provides authentication data that will ultimately be used to authenticate the cardholder. In the exemplary embodiment, this authentication data includes form data that the cardholder fills in to make the purchase and scraped data, which is data about the cardholder, such as device details and browser details including device ID, IP address, device channel, etc.

The authentication data is transmitted from the cardholder computing device 102 to a 3DS client 502 within a 3DS requestor environment 504. The 3DS client 502 may be operated by a merchant (e.g., merchant 24, shown in FIG. 1). In some embodiments, 3DS client 502 is a part of merchant website 104 (shown in FIG. 2). 3DS client 502 collects, from the cardholder computing device 102, information necessary to authenticate the cardholder using the 3DS 2 Protocol, including the authentication data.

The 3DS client 502 collects information (including the authentication data) and transmits the collected information to a 3DS server 506 for inclusion in an authentication request message, also referred to herein as an AReq message. 3DS client 502 is also part of the 3DS requestor environment 504. 3DS client 502 and 3DS server 506 may communicate with one another, for example, using application programming interfaces (APIs) or browser interactions. In some embodiments, the 3DS server 506 is similar to data gathering computer device 106 (shown in FIG. 2).

Using the authentication data provided by the cardholder and other data collected within 3DS requestor environment 504, the 3DS server 506 generates the AReq message and transmits the AReq message to directory server 510, based on the payment processor associated with the transaction card being used in the transaction. In some embodiments, the directory server 510 is similar to the authentication server 112 (shown in FIG. 2). That is, different payment processors will generally have different directory servers for processing transactions. When generating the AReq message, 3DS server 506 formats the data for security purposes. In this embodiment, directory server 510 forwards the AReq message to an appropriate access control server (ACS) 512, based on the issuer of the payment card. In some embodiments, ACS 512 is similar to ACS 108 (shown in FIG. 2)

ACS 512 determines, based on the AReq message, whether authentication is required. Further, ACS 512 facilitates ensuring that any required authentication is properly carried out. ACS 512 performs these authentication operations on behalf of an issuer operating an issuer computing device 514.

In response to the AReq message, ACS 512 returns an authentication response (ARes) message to directory server 510, which directory server 510 in turn forwards to 3DS server 506. Before returning the ARes message, ACS 512 evaluates the data in the AReq message and performs risk-based authentication (RBA) on the transaction. Specifically, when ACS 512 determines that an explicit cardholder step-up authentication is not required (i.e., when the transaction is determined to be low risk), ACS 512 determines authentication is complete and returns an ARes indicating the same. If, however, ACS 512 determines that cardholder step-up authentication is required, ACS 512 initiates a step-up challenge request. The results of the step-up challenge requests are transmitted (in the ARes message), to 3DS server 506 (via directory server 510), and ultimately to the cardholder. If step-up authentication is required, ACS 512 controls the step-up authentication in accordance with methods used for cardholders of the issuer (e.g., biometric authentication, one time password (OTP) authentication, short message service (SMS) authentication, etc.). A 3DS requestor 516 included in 3DS requestor environment 504 controls how the various components interact with one another in the example embodiment.

After the authentication process is complete (i.e., after the 3DS Protocol is finished), if the cardholder is successfully authenticated, payment authorization for the transaction is undertaken. That is, the authentication using the 3DS 2 Protocol (or subsequent versions of the 3DS Protocol) occurs before payment authorization for the transaction.

For payment authorization, the merchant (e.g., using 3DS server 506) exchanges authorization data with an acquirer computing device 520 operated by an acquirer, such as merchant bank 26 (shown in FIG. 1) and a payment network 522, such as interchange network 28 (shown in FIG. 1). If appropriate, the merchant, acquirer, or payment network may submit an authorization request including information that indicates authentication occurred. Acquirer computing device 520 then processes the authorization with issuer computing device 514 and returns the authorization results to the merchant.

The 3DS 2 Protocol (and subsequent versions of the 3DS Protocol) provides a number of benefits to cardholders, issuers, and merchants. It reduces risk of unauthorized transactions through an approach that incorporates a rich, comprehensive set of data to make authentication decisions. For cardholders, it provides a simple, secure, and familiar online authentication experience, regardless of payment channel or device. For issuers, it allows for "frictionless" authentication, in which an explicit cardholder step-up authentication is not required or performed. This enables more intelligent risk assessment decisions and the ability to selectively challenge the cardholder as needed. This also improves cardholder experience and overall cardholder loyalty to issuers. For merchants, the 3DS 2 Protocol decreases fraud on all authenticated transactions, and increases revenue potential from reduced friction and reduced cart abandonment (i.e., cardholders deciding not to complete a transaction after they have already selected one or more items to be purchased), especially for mobile payment channels. This also improves cardholder experience and overall cardholder loyalty to merchants.

Using 3DS 2 Protocol (or subsequent versions of the 3DS Protocol), payment networks see 100% of all authentication requests globally on all cards on their brands. No other party, including issuers and ACS providers, is able to provide this global visibility. This global visibility may be leveraged to provide a consistent, standards-based risk analysis of transactions on behalf of issuers, enabling a market-wide risk-based authentication approach.

As compared to previous authentication methods (e.g., 3DS 1.0), the 3DS 2 Protocol (and subsequent versions of the 3DS Protocol) allows for approximately ten times the amount of transaction data to be gathered, analyzed, and utilized to prevent fraud. The additional data included in the 3DS Protocol increases data exchange between merchants and issuers, and improves risk-based authentication (RBA) decisioning. RBA allows issuers to examine every authentication request through transaction risk analysis, while focusing fraud prevention efforts on transactions that prevent the most risk. Further, RBA utilizes both behavioral and transactional inputs in conjunction with a risk engine to determine riskiness of a transaction.

Transactions deemed safe or low risk are silently authenticated (i.e., so-called "frictionless" authentication), while higher risk transactions are subjected to step-up authentication. When a low risk transaction is silently authenticated, so much data has already been gathered that further authentication adds little to no value. Accordingly, RBA effectively replaces the need for an explicit interaction with the cardholder for every transaction, but transactions are still fully authenticated, with liability resting with the issuer. Thus, more transactions are completed with minimal cardholder disruption, aiding e-commerce growth.

One goal of RBA is to minimize the number of transactions that require active (i.e., step-up) authentication, while keeping fraud to a minimum and improving consumer friction points during the transaction process. With RBA, the information gathered enables transaction scoring and classification into low, medium, and high risk, allowing the issuer and ACS 512 to take appropriate action.

The 3DS 2 Protocol (and subsequent versions of the 3DS Protocol) enables a market-wide level risk analysis of all transactions that reach directory server 510. Each transaction can be scored and/or flagged based on the global data available using the 3DS 2 Protocol (and subsequent versions of the 3DS Protocol). Additionally, the payment processor operating the directory server 510 has the ability to see cardholder activity across the digital and physical domains, and can utilize this expanded view to improve scoring. In contrast, traditional authentication service providers may only address the digital domain. For example, a payment processor could indicate if a particular device is associated with fraud, and flag that device for issuers in future transactions. The issuer may then reject transactions involving that device or prompt for additional authentication (e.g., through two-factor authentication).

The following Table 2 lists a number of the data elements that are used in the 3DS 2 Protocol for authentication. For example, at least some of these data elements may be included in the authentication data included in the AReq sent to directory server 510. The eighteen data elements that are also part of the 3DS 1.0 Protocol are bolded in Table 2. Those of skill in the art will appreciate that the number of rich data elements could grow beyond those listed below (e.g., in future versions of the 3DS Protocol), and could include over one hundred and seventy data elements. Further, an app-based transaction (e.g., carried out using a mobile computing device) could provide even more data elements than browser-based transactions. In addition, a transaction performed using an Android device could have over one hundred and thirty additional elements.

TABLE 2

| | Data Element |
|---|---|
| 1 | 3DS Requestor Authentication Information |
| 2 | 3DS Requestor Challenge Indicator |
| 3 | 3DS Requestor ID |
| 4 | 3DS Requestor Initiated Indicator |
| 5 | 3DS Requestor Name |
| 6 | 3DS Requestor Non-Payment Authentication Indicator |
| 7 | 3DS Requestor Prior Transaction Authentication Information |
| 8 | 3DS Requestor URL |
| 9 | 3DS Server Operator ID |
| 10 | 3DS Server Reference Number |
| 11 | 3DS Server Transaction ID |
| 12 | 3DS Server URL |
| 13 | Account Type |
| 14 | Acquirer BIN |
| 15 | Acquirer Merchant ID |

TABLE 2-continued

| | Data Element |
|---|---|
| 16 | ACS Challenge Mandated Indicator |
| 17 | ACS Counter ACS to SDK |
| 18 | ACS HTML |
| 19 | ACS Operator ID |
| 20 | ACS Reference Number |
| 21 | ACS Rendering Type |
| 22 | ACS Signed Content |
| 23 | ACS Transaction ID |
| 24 | ACS UI Type |
| 25 | Address Match Indicator |
| 26 | Authentication Method |
| 27 | Authentication Type |
| 28 | Authentication Value |
| 29 | Browser Accept Headers |
| 30 | Browser IF Address |
| 31 | Browser Java Enabled |
| 32 | Browser Language |
| 33 | Browser Screen Color Depth |
| 34 | Browser Screen Height |
| 35 | Browser Screen Width |
| 36 | Browser Time Zone |
| 37 | Browser User-Agent |
| 38 | Card/Token Expiry Date |
| 39 | Cardholder Account Identifier |
| 40 | Cardholder Account Information |
| 41 | Cardholder Account Number |
| 42 | Cardholder Billing Address City |
| 43 | Cardholder Billing Address Country |
| 44 | Cardholder Billing Address Line 1 |
| 45 | Cardholder Billing Address Line 2 |
| 46 | Cardholder Billing Address Line 3 |
| 47 | Cardholder Billing Address Postal Code |
| 48 | Cardholder Billing Address State |
| 49 | Cardholder Email Address |
| 50 | Cardholder Home Phone Number |
| 51 | Cardholder Mobile Phone Number |
| 52 | Cardholder Name |
| 53 | Cardholder Shipping Address City |
| 54 | Cardholder Shipping Address Country |
| 55 | Cardholder Shipping Address Line 1 |
| 56 | Cardholder Shipping Address Line 2 |
| 57 | Cardholder Shipping Address Line 3 |
| 58 | Cardholder Shipping Address Postal Code |
| 59 | Cardholder Shipping Address State |
| 60 | Cardholder Work Phone Number |
| 61 | Challenge Additional Information Text |
| 62 | Challenge Cancelation Indicator |
| 63 | Challenge Data Entry |
| 64 | Challenge HTML Data Entry |
| 65 | Challenge Information Header |
| 66 | Challenge Information Label |
| 67 | Challenge Information Text |
| 68 | Challenge Information Text Indicator |
| 69 | Challenge Selection Information |
| 70 | Challenge Window Size |
| 71 | Device Channel |
| 72 | Device Information |
| 73 | Device Rendering Options Supported |
| 74 | DS Reference Number |
| 75 | DS Transaction ID |
| 76 | DS URL |
| 77 | Electronic Commerce Indicator |
| 78 | EMV Payment Token Indicator |
| 79 | Expandable Information Label 1 |
| 80 | Expandable Information Text 1 |
| 81 | Instalment Payment Data |
| 82 | Interaction Counter |
| 83 | Issuer Image |
| 84 | Merchant Category Code |
| 85 | Merchant Country Code |
| 86 | Merchant Name |
| 87 | Merchant Risk Indicator |
| 88 | Message Category |
| 89 | Message Extension |
| 90 | Message Type |
| 91 | Message Version Number |
| 92 | Notification URL |
| 93 | OOB App Label |

TABLE 2-continued

| | Data Element |
|---|---|
| 94 | OOB App URL |
| 95 | OOB Continuation Indicator |
| 96 | OOB Continuation Label |
| 97 | Payment System Image |
| 98 | Purchase Amount |
| 99 | Purchase Currency |
| 100 | Purchase Currency Exponent |
| 101 | Purchase Date & Time |
| 102 | Recurring Expiry |
| 103 | Recurring Frequency |
| 104 | Resend Challenge Information Code |
| 105 | Resend Information Label |
| 106 | Results Message Status |
| 107 | SDK App ID |
| 108 | SDK Counter SDK to ACS |
| 109 | SDK Encrypted Data |
| 110 | SDK Ephemeral Public Key (Qc) |
| 111 | SDK Reference Number |
| 112 | SDK Transaction ID |
| 113 | Submit Authentication Label |
| 114 | Transaction Status |
| 115 | Transaction Status Reason |
| 116 | Transaction Type |
| 117 | Why Information Label |
| 118 | Why Information Text |

As explained above, in the embodiment shown in FIG. 5, ACS 512 performs authentication using RBA capabilities. However, many ACS providers that are issuer processors for authentication do not have RBA capabilities. Further, ACS providers with RBA capabilities may temporarily lose those capabilities (e.g., due to equipment malfunction). In light of the above-described advantages of the 3DS 2 Protocol (and subsequent versions of the 3DS Protocol), ACS providers without RBA capabilities risk losing customers to other ACS providers that have this capability. Accordingly, it would be desirable to facilitate 3DS 2 Protocol (and subsequent versions of the 3DS Protocol) authentication for ACS providers that do not have RBA capabilities.

Figure 6:
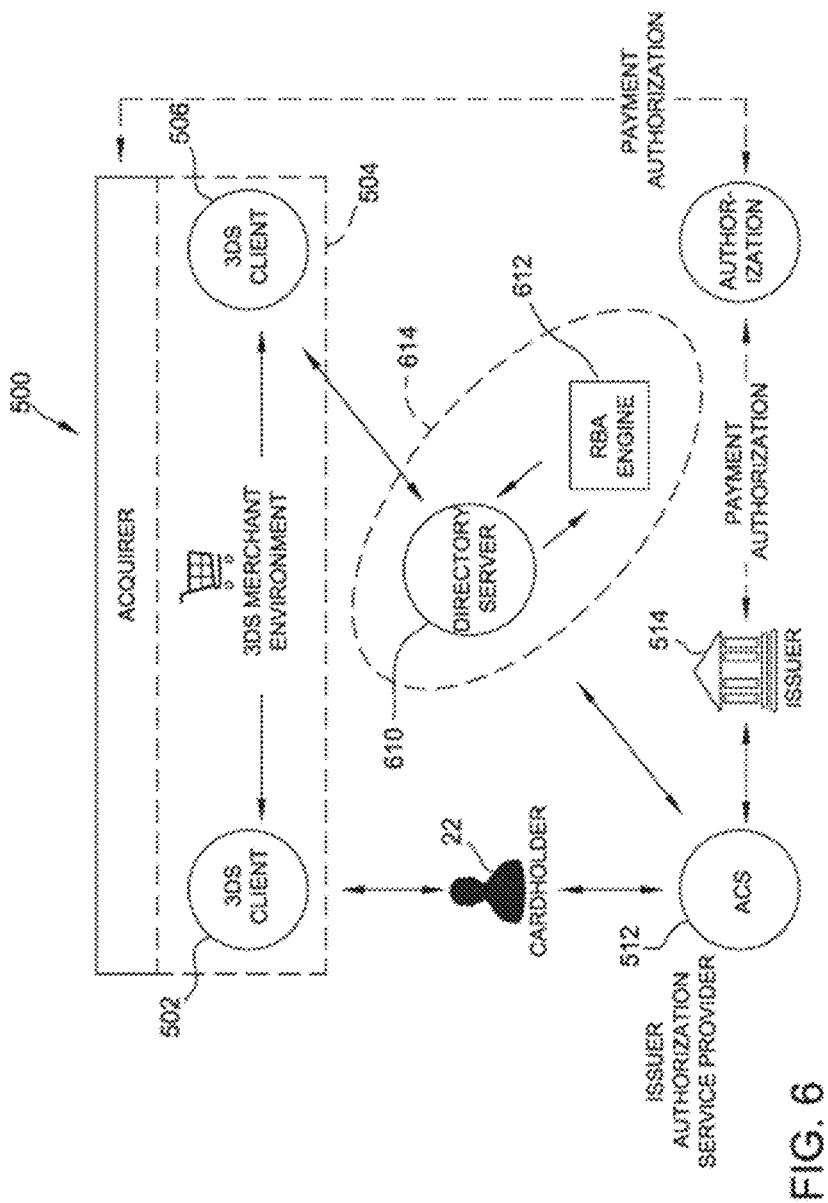

FIG. 6 is a schematic diagram illustrating transaction flow in another example authentication system 600 that uses the 3DS 2 Protocol (or subsequent versions of the 3DS Protocol) for authentication, and that performs RBA on behalf of ACS providers that are unable to perform RBA. Unless otherwise indicated, components of authentication system 600 are substantially similar to those of authentication system 500 (shown in FIG. 5).

Instead of directory server 510, authentication system 600 includes an RBA-enabled directory server 610 communicatively coupled to a RBA engine 612 (which may be collectively referred to as an authentication platform 614). RBA-enabled directory server 610 and RBA engine 612 facilitate performing RBA behalf of ACS providers, as described herein. RBA-enabled directory server 610 and RBA engine 612 may be operated, for example, by interchange network 28 (shown in FIG. 1). In some embodiments, authentication platform 614 is similar to RBA platform 34 (shown in FIG. 1) and authentication server 112 (shown in FIG. 2).

As in authentication system 500, RBA-enabled directory server 610 receives an AReq message from 3DS server 506. However, instead of immediately forwarding the AReq message to ACS 512, RBA-enabled directory server 610 transmits at least some of the data in the AReq message (e.g., the authentication data) to RBA engine 612.

In the example embodiment, RBA engine 612 analyzes the data in the AReq message to generate RBA result data. For example, RBA engine 612 may compare the data in the AReq message to one or more long term variables ("LTV").

The one or more LTV may include historical authentication data associated with the PAN at issue, historical authorization data associated with the PAN, other historical data associated with the PAN, etc. The LTV may be associated with both card present and card not present historical transactions. For example, the LTV may include cardholder shipping address, cardholder billing address, cardholder email address, cardholder phone number, merchant name, merchant category, merchant location, and/or at least one environment-related variable (e.g., device details, browser details) including device ID, IP address, device channel, etc. Further, the LTV may be stored in a database accessible by RBA engine 612 and operated by interchange network 28. In some embodiments, the LTV data will be hashed prior to storing to protect the security of this personally identifiable information.

In addition, the data in the AReq message may also be compared to other parameters. For example, to monitor consistency and changes in behavior, the data may be compared to short term (e.g., on the order of minutes, hours, or days) PAN velocities and ratios, including velocities and ratios of PAN authorization and authentication. This may include comparing to recent transaction frequency, amount spent, declines, historical risk scores, etc. Alternatively, the data in the AReq message may be analyzed using any suitable techniques to generate RBA result data, as described herein.

In the example embodiment, the RBA result data generated by RBA engine 612 includes a risk score, a risk analysis, and at least one reason code. The risk score is a score representing a determined riskiness of the transaction, with lower scores indicating lower risk and higher scores indicating higher risk. In other words, the risk score represents a likelihood that the suspect cardholder (e.g., the person attempting to perform a transaction) is the legitimate cardholder having the privileges to use the payment card to perform a payment transaction. For example, the risk score may be represented by a number from 0-999 and/or by a risk threshold category from 0-19. In some embodiments, risks assessments that will be shared, such as through the authorization field of one or more messages will be quantified on a scale of 0-9. Those of skill in the art will appreciate that any suitable risk score may be used.

The risk analysis is a description of a level of risk corresponding to the risk score (e.g., low risk, medium risk, or high risk). Further the reason codes include one or more factors that influenced the risk score. In some embodiments, the reason codes are affected by rules and/or a combination of the rules and the model. RBA engine 612 transmits the RBA result data to RBA-enabled directory server 610.

In some embodiments, the reason codes are generated based on a plurality of reason code categories and associated anchors. In some embodiments, the reason codes are affected by rules and/or a combination of the rules and the model. Specifically, different categories are established, and each category is associated with a plurality of activatable anchors, as described herein. Based on the analysis of the data in the AReq message, RBA engine 612 may activate one or more anchors. The reason codes are then generated based on which anchors (and how many anchors) are activated. In some embodiments, the reason codes are affected by rules and/or a combination of the rules and the model.

For example, in one embodiment, three risk code categories are established: cardholder, merchant, and environment. In this example, the cardholder category is associated with five anchors (shipping address, PAN, billing address, email, and phone), the merchant category is associated with three anchors (merchant name, merchant category, and merchant country), and the environment category is associated with three anchors (device info, IP address, and device channel). Those of skill in the art will appreciate that additional and/or alternative anchors may be established.

Based on analysis of the data in the AReq message, RBA engine 612 may activate at least one anchor. For example, for the cardholder category, if RBA engine 612 determines that a shipping address for the transaction has been used with the PAN in past transactions and/or the shipping address is unchanged from prior transaction, RBA engine 612 may activate the shipping address anchor. Further, RBA engine 612 may activate the PAN anchor of the cardholder category if the PAN has had successful authentications in past transactions.

For the merchant category, one or more anchors may be activated based fraud rates for the merchant, decline rates for the merchant, and non-cleared transaction rates for the merchant. Further, one or more anchors may be activated when RBA engine 612 determines the merchant category and merchant location for the transaction are consistent with historical transactions for that merchant.

For the environment category, the IP address anchor may be activated if the IP address is known and is not on a list of "bad" IP addresses. Further, the device anchor may be activated if the device is known and is not on a list of "bad" devices, the device has had successful authentications in past transactions, and/or the device has scored well in past transactions.

The following are some additional examples of criteria for activating anchors for the different categories. In one example, the shipping address anchor is activated if the shipping address has been used with the PAN in past transactions, the shipping address is the same as the billing address on file, the shipping address is not on a list of "bad" shipping addresses, and the shipping address is unchanged from a prior transaction. In a second example, the shipping address anchor, the billing address anchor, and the PAN anchor (i.e., all anchors for the cardholder category) are activated when the shipping address is consistent with previous transactions, the billing address is consistent with previous transactions, the PAN has historical positive association with the cardholder, and the purchase amount, date, and time are consistent with previous transactions. In a third example, anchors for both the cardholder category and the merchant category are activated when the contact information for the cardholder is consistent with previous transactions, the cardholder is a trusted cardholder, the merchant is a trusted merchant, and the PAN shows established activity and authentication history at the merchant. Those of skill in the art will appreciate that the anchors may be activated based on any suitable conditions.

The reasons codes are generated based on the activated anchors, and are loosely structured in a hierarchical order based on connections between anchors in different categories. For example, if at least one anchor in the cardholder category is activated, a positive reason code (i.e., indicating relatively low risk) is generated. If, instead, at least one anchor in the cardholder category is activated and at least one anchor in the merchant category is also activated, a stronger positive reason code related to both categories is generated. Similarly, if at least one anchor in the cardholder category is activated, at least one anchor in the merchant category is activated, and at least one anchor in the environment category is activated, an even stronger positive reason code related to all three categories is generated.

The following Table 3 lists of number of example reason codes. However, those of skill in the art will appreciate that additional and/or alternative reason codes may be utilized in accordance with the embodiments described herein.

TABLE 3

| Code | Reason Code Name | Description and Comments |
| --- | --- | --- |
| A | Risk Event-Suspicious Account Activity | Merchant or payment network has detected suspicious activity with cardholder's account |
| B | Risk Event-Unknown Device/Account Relationship | Merchant or payment network has not established a relationship between the device and account |
| C | Risk Event-Device or Profile Information associated with fraud event | The device used for the transaction or the user's profile has been associated with a fraud event |
| D | Risk Event-Recent High Risk Change to Device or Profile Information | The device used for the transaction or the user's profile has recently had a high risk change |
| E | Risk Event-Recent change to Device or Profile Information | The device used for the transaction or the user's profile has recently changed |
| F | Risk Event-PAN associated with fraud event | Merchant or payment network has detected fraud associated with the PAN used for this transaction |
| G | New Account or Insufficient Data | This is a new account with the merchant (or new cardholder details to payment network) or there is insufficient data for this cardholder |
| H | Merchant/Acquirer: Merchant (fraud) risk high (assessed by payment network) | Payment network has determined that the merchant is submitting transactions with a high rate of fraud |
| I | Merchant/Acquirer: Merchant (fraud) risk low (assessed by payment network) | Payment network has determined that the merchant is submitting transactions with a higher rate of fraud than average |
| J | Environment: Good/Known IP | Merchant or payment network is familiar with the IP address where the transaction is happening and has assessed that it is a good, trusted IP |
| K | Cardholder: Billing address-prior history established | Merchant or payment network has established a positive association |

TABLE 3-continued

| Code | Reason Code Name | Description and Comments |
|---|---|---|
| | | between the cardholder and this billing address |
| L | Cardholder: Email address-prior history established | Merchant or payment network has established a positive association between the cardholder and this email address. |
| M | Cardholder: Phone number-prior history established | Merchant or payment network has established a positive association between the cardholder and this phone number. |
| N | Cardholder: Shipping address-prior history established | Merchant or payment network has established a positive association between the cardholder and this shipping address. |
| O | Cardholder: Card number (PAN) behavior established high trust in the current transaction | Merchant or payment network has established high trust in the transaction based on historical PAN behavior |
| P | Environment: Device known | Merchant or payment network has seen the device used for the transaction before, but this account might not be established on device |
| Q | Environment: Account established on Device | Merchant or payment network has seen this account transaction on this device AND account has been authenticated on the device |
| R | Environment: Session-Trusted/normal/ innocent session (no man in the middle attack/no bot, not suspicious account activity) | Merchant or payment network determines quality of the session |
| S | More than one cardholder category anchor established | Merchant or payment network has established multiple cardholder category anchors |
| T | More than one merchant category anchor established | Payment network has established multiple merchant category anchors |
| U | More than one environment category anchor established | Merchant or payment network has established multiple environment category anchors |
| V | Co-occurring: established link between cardholder and merchant | Merchant or payment network has established linkages across cardholder and merchant categories |
| W | Co-occurring: established link between cardholder and environment | Merchant or payment network has established linkages across cardholder and environment categories |
| X | Co-occurring: established link between merchant and environment | Payment network has established linkages across merchant and environment categories |
| Y | All three categories established | Payment network has established linkages across cardholder, merchant, and environment categories |
| Z | Most Trusted (Reserved for future use) | Reserved for future use |

After RBA engine 612 generates the RBA result data (including the reason codes), RBA-enabled directory server 610 embeds the RBA result data into the AReq message to generate an enhanced AReq message. For example, in some embodiments, the RBA result data is appended to the AReq message as an extensible markup language (XML) extension of the AReq message. For example, the extension may have the following format:

```
"name": "ACS RBA",
"id": "A000000004-acsRBA",
"criticalityIndicator" : "true",
"data": {
    "status": "success",
    "score" : "150",
    "decision": "low risk",
    "reasonCode1":"Y",
    "reasonCode2":"J"}
``` where "score" is the risk score, "decision" is the risk analysis, and "reasonCode1" and "reasonCode2" are the reason codes. In the exemplary embodiment, the reason codes are transmitted as a single letter each. In other embodiments, the reason codes may be represented in different methods. In some embodiments, reasonCode2 is transmitted by the merchant to provide the merchant's assessment of the transaction. Alternatively, the RBA result data may be embedded into the AReq message to generate an enhanced AReq message using any suitable process.

The enhanced AReq message is then transmitted from RBA-enabled directory server 610 to ACS 512. ACS 512 then analyzes the RBA result data in the enhanced AReq message to make an authentication decision. That is, in the example embodiment, ACS 512 may determine to fully authenticate the transaction, deny authentication for the transaction, or perform additional authentication (e.g., by issuing a step-up challenge to the cardholder) for the transaction, based on at least one of the risk score, the risk analysis, and the reason codes. Accordingly, ACS 512 does not perform the RBA analysis, but is still able to leverage the results of that analysis to make an authentication decision (e.g., by using the results in their own fraud analysis platform), generally resulting in more approvals with less fraud. Thus, RBA-enabled directory server 610 and RBA engine 612 perform the RBA analysis on behalf of ACS 512. In some embodiments, the ACS 512 receives authentication data from a plurality of sources.

In some embodiments, when the determined riskiness of the transaction is low enough, instead of generating and transmitting an enhanced AReq message to ACS 512, RBA-enabled directory server 610 fully authenticates the transaction itself. Specifically, when the determined riskiness of the transaction is low enough, RBA-enabled directory server 610 automatically generates an ARes that indicates the transaction has been fully authenticated, and transmits the ARes message to 3DS server 506. RBA-enabled directory server 610 determines that the riskiness of the transaction is low by comparing at least one of the risk score and the risk analysis to a predetermined threshold. The predetermined threshold may be specified, for example, by ACS 512. Accordingly ACS 512 is able to control which transactions will be fully authenticated without all transactions being forwarded to ACS 512.

Bypassing ACS 512 for low risk transactions reduces the overall message volume on the payment network. This in turn frees up network resources, improving transmission speed and overall capability of the payment network. Furthermore, in some embodiments, RBA-enabled directory server 610 determines if ACS 512 is available. In some situations, ACS 512 may be off-line or unavailable. If the ACS 512 is available, then the RBA-enabled directory server 610 may route the enhanced AReq message including the RBA result data to the ACS 512. If the ACS 512 is not available, RBA-enabled directory server 610 may perform the authentication processing.

Figure 7:
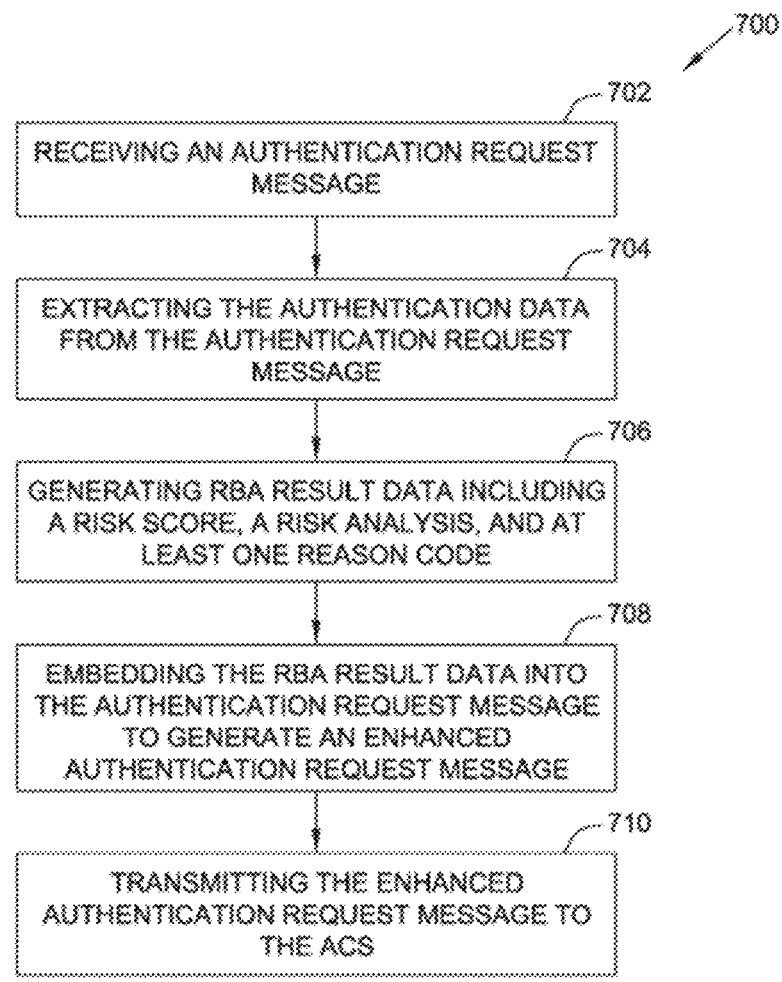

FIG. 7 is a flow diagram of an example method 700 for authenticating an online user on behalf of an access control server (ACS). Method 700 may be implemented, for example, using authentication platform 614 (shown in FIG. 6). Method 700 includes receiving 702 an authentication request message, the authentication request message includes authentication data. Method 700 further includes extracting 704 the authentication data from the authentication request message. Method 700 further includes 706 generating, based at least in part on the extracted authentication data, RBA result data including a risk score, a risk analysis, and at least one reason code. In addition, method 700 includes embedding 708 the RBA result data into the authentication request message to generate an enhanced authentication request message. Further, method 700 includes transmitting 710 the enhanced authentication request message to the ACS to enable the ACS to make an authentication decision based on the RBA result data.

Figure 8:
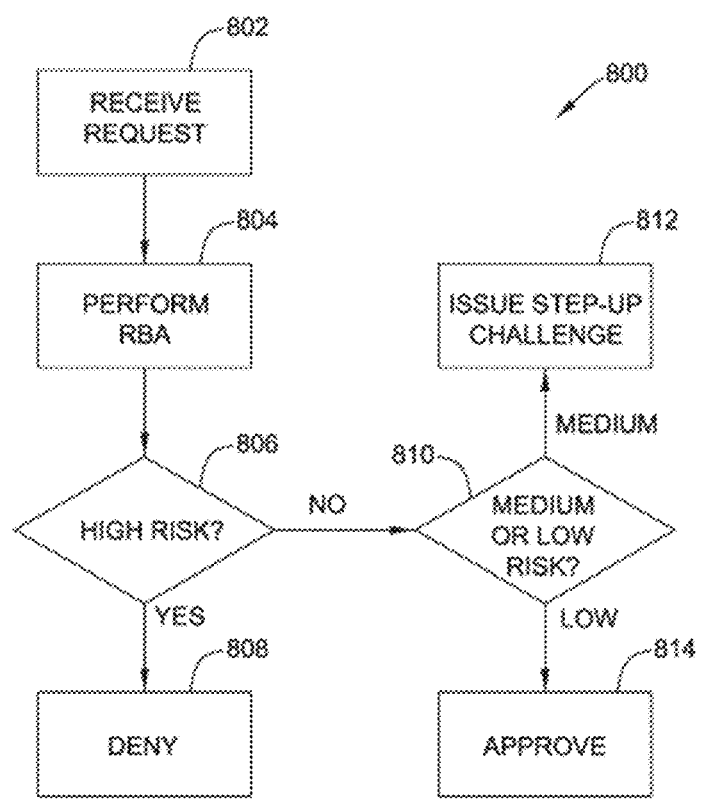

FIG. 8 is a flow diagram of another example method 800 for authenticating an online user. Method 800 may be implemented, for example, using authentication platform 614 (shown in FIG. 6).

In the example embodiment, authentication platform 614 receives 802 an authentication request message including authentication data, as described herein. Authentication platform 614 performs 804 RBA to generate RBA result data including a risk score, a risk analysis, and at least one reason code. The risk score is a score representing a determined riskiness of the transaction, with lower scores indicating lower risk and higher scores indicating higher risk. In other words, the risk score represents a likelihood that the suspect cardholder (e.g., the person attempting to perform a transaction) is the legitimate cardholder having the privileges to use the payment card to perform a payment transaction. For example, the risk score may be represented by a number from 0-999 and/or by a risk threshold category from 0-19. For another example, the risk score is represented between 0 and 950 in twenty increments of 50 (i.e., the potential risk scores are 0, 50, 100, 150, . . . , 950). In some embodiments, risks assessments that will be shared, such as through the authorization field of one or more messages will be quantified on a scale of 0-9. The risk analysis is a description of a risk level corresponding to the risk score (e.g., low risk, medium risk, or high risk). The reason codes include one or more factors that influenced the risk score.

In the example embodiment, authentication platform 614 compares the RBA result data to a stored authentication profile. The authentication profile contains a plurality of rules for the processing of authentication requests. In some embodiments, the authentication profile is provided by the issuer computing device 514 (shown in FIG. 5). Examples of the rules include, but are not limited to, how to proceed when the ACS 512 (shown in FIG. 5) is unavailable, information to include in the RBA, risk level thresholds for the risk score and risk levels, decision making risk thresholds, and specialized rules (such as all cross-border transactions are to be submitted to the ACS 512). The authentication profile is stored at the RBA platform 34, and can be accessed whenever a risk score is determined.

In the example embodiment, authentication platform 614 compares the RBA result data to the authentication profile to determine the risk level associated with the transaction associated with the authentication request. In some embodiments, authentication platform 614 compares the risk score to one or more thresholds in the authentication profile to determine the risk level associated with the transaction. In other embodiments, authentication platform 614 compares the risk analysis, the reason codes, and/or any other combination of data from the RBA result data and potentially some or all of the authentication data to the authentication profile to determine the risk level associated with this transaction. For example, a risk score of 350 or less may be considered low risk, a risk score above 350 and less than 850 may be considered medium risk, and a risk score above 850 may be considered high risk. Those skilled in the art will appreciate that any suitable risk score thresholds and any number of risk levels may be used.

In the example embodiment, authentication platform 614 determines 806 if the risk level is high risk. For example, authentication platform 614 may determine 806 that the transaction is clearly fraudulent. In which case, authentication platform 614 fails the authentication, i.e., denies 808 full authentication of the transaction. Authentication platform 614 transmits an authentication response (ARes) message indicating the failed authentication to 3DS server 506 (shown in FIG. 5). The 3DS server 506 may transmit the Ares message indicating the failed authentication to the merchant, and the merchant may determine whether or not to proceed with the authorization process in the absence of full authentication. In these embodiments, where the merchant begins the authorization process after having received the indication of the failed authentication, the merchant assumes the risk for the transaction if it is authorized by the issuer.

When authentication platform 614 determines the transaction is clearly fraudulent, authentication platform 614 denies the transaction without sending on authentication data (e.g., to the ACS and/or issuer). Specifically, authentication platform 614 fails the authentication and communicates the failure to the authentication requestor in the ARes message. Based on this failure, the merchant should not then submit the transaction for authorization, thus terminating the transaction. Accordingly, because the transaction is denied during authentication (and prior to authorization), no authorization messages are sent over the payment processing network. This protects the security of the payment processing network, because the payment processing network is never exposed to authorization data associated with the fraudulent transaction. Further, authentication platform 614 may notify the issuer and/or merchant that the transaction was clearly fraudulent, enabling the issuer and/or merchant to take appropriate action (e.g., flagging the associated account number and/or cardholder).

In some cases, authentication platform 614 determines 810 that the transaction is medium risk or low risk. If the transaction is low risk, authentication platform 614 may fully authenticate 814 the transaction and transmit an authentication response (ARes) message indicating the full authentication to 3DS server 506, where at least one of the 3DS server 506 and the merchant may initiate the authorization process. If the transaction is medium risk, authentication platform 614 may issue 812 a step-up challenge to the cardholder 22 (shown in FIG. 1). Based on the results of the step-up challenge, authentication platform 614 may fully authenticate, or otherwise deny full authentication, of the transaction. In some embodiments, if the transaction is medium risk, authentication platform 614 transmits the RBA result data to ACS 512, so that the ACS 512 will perform the step-up challenge. In other embodiments, authentication platform 614 may take different steps at different risk levels and have additional or fewer risk levels to analyze based on the authentication profile.

Figure 9:
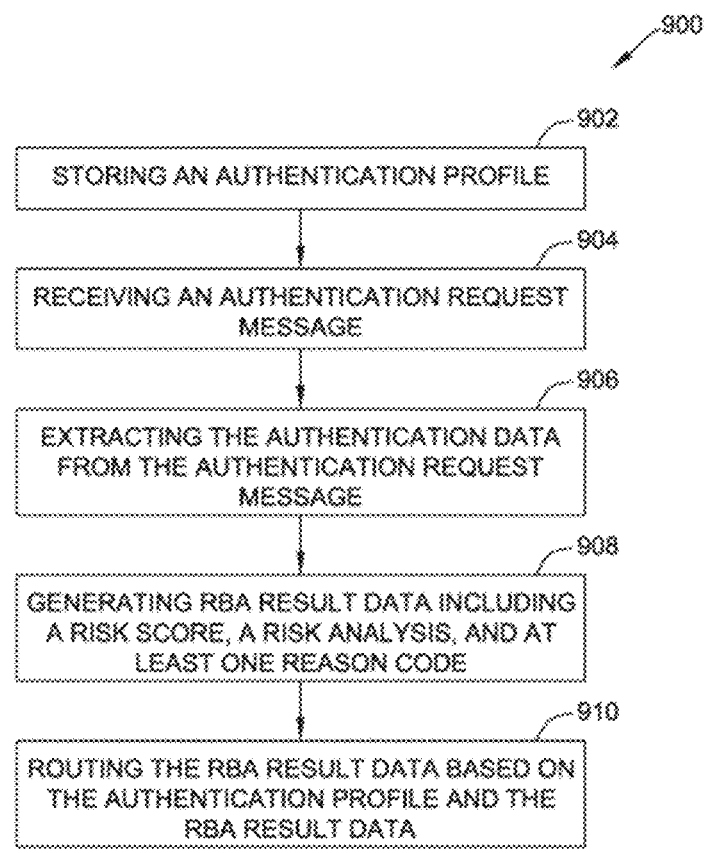

FIG. 9 is a flow diagram of another example method 900 for authenticating an online user. Method 900 may be implemented, for example, using authentication platform 614 (shown in FIG. 6). Method 900 includes storing 902 an authentication profile. The authentication profile contains a plurality of rules for the processing of authentication requests. The method 900 also includes receiving 904 an authentication request message, the authentication request message includes authentication data. Method 900 further includes extracting 906 the authentication data from the authentication request message. Method 900 further includes generating 908, based at least in part on the extracted authentication data, RBA result data including a risk score, a risk analysis, and at least one reason code. In addition, method 900 includes routing 910 the RBA result data based on the authentication profile and the RBA result data.

In some embodiments, the authentication platform 614 transmits the RBA result data to a source of the authentication request message, such as the 3DS server 506 (shown in FIG. 5). For example, in some embodiments, a merchant operating the 3DS server 506 may request and receive the RBA result data, including a risk score, a risk analysis, and at least one reason code as described herein. The merchant may use the RBA result data to update the merchant's own risk models, and may also compare the RBA result data to risk analysis results generated independently by the merchant to determine whether the RBA result data is generally consistent with the merchant-generated risk analysis results.

In some embodiments, the authentication request message is associated with an online payment card transaction. The authentication profile is associated with an issuer bank 30 (shown in FIG. 1). And the source of the authentication request message is the issuer computing device 514 (shown in FIG. 5). Accordingly, in some embodiments, the authentication platform 614 transmits the RBA result data directly to the issuer computing device 514, and handles authentication with the issuer computing device 514. For example, the issuer bank 30 may enroll a range of card numbers with the authentication platform 614, and request that the authentication platform 614 work directly with the issuer computing device 514 for authentication of transactions involving card numbers in the enrolled range.

In some embodiments, the authentication platform 614 determines whether an access control server (ACS) 512 (shown in FIG. 5) is available. If the ACS 512 is available, the authentication platform 614 embeds the RBA result data into the authentication request message to generate an enhanced authentication request message. The authentication platform 614 transmits the enhanced authentication request message to the ACS 512 to enable the ACS 512 to make an authentication decision based on the RBA result data. If the ACS 512 is unavailable, the authentication platform 614 generates an authentication decision based on the RBA result data and the authentication profile.

In some further embodiments, the authentication platform 614 determines a risk level based on the RBA result data and the authentication profile. In some of these embodiments, the risk level includes at least a low risk, a medium risk and a high risk for the transaction associate with the authentication request. In these embodiments, the authentication platform 614 transmits an authentication approval message to the 3DS server 506, if the risk level is low.

If the risk medium, the authentication platform 614 transmits a step-up challenge to the online user 22 (shown in FIG. 1) if the risk level is medium. The authentication platform 614 receives a response to the step-up challenge from the online user 22. The authentication platform 614 determines an authentication decision based on the response to the step-up challenge and the RBA result data. In some other embodiments, if the risk is medium, the authentication platform 614 transmits the RBA result data to the ACS 512 if the risk level is medium. The ACS 512 performs the step-up challenge with the online user 22.

If the risk is high, the authentication platform 614 transmits an authentication-failed message to the 3DS server 506.

Figure 10:
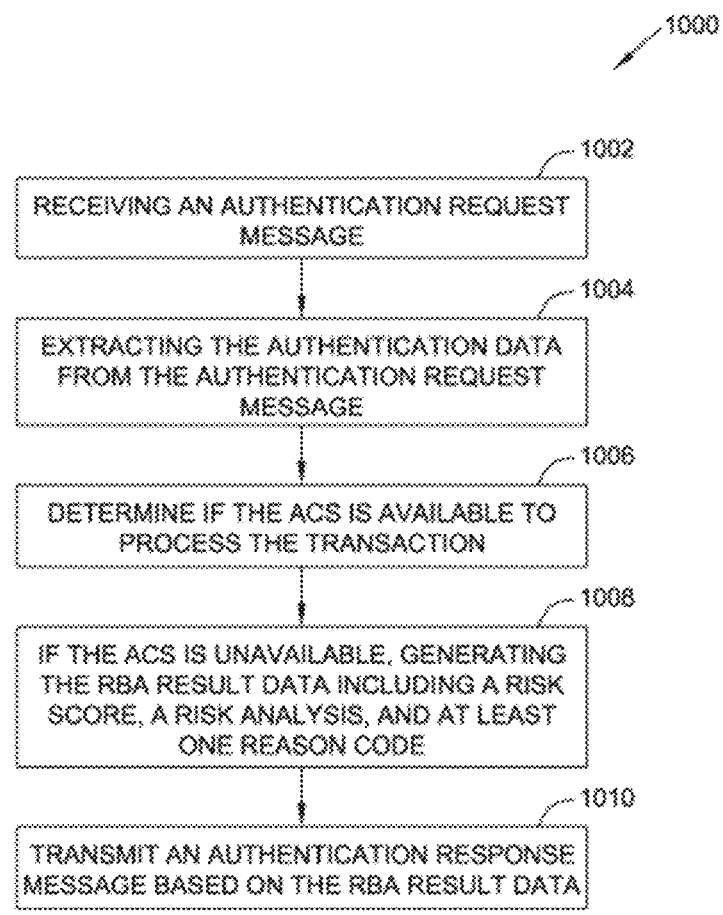

FIG. 10 is a flow diagram of a further example method 1000 for authenticating an online user on behalf of an access control server (ACS) 512 (shown in FIG. 5). Method 1000 may be implemented, for example, using authentication platform 614 (shown in FIG. 6). Method 1000 includes receiving 1002 an authentication request message for a transaction. The authentication request message includes authentication data. The method 1000 also includes extracting 1004 the authentication data from the authentication request message. The method 1000 further includes determining 1006 if the ACS 512 is available to process the transaction. If the ACS 512 is unavailable, the method includes generating 1008, based at least in part on the extracted authentication data, risk-based authentication (RBA) result data including a risk score and at least one reason code that indicates at least one factor that influenced the generated risk score. If the ACS 512 is unavailable, the method also includes transmitting 1010 an authentication response message based on the RBA result data. In some embodiments, the authentication platform 614 generates an authentication decision based on the RBA result data and embeds the authentication decision in the authentication response message.

In the example embodiment, transactions are categorized "merchant only" or "fully authenticated." "Fully authenticated" transactions are generally considered to be low risk transactions that have been authenticated. "Merchant only" transactions are more risky transactions. In some embodiments, "merchant only" transactions have been authenticated. In the example embodiment, one or more indicators in the authentication response indicate whether a transaction is "merchant only" or "fully authenticated." One or more indicators may also indicate whether or not authentication was attempted on the transaction. This information is used by the merchant to determine whether or not to begin the authorization process for the transaction. In some embodiments, this information is also stored in the database 120 (shown in FIG. 2) and is referred to by at least one of the interchange network 28 and the issuer bank 30 during the authorization process 20 (all shown in FIG. 1).

In the example embodiment, the authentication platform 614 performs the authentication process on the transaction, including RBA. This analysis is based on a machine learning model where, over time, the authentication platform 614 is capable of improving its ability to determine the risk level associated with transactions. The authentication platform 614 analyzes transactions that are authenticated by the ACS 512 and compares these transactions with historical data to generate a risk model for each issuer bank 30. By comparing the data points in each transaction, the risk model will indicate the amount of risk associated with each transaction based on the authentication data in the corresponding authentication requests. This allows the authentication platform 614 to analyze transactions when the ACS 512 is unavailable and perform authentication on these transactions to provide a response to the authentication request. Accordingly, the authentication platform 614 may determine that a received authorization request is substantially similar to a previous transaction that the ACS 512 scored at low risk. Thus allowing the authentication platform 614 to determine that the received transaction is low risk with a degree of certainty.

In some embodiments, the authentication platform 614 determines whether or not the ACS 512 available by transmitting the authentication request message to the ACS 512. In these embodiments, the authentication platform 614 waits a predetermined period of time for a response from the ACS 512. The authentication platform 614 determines that the ACS 512 is unavailable if no response is received from the ACS 512 after the predetermined period of time. Alternatively, the authentication platform 614 may receive a response from the ACS 512 that indicates that the ACS 512 is unable to perform authentication. The response from the ACS 512 may indicate that the online user is not enrolled with the ACS 512, that the ACS 512 is currently unavailable, or that the ACS 512 was unable to authenticate the online user. This indication may be contained in the response message from the ACS 512. In other embodiments, the authentication platform 614 may transmit periodic status check messages to the ACS 512 to determine whether or not the ACS 512 is available.

In some embodiments, the authentication platform 614 determines that the online user is not associated with the ACS 512 based on the extracted authentication data. In these embodiments, the issuer associated with the online user has not registered with an ACS 512. In these embodiments, the authentication platform 614 generates an authentication decision based on the RBA result data.

In some further embodiments, the authentication platform 614 determines whether the authentication request message complies with the 3DS 2 Protocol or subsequent versions of the 3DS Protocol. If the authentication request message does not comply with the appropriate 3DS Protocols, the authentication platform 614 bypasses determining if the ACS 512 is available. In this situation, the authentication platform 614 transmits an authentication response message indicating that the transaction is considered merchant only and that no authentication was attempted. Alternatively when ACS 512 is unavailable or the message does not comply with protocols, in some embodiments, authentication platform 614 may be enabled to act as a stand-in for ACS 512 for some authentications.

In some embodiments, the authentication platform 614 determines a risk level based on the RBA result data. If the risk level is low, the authentication platform 614 embeds an indicator in the authentication response message indicating that the transaction is "fully authenticated." If the risk level is not low, the authentication platform 614 embeds one or more indicators in the authentication response message indicating that the transaction is a merchant only transaction and that authentication was attempted.

Figure 11A:
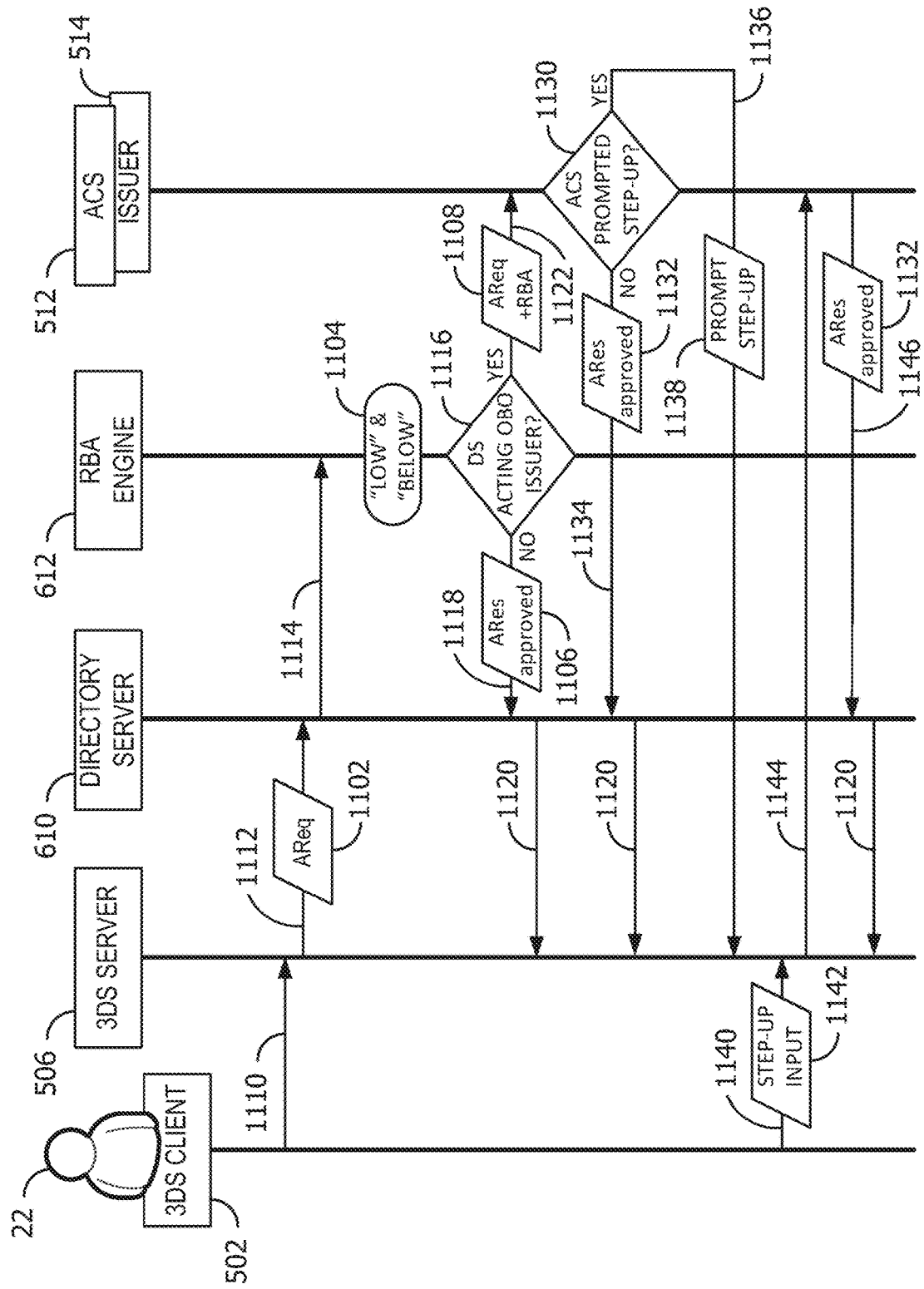
FIG. 11A is a swim-lane diagrams illustrating additional example embodiments involving conditional SCA evaluation on transactions associated with a regulated market.
Figure 11B:
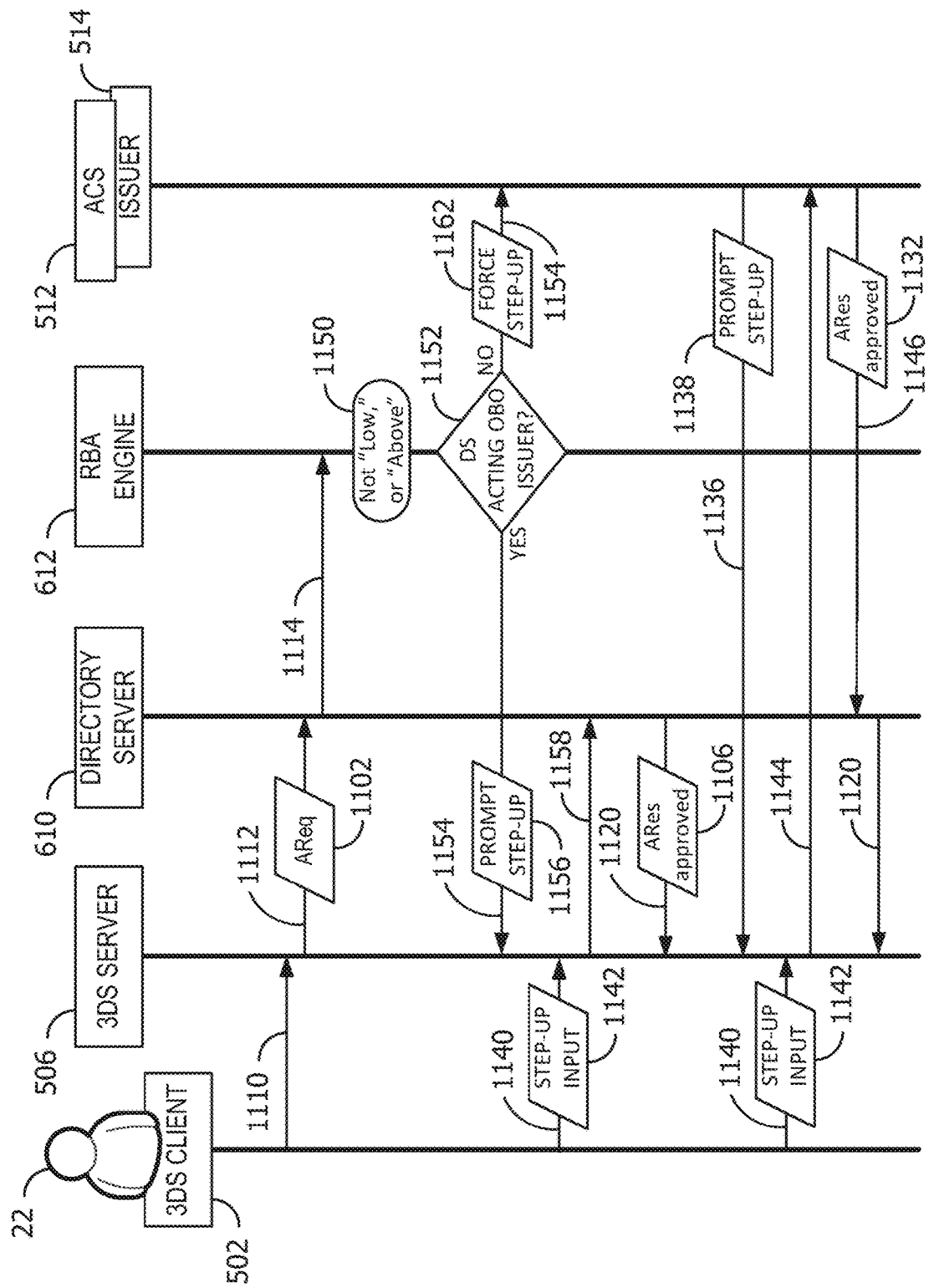
FIG. 11B is a continuation of the swim-lane diagram shown in FIG. 11A.

FIGS. 11A and 11B are swim-lane diagrams illustrating additional example embodiments involving conditional SCA evaluation on transactions associated with a regulated market. FIG. 11A is directed to transactions that are allowed to avoid regulator-imposed SCA step-up challenges when the transactions are determined to be of sufficiently low risk and low value. FIG. 11B is directed to transactions that are forced into SCA step-up challenges when the transactions are more risky or when the transactions are of higher value. In such scenarios, any of the above-described systems and methods involving the RBA-enabled directory server (or just "directory server") 610 and RBA engine 612 may be employed in conjunction with conditional SCA, subject to the restrictions imposed by regulators as described herein.

Referring now to FIG. 11A, in this example embodiment, at step 1110, the cardholder 22 initiates an online transaction with a merchant, represented here by 3DS server 506, via their computing device, represented here by 3DS client 502. 3DS server 506 generates and transmits an AReq message 1102 to directory server 610 at step 1112 and extracts transaction data from AReq message (e.g., as described above with respect to FIG. 6). AReq message 1102 includes a transaction value for the transaction, as well as other authentication data associated with the transaction (e.g., as a 3DS AReq message). Directory server 610 receives AReq message 1102 and determines that the transaction involves a market regulated by a regulatory entity, such as a central bank of a particular country associated with the transaction (e.g., based on the identity or location of cardholder 22, merchant 24, merchant bank 26, or issuer bank 30).

Transactions in some regulated markets may be subject to forced SCA for all or most transactions. In the example embodiment, the regulated market for this example transaction has opted into conditional SCA as described herein. In such markets, regulators may generally mandate SCA on transactions, but may allow transactions to be authenticated without SCA in particular circumstances. As such, directory server 610 identifies a transaction limit and a risk threshold for conditional SCA of that particular regulated market. The transaction limit represents a threshold transaction value below which SCA may be avoided if the risk threshold is also satisfied. In the embodiments described herein, the transaction limit may be, for example, a monetary value for a particular transaction (e.g., 2000 rupees, 30 Euro, etc.), a number of transactions (e.g., 5 frictionless transactions), or a cumulative monetary value (e.g., 100 Euro). Accordingly, the transaction limit may be defined by parameters other than a monetary value of the transaction. Those of skill in the art will appreciate that any suitable type of transaction limit may be established.

The risk threshold represents a level of risk of fraud associated with the transaction (e.g., as determined, or "scored," by RBA engine 612). In other words, and for example, if the risk level of the transaction is "low" (e.g., below a risk score threshold) and the transaction is a "low-value" transaction (e.g., below the transaction threshold value), then SCA may not be mandated by the regulated entity. If the transaction value is not a low-value transaction (e.g., at or above the transaction threshold value) or if the transaction is not a low-risk transaction (e.g., at or above a risk score threshold), then SCA may be mandated by the regulated entity.

Directory server 610 compares the transaction value to the transaction limit set by the regulatory entity and, in this example, determines that the transaction value is less than the transaction limit (e.g., the transaction is a "low-value" transaction). As such, directory server 610 engages RBA engine 612 at step 1114 to evaluate risk associated with AReq. RBA engine 612 evaluates risk associated with the transaction using the authentication data and other transaction data associated with AReq, as described above. RBA engine 612 generates risk-based authentication result data that includes a risk score for the transaction.

In this example, RBA engine 612 compares the risk score generated for this transaction to the risk threshold identified for this regulated market and determines that the risk of fraud in this transaction is below the risk threshold. In some embodiments, the risk score and the risk threshold may be integer values that may be compared to determine whether the risk score is more or less than the risk threshold. In other embodiments, the risk threshold may be a category of a tiered set of categories (e.g., "low", "medium", "high") and the risk score may be of that same tiered set of categories, or the risk score may be a value that is mapped into that tiered set of categories (e.g., with regulator-, issuer-, or system-defined ranges for each category). For example, RBA engine 612 may allow the regulators for this market to define the "low risk" category as being any transaction score below 400 (e.g., as evaluated under 3DS 2 by RBA engine 612).

Continuing this example, RBA engine 612 has determined, at step 1104, that the transaction is both "low" and "below." In other words, the transaction is both a low-value transaction as well as below the regulator's transaction threshold. As such, as far as the regulator is concerned, the transaction is not mandated to have SCA performed. However, some issuers may have more stringent requirements for SCA step-up, or may have other reasons for rejecting authentication regardless of SCA step-up considerations. For example, some issuers may reject any CNP transaction evaluating to a "high" risk. For ease of description, such flow and rejections are not expressly illustrated in FIGS. 11A and 11B. Rather, FIGS. 11A and 11B focus on scenarios involving when SCA is mandated or allowed to be avoided.

In some scenarios, the authentication platform (e.g., directory server 610 and RBA engine 612) may be entrusted to perform authentication processing on behalf of issuer 514. In other scenarios, authentication may be performed by ACS 512. As such, at test 1116, if the authentication platform is acting on behalf of issuer 514 for authentication, then RBA engine 612 generates an ARes message 1106 approving the transaction at step 1118 (presuming no other reason for authentication rejection) and transmits ARes 1106 to 3DS server 506 at step 1120 without having performed SCA step-up authentication on consumer 22.

If, at test 1116, the authentication platform does not perform authentication on behalf of issuer 514 (e.g., issuer 514 has ACS 512 perform authentication services), then RBA engine 612 transmits an enhanced AReq message 1108 to ACS 512 at step 1122. Enhanced AReq may include, in addition to the additional RBA data described above associated with 3DS 2, a data field indicating that SCA step-up is not mandated by the involved market(s) for this transaction. However, issuer 514 or ACS 512 may otherwise determine to perform SCA on the transaction (e.g., if preferred by the issuer for certain types of transactions or other considerations). If, at test 1130, ACS 512 does not prompt SCA step-up, then ACS 512 returns an ARes message 1132 to the authentication platform at step 1134 approving authentication of the transaction.

If, at test 1130, ACS 512 determines to prompt SCA step-up, then ACS 512 prompts step-up 1138 via 3DS server 506 (or 3DS client 502) at step 1136. Consumer 22 provides step-up input 1142 back to 3DS server 506 (or directly to ACS 512) and, upon successful step-up, ACS 512 transmits the ARes message 1132 to the authentication service at step 1146.

Referring now to FIG. 11B, in this example, the authentication platform determines that the transaction does not meet the requirements to avoid SCA step-up and, as such, SCA step-up is mandated. In the example embodiment, RBA engine 612 determines, at step 1150, that either the transaction value is above the transaction limit set by the regulatory entity, or that the transaction risk does not satisfy the risk threshold set by the regulatory entity, or both. If, at test 1152, the authentication platform is acting on behalf of issuer 514, and presuming no other reason for denying authentication of the transaction, RBA engine 612 prompts step-up 1156 of consumer 22 at step 1154. Consumer 22 responds with step-up input 1142 at step 1140, either directly with directory server 610 or via 3DS server 506 at step 1158 and, upon successful step-up challenge, 3DS server 506 transmits ARes message 1106 to 3DS server 506 approving authentication of the transaction.

If, at test 1152, ACS 512 is acting on behalf of issuer 514, RBA engine 612 transmits, at step 1154, the enhanced AReq 1108 (represented here by 1162) along with an indication to force SCA step-up challenge of consumer 22 for this transaction. Enhanced AReq may include, in addition to the additional RBA data described above associated with 3DS 2, a data field mandating ACS 512 to perform SCA step-up for the transaction (e.g., if the transaction is otherwise deemed to be approved for authentication by ACS 512). In other words, AReq 1108 serves to inform ACS 512 that the transaction may not be authenticated without SCA. Presuming no other reason to reject authentication of the transaction, ACS 512 identifies that the transaction is subject to a mandated SCA step-up and prompts step-up 1138 in steps 1136, 1140, 1144, and transmits ARes 1132 approving the transaction in steps 1146 and 1120, as described above.

In some embodiments, the authentication platform provides a graphical user interface (GUI) dashboard (not shown) for use by the regulators. The GUI may, for example, allow the regulators to view and evaluate fraud data associated with their market. For example, in one embodiment, the GUI dashboard may be configured to display historical fraud data indicating a level of fraud present in transactions not mandated to be authenticated with SCA by RBA engine 612 when satisfying the risk threshold and transaction limit set by the regulatory entity (e.g., a percentage of "frictionless transactions" within RBA, perhaps including approval rates or basis points of fraud). In one embodiment, the GUI dashboard may be configured to display historical fraud data indicating a level of fraud present in transactions mandated to be authenticated with SCA by the RBA engine 612 when not satisfying one or more of the risk threshold or transaction limit (e.g., percentage of transactions stepped-up within RBA, perhaps with the type of step-up, approval rates, basis points of fraud). Such data may include an electronic gross dollar value (eGDV), an eTransaction count, or growth over time for such metrics. Such data may also be presented by channel. For example, such data may be limited to mobile device transactions, browser-based transactions, telephone transactions, and mail transactions. As such, the GUI may allow the regulators to determine how their current settings are impacting fraud in these types of transactions.

In some embodiments, the GUI allows the regulators to adjust conditional SCA settings associated with their market. For example, the GUI may allow the regulators to alter the risk threshold required to avoid SCA, or to alter the transaction limit for transactions that can avoid SCA. In some embodiments, the GUI provides simulation analysis of prospective changes to the conditional SCA settings. For example, using historical data, the GUI may provide a fraud impact analysis to a proposed higher risk threshold, or to a proposed higher transaction limit, perhaps estimating a predicted level of fraud at the proposed settings. As such, the GUI may allow the regulators to determine potential impacts or potential results based on prospective changes.

Figure 12:
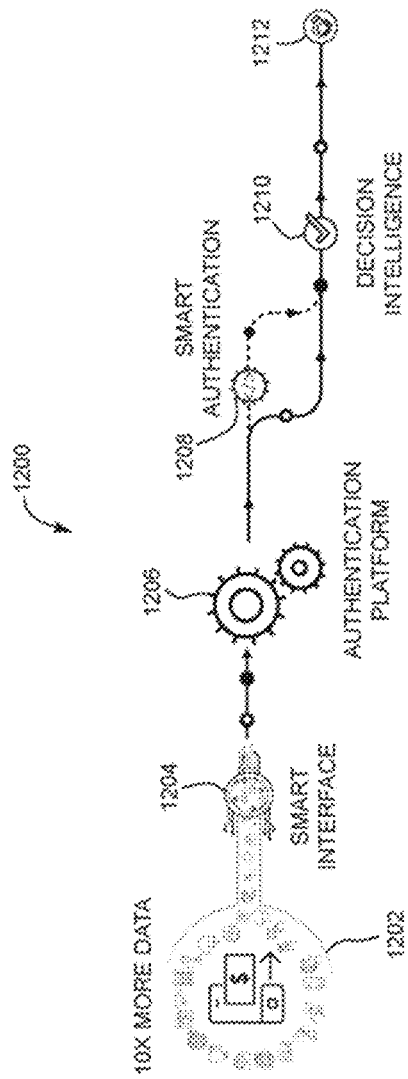

FIG. 12 is a flow diagram of an advanced authentication process 1200 for increasing approvals, reducing fraud, and improving consumer experience. Authentication process 1200 may be implemented, for example, using the systems and methods described herein. As shown in FIG. 12, authentication data 1202 is transmitted to an authentication platform 1206 (such as authentication platform 614) through a smart interface 1204. As described above, as compared to previous authentication methods (e.g., 3DS 1.0), authentication data 1202 under the 3DS 2 Protocol (and subsequent versions of the 3DS Protocol) includes approximately ten times the amount of transaction data to be gathered, analyzed, and utilized to prevent fraud. Using authentication data 1202, authentication platform 1206 performs smart authentication 1208 (as described herein) to generate RBA results data. Decision intelligence (DI) 1210 uses other sources of data (i.e., a separate model) to influence authorization decisions. In some embodiments, the RBA results data may be incorporated into DI 1210. These assessments enable an interested party 1212 (e.g., the ACS, the merchant, and/or the issuer) to complete authentication (and authentication) of the transaction.

Authentication process 1200 enables authenticating an online user as a legitimate user of a payment account without having to ask additional questions of the user (e.g., as part of a step-up challenge) or having to request additional inputs from the user. Thus, authentication process 1200 assesses a risk of fraud without creating any additional friction for the user that may cause the user to terminate a transaction.

Figure 13:
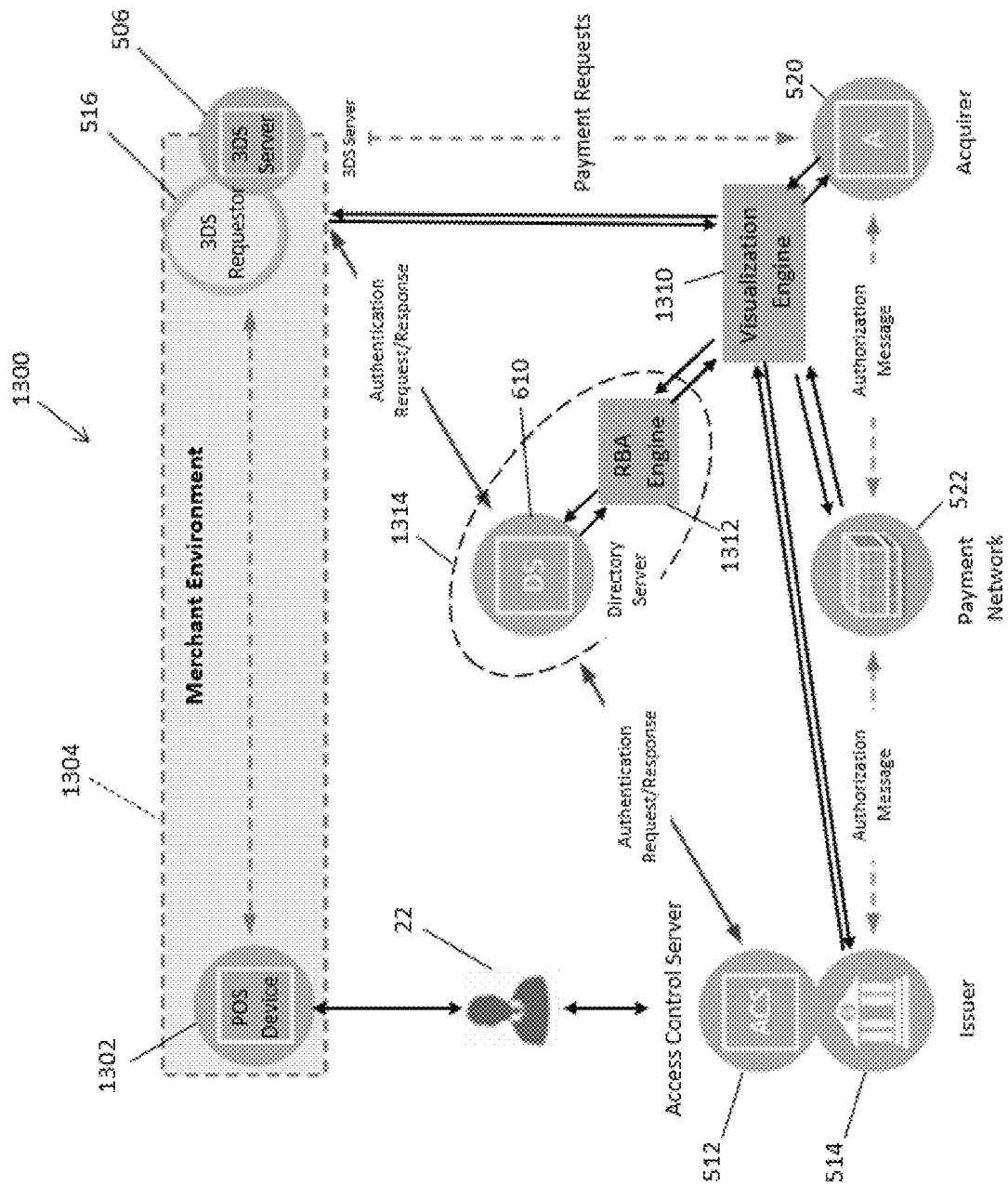

FIG. 13 is a schematic diagram illustrating transaction flow in another example authentication system 1300 that uses the 3DS 2 Protocol (or subsequent versions of the 3DS Protocol) for authentication, and that performs RBA on behalf of ACS providers that are unable to perform RBA. Unless otherwise indicated, components of authentication system 1300 are substantially similar to those of authentication system 500 (shown in FIG. 5) and 600 (shown in FIG. 6).

Authentication system 1300 again includes RBA-enabled directory server 610, which in this embodiment is communicatively coupled to a RBA engine 1312 (which may be collectively referred to as an authentication platform 1314). RBA-enabled directory server 610 and RBA engine 1312 facilitate performing RBA behalf of ACS providers, as described herein. RBA-enabled directory server 610 and RBA engine 1312 may be operated, for example, by interchange network 28 (shown in FIG. 1). In some embodiments, authentication platform 1314 is similar to RBA platform 34 (shown in FIG. 1) and authentication server 112 (shown in FIG. 2).

Similarly to authentication system 600, RBA-enabled directory server 610 receives an AReq message from 3DS server 506, then RBA-enabled directory server 610 transmits at least some of the data in the AReq message (e.g., the authentication data) to RBA engine 1312.

In the example embodiment, RBA engine 1312 analyzes the data in the AReq message in a similar fashion to the analysis performed by RBA engine 612 to generate RBA result data. For example, RBA engine 1312 may again compare the data in the AReq message to one or more long term variables ("LTV") and/or short term PAN velocities and ratios, which again may include comparing to recent transaction frequency, amount spent, declines, historical risk scores, etc. Alternatively, the data in the AReq message may be analyzed using any suitable techniques to generate RBA result data.

In the example embodiment, the RBA result data generated by RBA engine 1312 again may include a risk score, a risk analysis, and at least one reason code as described above, such as the single-character reason codes described above with respect to Table 3. Additionally or alternatively, however, RBA engine 1312 generates enhanced reason codes. In the example embodiment, each enhanced reason code consists of multiple bytes of data that provide more detailed insight, as compared to the single character reason codes described above with respect to Table 3, with respect to the underlying factors that affect the risk analysis.

More specifically, the enhanced reason codes are again generated based on a plurality of reason code categories and associated anchors, and again may be affected by rules and/or a combination of the rules and the model, as described above. However, in contrast to the single-byte reason code (shown in Table 3), the multiple-byte enhanced reason code includes far more possibilities for nuanced descriptions of the combination of activated anchors and/or risk events that are identified by RBA engine 1312. Based on the analysis of the data in the AReq message, RBA engine 1312 again may activate one or more anchors in one or more of the categories. The enhanced reason code is then generated based on which anchors (and how many anchors) are activated, and based further on other specific risk events detected for the transaction.

In the example embodiment, the enhanced reason code includes three bytes of data, and each byte is assigned a letter from the English alphabet, enabling the data space of the enhanced reason code to accommodate 26*26*26=17,576 different enhanced reason codes. Accordingly, with a size increase of two bytes, the enhanced reason code increases the number of potential reason codes (as compared to a single byte reason code) by a factor of more than 600. In some embodiments, each byte is assigned an alphanumeric character, for 36 possibilities per byte. Alternatively, the enhanced reason code includes any suitable number of bytes (such as four, five, or ten bytes), and/or each byte is assigned a value from among any suitable range of values (e.g., an integer between 0 and 255).

In some implementations, the ability to embed significant additional detail in the enhanced reason code, while still utilizing a very small number of bytes (e.g., three bytes), enables RBA engine 1312 to provide a particular technical advantage with respect to providing information for real-time transaction authentication to issuers that do not contract with an ACS, and/or to merchants or issuers when an ACS becomes temporarily unavailable, as will be discussed herein. In addition, the ability to embed significant additional detail in the enhanced reason code, while still utilizing a very small number of bytes (e.g., three bytes), enables RBA engine 1312 to provide a particular technical advantage with respect to back-office analysis of past transactions by issuers or merchants, as will be discussed herein.

In the example embodiment, the reason code categories are again the cardholder, merchant, and environment categories as described above. Alternatively, any suitable number and/or type of categories is implemented by RBA engine 1312.

In the example embodiment, the cardholder category is associated with five anchors (shipping address, PAN, billing address, email, and phone), the merchant category is associated with three anchors (merchant name, merchant category, and merchant country), and the environment category is associated with three anchors (device info, IP address, and device channel). Those of skill in the art will appreciate that additional and/or alternative anchors may be established.

Based on analysis of the data in the AReq message, RBA engine 1312 may activate at least one anchor in one or more of the three categories. For example, for the cardholder category, if RBA engine 1312 determines that a shipping address for the transaction has been used with the PAN in past transactions and/or the shipping address is unchanged from prior transactions, RBA engine 1312 may activate the shipping address anchor. Further, RBA engine 1312 may activate the PAN anchor of the cardholder category if the PAN has had successful authentications in past transactions.

For the merchant category, one or more anchors may be activated based fraud rates for the merchant, decline rates for the merchant, and non-cleared transaction rates for the merchant. Further, one or more anchors may be activated when RBA engine 1312 determines the merchant category and merchant location for the transaction are consistent with historical transactions for that merchant.

For the environment category, RBA engine 1312 may activate the IP address anchor if the IP address is known and is not on a list of "bad" IP addresses. Further, the device anchor may be activated when RBA engine 1312 determines the device is known and is not on a list of "bad" devices, the device has had successful authentications in past transactions, and/or the device has scored well in past transactions. The additional examples of criteria for activating anchors for the different categories as described above for RBA engine 612 may also be applied for RBA engine 1312. Those of skill in the art will appreciate that the anchors may be activated based on any suitable conditions. Moreover, RBA engine 1312 may detect one or more specific risk events associated with one or more of the anchors. For example, RBA engine 1312 may detect that the device profile of the device used to initiate the transaction does not match the device profile used to initiate previous online transactions associated with the payment account in the historical data.

The bytes of the enhanced reason code are generated based on the activated anchors and the detected risk events, and in some embodiments are structured in a hierarchical order based on connections between anchors in different categories. For example, if at least one anchor in the cardholder category is activated, a positive enhanced reason code (i.e., indicating relatively low risk) is generated. If, instead, at least one anchor in the cardholder category is activated and at least one anchor in the merchant category is also activated, a stronger positive enhanced reason code related to both categories is generated. Similarly, if at least one anchor in the cardholder category is activated, at least one anchor in the merchant category is activated, and at least one anchor in the environment category is activated, an even stronger positive enhanced reason code related to all three categories is generated. Conversely, if one or more risk events are detected, a less positive, or negative, enhanced reason code is generated which further indicates the one or more detected risk events.

The following Table 4 lists of number of example three-byte enhanced reason codes.

TABLE 4

| Code | Risk Level | Description and Comments |
| --- | --- | --- |
| AAA | High | Suspicious Account Activity, Merchant (fraud) risk low (assessed by Mastercard) |
| AAB | High | Suspicious Account Activity, Merchant (fraud) risk low (assessed by Mastercard), Good/Known IP |
| AAC | High | Suspicious Account Activity, Merchant (fraud) risk low (assessed by Mastercard), Recent High Risk Change to Device or Profile Information |
| AAD | High | Suspicious Account Activity, Merchant (fraud) risk low (assessed by Mastercard), Recent change to Device or Profile Information |
| AAE | High | Suspicious Account Activity, Merchant (fraud) risk low (assessed by Mastercard), Unknown Device/Account Relationship |
| AAF | High | Cardholder Billing address prior history established, Merchant (fraud) risk low (assessed by Mastercard), Unknown Device/Account Relationship |
| AAG | High | Suspicious Account Activity, Merchant (fraud) risk low (assessed by Mastercard), Session-Trusted/normal/innocent session (no man in the middle attack/no bot, not suspicious account activity) |
| AAH | High | PAN associated with fraud event, Merchant (fraud) risk low (assessed by Mastercard), Unknown Device/Account Relationship |
| AAI | High | New Account or Insufficient Data, Merchant (fraud) risk low (assessed by Mastercard), Unknown Device/Account Relationship |
| AAJ | High | Card number(PAN) behavior established high trust in the current transaction, Merchant (fraud) risk low (assessed by Mastercard), UnknownDevice/Account Relationship |
| AAK | Medium | New Account or Insufficient Data, Merchant (fraud) risk low (assessed by Mastercard), Session-Trusted/normal/innocent |

TABLE 4-continued

| Code | Risk Level | Description and Comments |
|---|---|---|
| | | session (no man in the middle attack/no bot, not suspicious account activity) |
| AAL | Medium | New Account or Insufficient Data, Merchant (fraud) risk low (assessed by Mastercard) |
| AAM | Medium | New Account or Insufficient Data, Merchant (fraud) risk low (assessed by Mastercard), Recent change to Device or Profile Information |
| AAN | Medium | Cardholder Shipping address prior history established, Merchant (fraud) risk low (assessed by Mastercard), Recent High Risk Change to Device or Profile Information |
| AAO | Medium | New Account or Insufficient Data, Merchant (fraud) risk low (assessed by Mastercard), Recent High Risk Change to Device or Profile Information |
| AAP | Medium | Cardholder Phone number prior history established, Merchant (fraud) risk low (assessed by Mastercard), Unknown Device/Account Relationship |
| AAQ | Medium | Cardholder Card number(PAN) behavior established high trust in the current transaction, Merchant (fraud) risk low (assessed by Mastercard), Recent High Risk Change to Device or Profile Information |
| AAR | Medium | Cardholder Phone number prior history established, Merchant (fraud) risk low (assessed by Mastercard), Recent High Risk Change to Device or Profile Information |
| AAS | Medium | New Account or Insufficient Data, Merchant (fraud) risk high (assessed by Mastercard) |
| AAT | Medium | Cardholder Billing address prior history established, Merchant (fraud) risk low (assessed by Mastercard), Recent High Risk Change to Device or Profile Information |
| AAU | Medium | Cardholder Phone number prior history established, Merchant (fraud) risk low (assessed by Mastercard), Good/Known IP |
| AAV | Medium | Cardholder Billing address prior history established, Merchant (fraud) risk low (assessed by Mastercard), Recent change to Device or Profile Information |
| AAW | Medium | Cardholder Billing address prior history established, Merchant (fraud) risk low (assessed by Mastercard), Good/Known IP |
| AAX | Medium | Cardholder Billing address prior history established, Merchant (fraud) risk low (assessed by Mastercard) |
| AAY | Medium | PAN associated with fraud event, Merchant (fraud) risk low (assessed by Mastercard), Good/Known IP |
| AAZ | Medium | PAN associated with fraud event, Merchant (fraud) risk low (assessed by Mastercard), Session-Trusted/normal/innocent session (no man in the middle attack/no bot, not suspicious account activity) |
| ABA | Medium | PAN associated with fraud event, Merchant (fraud) risk low (assessed by Mastercard), Recent change to Device or Profile Information |
| ABB | Medium | Limited information and refer to DTI reason code |
| ABC | Low | Cardholder Card number (PAN) behavior established high trust in the current transaction, Merchant (fraud) risk low (assessed by Mastercard), Recent change to Device or Profile Information |
| ABD | Low | Cardholder Billing address prior history established, Merchant (fraud) risk low (assessed by Mastercard), Session-Trusted/normal/innocent session (no man in the middle attack/no bot, not suspicious account activity) |
| ABE | Low | Cardholder Shipping address prior history established, Merchant (fraud) risk low (assessed by Mastercard), Session-Trusted/normal/innocent session (no man in the middle attack/no bot, not suspicious account activity) |
| ABF | Low | Cardholder Phone number prior history established, Merchant (fraud) risk low (assessed by Mastercard), Session-Trusted/normal/innocent session (no man in the middle attack/no bot, not suspicious account activity) |
| ABG | Low | Cardholder Phone number prior history established, Merchant (fraud) risk low (assessed by Mastercard) |
| ABH | Low | Cardholder Shipping address prior history established, Merchant (fraud) risk low (assessed by Mastercard), Recent change to Device or Profile Information |
| ABI | Low | Cardholder Shipping address prior history established, Merchant (fraud) risk low (assessed by Mastercard) |
| ABJ | Low | Cardholder Shipping address prior history established, Merchant (fraud) risk low (assessed by Mastercard), Good/Known IP |
| ABK | Low | Cardholder Phone number prior history established, Merchant (fraud) risk low (assessed by Mastercard), Recent change to Device or Profile Information |

Those of skill in the art will appreciate that additional and/or alternative enhanced reason codes may be utilized in accordance with the embodiments described herein, particularly in view of the number of distinct values available. For example, the Areq message may indicate that the transaction was initiated using one or more particular communication modes, such as a payment initiated using a voice-controlled personal assistant (e.g., Siri®, which is a registered trademark of Apple Inc. located in Cupertino, CA) for a buy-online, curbside pickup order. Certain values of the enhanced reason code may indicate a risk event was detected because the use of Siri to initiate purchases by the associated cardholder and/or device identifier is rare, and additionally or alternatively because buy-online, curbside pickup orders are rare for the associated cardholder and/or device identifier. The ability of RBA engine 1312 to convey risk events for each transaction at such levels of granularity represents a technical advantage of the enhanced reason codes.

After RBA engine 1312 generates the RBA result data (including the enhanced reason code), RBA engine 1312 transmits the RBA result data to RBA-enabled directory server 610. In some embodiments, RBA-enabled directory server 610 again embeds the RBA result data into the AReq message to generate an enhanced AReq message, as discussed above, and the enhanced AReq message is then transmitted from RBA-enabled directory server 610 to ACS 512. ACS 512 then analyzes the RBA result data in the enhanced AReq message to make an authentication decision, such as one of determining to fully authenticate the transaction, denying authentication for the transaction, or performing additional authentication (e.g., by issuing a step-up challenge to the cardholder) for the transaction, based on at least one of the risk score, the risk analysis, and the enhanced reason code. Accordingly, ACS 512 does not perform the RBA analysis, but is still able to leverage the results of that analysis to make an authentication decision (e.g., by using the results in their own fraud analysis platform), generally resulting in more approvals with less fraud. Thus, in such embodiments, RBA-enabled directory server 610 and RBA engine 1312 perform the RBA analysis on behalf of ACS 512. In some embodiments, the ACS 512 receives authentication data from a plurality of sources.

Additionally or alternatively, in some embodiments, when the determined riskiness of the transaction is low enough, and/or if RBA-enabled directory server 610 determines if ACS 512 is unavailable, RBA-enabled directory server 610 performs a full authentication process for the transaction instead of generating and transmitting an enhanced AReq message to ACS 512, as described above.

In some embodiments, authentication platform 1314 is configured to cause 3DS server 506 to embed the enhanced reason code in an authorization request message routed to issuer 514 via payment network 522, which enables issuer 514, which is the ultimate decision-maker in authorizing the payment transaction, to consider the authentication risk events identified by the enhanced reason code directly in the authorization process. As noted above, the ability to pack authentication risk event information at a high level of granularity into the small number of bytes embodied in the enhanced reason code is a particular technical advantage with respect to these embodiments. More specifically, as discussed above, payment network 522 is configured to process and route messages formatted according to a set of proprietary communications standards promulgated by the payment network for the exchange of financial transaction data and the settlement of funds between financial institutions that are members of the payment network. Those of skill in the art will appreciate that such proprietary communications standards have a tightly constrained data format for messages, such as ISO 8583 compliant messages and/or ISO 20022 compliant messages. As used herein, "ISO" refers to a series of standards approved by the International Organization for Standardization (ISO is a registered trademark of the International Organization for Standardization of Geneva, Switzerland). The constrained format defines acceptable message types, data element locations, and data element values. ISO 8583 compliant messages are constrained by the ISO 8583 standard, which governs financial transaction card originated messages. ISO 20022 compliant messages are constrained by the ISO 20022 standard. For example, ISO 20022 compliant messages may include acceptor to issuer card messages (ATICA).

In conventional systems, as discussed above, the rich detail in the RBA result data can only be leveraged by issuer 514 through the use of ACS 512 via the authentication request/response communication path, in part because the ability to add significant amounts of additional information within the legacy messaging architecture of payment processing network 522 in the separate authorization (e.g., ISO 8583) messaging path is severely limited. However, as noted above, the enhanced reason code is capable of providing significant additional detail about the factors affecting authentication of the underlying payment transaction, while utilizing only a very small number of bytes (e.g., three bytes).

More specifically, authentication platform 1314 in some embodiments transmits the enhanced AReq message (including the enhanced reason code, as discussed above) via the directory server 610 back to the requestor 3DS server 506, which is configured to embed the enhanced reason code into a payment request for the transaction sent to the acquirer 520, which provides a gateway to payment network 522. Acquirer 520 then routes a formatted authorization request message (e.g., an ISO 8583 authorization request message) for the transaction via payment network 522 to issuer 514. In other such embodiments, directory server 610 has a direct communication link (not shown) to a payment network server computing device that is part of the implementation of payment network 522. Directory server 610 transmits the enhanced reason code, along with linking information usable to identify the authorization request message for the underlying payment transaction, directly to the payment network server computing device. When the payment network server computing device receives the formatted authorization request message for the transaction as forwarded by acquirer 520, the payment network server computing device recognizes the authorization request message based on the linking information, and embeds the enhanced reason code into the authorization request message prior to forwarding the authorization request message to issuer 514. Accordingly, the rich RBA result data encoded by the enhanced reason code reaches the server computing system of issuer 514, which is the decisioning server, via the separate authorization (e.g., ISO 8583) messaging path for use in the real-time authorization decision executed by the issuer server on the underlying payment transaction, regardless of whether issuer 514 has contracted with ACS 512 or whether, if contracted, ACS 512 is nevertheless unavailable at a given time.

In one example, the three byte enhanced reason code, with each byte configured to represent alphabetic values, may be included in data element 48, subelement 56 of the ISO 8583 authorization request message. Issuer 514 configures its authorization computing system to receive alphanumeric values in the fields of subelement 56 as follows:

Subfield 1 (Security Services Indicator)
    format=an-3
    value=ARA

Subfield 2 (Security Services Data)—an-3
Position 1=Reason Code 1
   format=an-1
   values=A-Z
Position 2—Reason Code 2
   format=an-1
   values=A-Z
Position 3=Reason Code 3
   format=an-1
   values=A-Z
wherein the value of "ARA" (authentication risk analysis) in subfield 1 is an example of a fixed value that identifies the contents of subfield 2 as an enhanced reason code.

Figure 14:
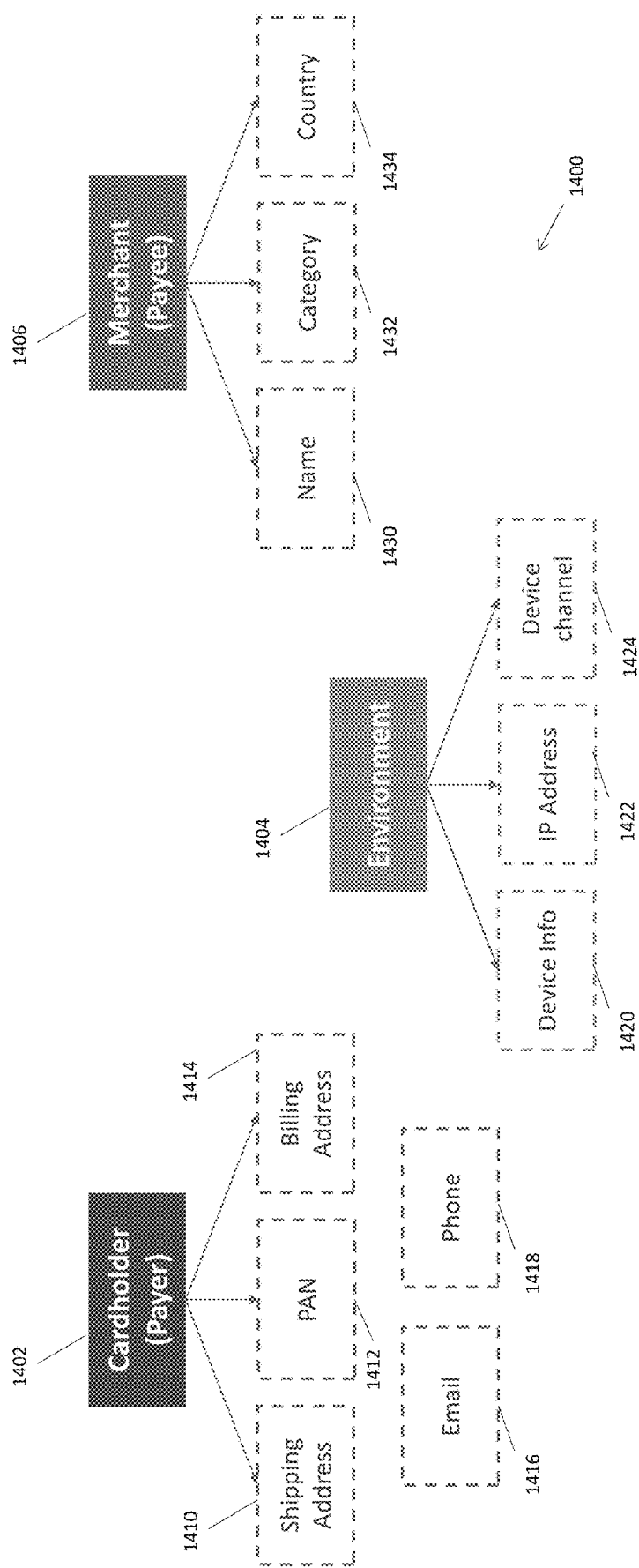

FIG. 14 is an example graphic visualization 1400 generated by a visualization engine 1310 (shown in FIG. 13) in communication with authentication platform 1314 and/or payment network 522. Visualization engine 1310 may be hosted on one or more computers that are communicatively coupled to the Internet, and that may be implemented by a server computing device architecture such as that illustrated by server system 301 (shown in FIG. 3). With reference to FIGS. 13 and 14, in some embodiments, visualization engine 1310 includes a server application configured to interact with a client application executable on an analyst computing device of any of issuer 514, merchant environment 1304, acquirer 520, payment network 522, or another party. Upon request by the client application, the server application causes the client application to display, to a user of the analyst computing device, graphic visualization 1400 based on current and/or historical RBA result data generated by RBA engine 1312, stored, and subsequently obtained by visualization engine 1310. In some embodiments, the RBA result data generated in real-time with respect to each payment transaction is stored as historical RBA result data by RBA engine 1312 in a database accessible to visualization engine 1310. Additionally or alternatively, the RBA result data generated in real-time with respect to each payment transaction is embedded in the authorization request message routed via payment network 522 as described above, and payment network 522 stores the RBA result data from each authorization request message as the historical RBA result data in a database accessible to visualization engine 1310

The analyst computing device may be implemented by a client computing device architecture such as that illustrated by client computing device 402 (shown in FIG. 4), and the client application may include a web browser or a dedicated software application configured to access visualization engine 1310 using the Internet or other network.

In some embodiments, graphic visualization 1400 includes icons that represent each of the reason code categories. For example, the illustrated embodiment includes a cardholder (or payor) icon 1402, an environment (or device) icon 1404, and a merchant (or payee) icon 1406. Alternatively, graphic visualization 1400 includes icons that represent any suitable number or type of reason code categories. Moreover, in certain embodiments, graphic visualization 1400 includes icons that represent the anchors associated with each of the reason code categories. For example, the illustrated embodiment includes a shipping address icon 1410, a PAN icon 1412, a billing address icon 1414, an email icon 1416, and a phone icon 1418 connected to, grouped around, or otherwise visually associated with cardholder icon 1402. Similarly, the illustrated embodiment includes a device profile icon 1420, an IP address icon 1422, and a device channel icon 1424 visually associated with environment icon 1404, and a merchant name icon 1430, a merchant category icon 1432, and a merchant country icon 1434 visually associated with merchant icon 1406. Alternatively, graphic visualization 1400 includes icons that represent any suitable anchors for each of the displayed reason code categories.

For each selected transaction, graphic visualization 1400 is configured to visually highlight icons corresponding to anchors that are activated (i.e., verified as corresponding well to historical data) for the selected transaction. For example, the client application executing on the analyst computing device may display to the analyst a list of reports from cardholders identifying potentially fraudulent transactions (e.g., each cardholder noticed an unrecognized transaction on the cardholder's monthly billing statement). The analyst may "click on" or otherwise select a transaction on the list to initiate a request, via the client application executing on the analyst computing device, for a display of stored RBA result data with respect to the transaction using graphic visualization 1400. Visualization engine 1310 responds to the request by retrieving the stored RBA result data previously generated by RBA engine 1312 for the selected transaction. In some embodiments, visualization engine 1310 then detects which anchors (if any) were activated/verified for the transaction based on the retrieved single-character reason code (e.g. using rules and/or a stored version of a table such as Table 3), or alternatively based on the enhanced reason code (e.g. using rules and/or a stored version of a table such as Table 4), and causes the client application to highlight the icon(s) corresponding to the activated anchors on graphic visualization 1400.

In some embodiments, the icons corresponding to the activated/verified anchors are highlighted by changing one or more of a fill color, a border color, a border thickness, and an element size of the icon corresponding to the anchor. Those of skill in the art will appreciate that the icons can also be highlighted by "graying out" or otherwise visually deemphasizing the icons corresponding to the un-activated anchors. Alternatively, icons corresponding to the activated anchors for the transaction are highlighted in any suitable fashion on graphic visualization 1400.

In some embodiments, graphic visualization 1400 may be viewed as a "chart" with a static arrangement of icons. As the analyst moves through the list of potentially fraudulent transactions, the highlighting of the icons changes to reflect the stored RBA result data. Thus, the analyst may quickly learn to recognize a meaning of specific highlighting patterns and/or to draw inferences as to which fraudulent transactions may be related to the same source of fraudulent conduct.

Graphic visualization 1400 caused to be displayed by visualization engine 1310 provides a technical advantage by enabling an analyst using the analyst computing device to quickly observe and evaluate which factors were most relevant to the authentication analysis for each historical transaction. In one example, if several icons are highlighted on graphic visualization 1400, the analyst may quickly determine that the cardholder dispute is likely without merit. Thus, if the analyst computing device represents issuer 514, issuer 514 may determine not to initiate a chargeback request for the disputed transaction and/or may ask the cardholder to provide additional information to support the dispute. Similarly, if the analyst computing device represents acquirer 520 investigating a chargeback request already submitted by issuer 514, acquirer 520 may determine to reject the chargeback request as likely not meritorious. In another example, if one or no icons are highlighted on graphic visualization 1400, the analyst may quickly determine that the cardholder dispute likely has merit. Thus, if the analyst computing device represents issuer 514, issuer 514 may determine to initiate a chargeback request for the disputed transaction without requiring the cardholder to provide additional information to support the dispute, whereas if the analyst computing device represents acquirer 520 investigating a chargeback request already submitted by issuer 514, acquirer 520 may determine to honor the chargeback request. The ability of graphic visualization 1400 to pack a wide array of information regarding a transaction into a single-screen, easily comprehensible icon-based chart format is a technical improvement over conventional transaction-dispute analysis systems, which require the user to scroll through individual pieces of data and mentally reconstruct the underlying factors represented by the data.

Figure 15A:
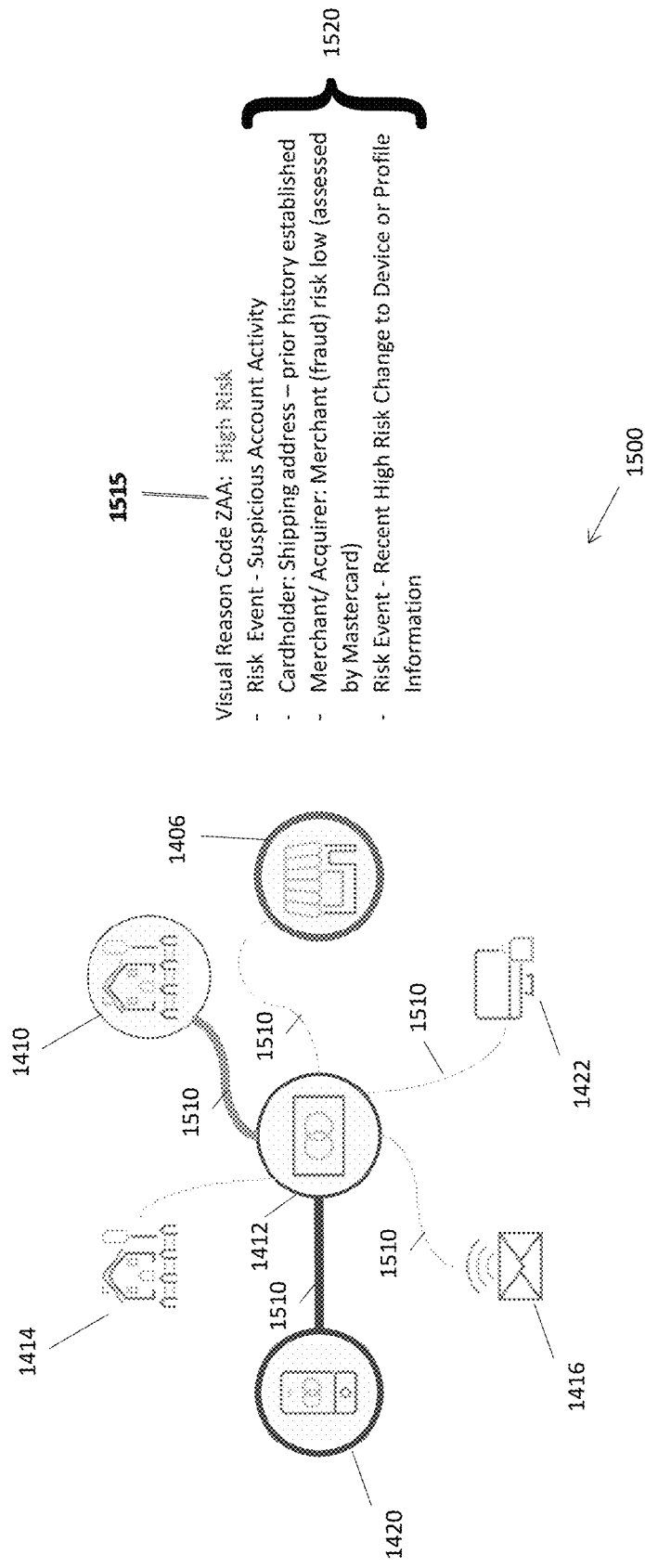
FIG. 15A is another example of a graphic visualization generated by the visualization engine.

FIG. 15A is another example graphic visualization 1500 generated by visualization engine 1310 in communication with authentication platform 1314 and/or payment network 522. With reference to FIGS. 13 and 15A, in some embodiments, the server application implementing visualization engine 1310 additionally or alternatively provides Application Programming Interface (API) functionality available to be invoked via API calls from the client application executable on the analyst computing device of any of issuer 514, merchant environment 1304, acquirer 520, payment network 522, or another party to cause graphic visualization 1500 to be displayed on the client computing device. The API architecture provides a technical advantage by enabling flexibility for any of issuer 514, merchant environment 1304, acquirer 520, payment network 522, or another party to embed graphic visualization 1500 within its own application suite by simply coding in the appropriate API calls. Moreover, visualization engine 1310 can embed code for further API calls into graphic visualization 1500, such that the analyst can "click on" or otherwise select a portion of graphic visualization 1500 to obtain an additional graphic visualization of other relevant data.

The client application executing on the analyst computing device may again display to the analyst a list of reports from cardholders identifying potentially fraudulent transactions (e.g., each cardholder noticed an unrecognized transaction on the cardholder's monthly billing statement). In the example embodiment, when the analyst "clicks" or otherwise selects a transaction on the list, the client application generates an API call to visualization engine 1310. In response to the API call, visualization engine 1310 retrieves the stored RBA result data, previously generated by RBA engine 1312 for the selected transaction. In some embodiments, visualization engine 1310 then uses the retrieved enhanced reason code for the transaction (e.g. using rules or a stored table such as Table 4) to detect which anchors (if any) were activated/verified for the transaction, as well as to identify any additional risk events memorialized in the enhanced reason code. Visualization engine 1310 then causes the client application to display icons for only a subset (e.g., fewer than all) of the categories and anchors evaluated by RBA engine 1312, including those categories and anchors identified by the enhanced reason code as being the most relevant to the authentication risk for the transaction In other words, in contrast to the static "chart" arrangement of icons provided across transactions in graphic visualization 1400, graphic visualization 1500 dynamically updates the displayed icons for each transaction based on the information captured in the enhanced reason code.

For example, in the illustrated embodiment, in response to the API call for the selected transaction, visualization engine 1310 retrieves an enhanced reason code of ZAA that was generated by RBA engine 1312, and uses the rules and/or the stored table to determine that the value ZAA corresponds to a verification that the shipping address anchor was activated (e.g., because the shipping address input during the transaction had a prior history established), that the merchant was assessed overall as a low fraud risk, that a risk event was identified for the device profile anchor of the environment category due to a change in device or device profile information as compared to previous transactions, and that as a result RBA engine 1312 tagged suspicious account (i.e., PAN) activity and scored the transaction as high risk. In response to this determination, visualization engine 1310 causes graphic visualization 1500 to include only a subset of icons, including shipping address icon 1410, merchant icon 1406, PAN icon 1412, and device profile icon 1420 corresponding to the categories and anchors identified by the enhanced reason code as contributing most heavily to the authentication risk analysis.

In some embodiments, visualization engine 1310 dynamically adds additional icons to the subset that may be of interest based on the initially identified risk events. For example, in the illustrated embodiment, visualization engine 1310 further causes graphic visualization 1500 to include billing address icon 1414, email icon 1416, and IP address icon 1422 because the fact that the corresponding anchors were not activated by RBA engine 1312 for the displayed transaction may further support a conclusion of suspicious account activity, despite the absence of a specific detected risk event for these anchors. Alternatively, visualization engine 1310 causes graphic visualization 1500 to include icons solely for the anchors and categories specifically associated with the value of the enhanced reason code.

In some embodiments, graphic visualization 1500 is configured to visually highlight icons corresponding to anchors or categories that are activated/verified for a selected transaction in a first highlight mode, and to visually highlight icons corresponding to anchors or categories that are associated with risk events for a selected transaction in a second highlight mode. For example, in the illustrated embodiment, graphic visualization 1500 includes shipping address icon 1410 and merchant icon 1406 highlighted in the first highlight mode because they correspond respectively to the activated/verified shipping address anchor and the overall low-risk assessment of the merchant, and also includes PAN icon 1412 and device profile icon 1420 highlighted in the second highlight mode because they correspond respectively to the risk event identified for the device profile anchor and the tagged suspicious account (i.e., PAN) activity. Moreover, the additional icons added to the subset, associated with neither a validation nor a risk event, are displayed in a neutral mode that differs from both the first highlight mode and the second highlight mode.

Further in the example embodiment, the subset of icons is displayed as an array around a central icon, and respective connector lines 1510 are displayed between the central icon and each of the icons in the array, giving graphic visualization 1500 the appearance of a connected graph, as is implemented in additional embodiments described below. Alternatively, graphic visualization 1500 does not include connector lines 1510.

In certain embodiments, the first highlight mode includes a first change in one or more of a connector line color, a connector line thickness, a fill color, a border color, a border thickness, and an element size of the icon corresponding to the anchor or category, and the second highlight mode includes a second change in one or more of the connector line color, the connector line thickness, the fill color, the border color, the border thickness, and the element size of the icon corresponding to the anchor or category. For example, in the illustrated embodiment, the first highlight mode includes thickening the border of, and using a green color for, at least one of the icon and the connector as the first highlight mode, and the second highlight mode includes thickening the border of, and using a red color for, at least one of the icon and the connector as the second highlight mode.

In the example embodiment, graphic visualization 1500 further includes a textual display including the value 1515 of the enhanced reason code and summary captions 1520 for any activated/verified anchors and/or risk events associated with the selected transaction. Alternatively, graphic visualization 1500 does not include at least one of value 1515 and summary captions 1520.

Figure 15B:
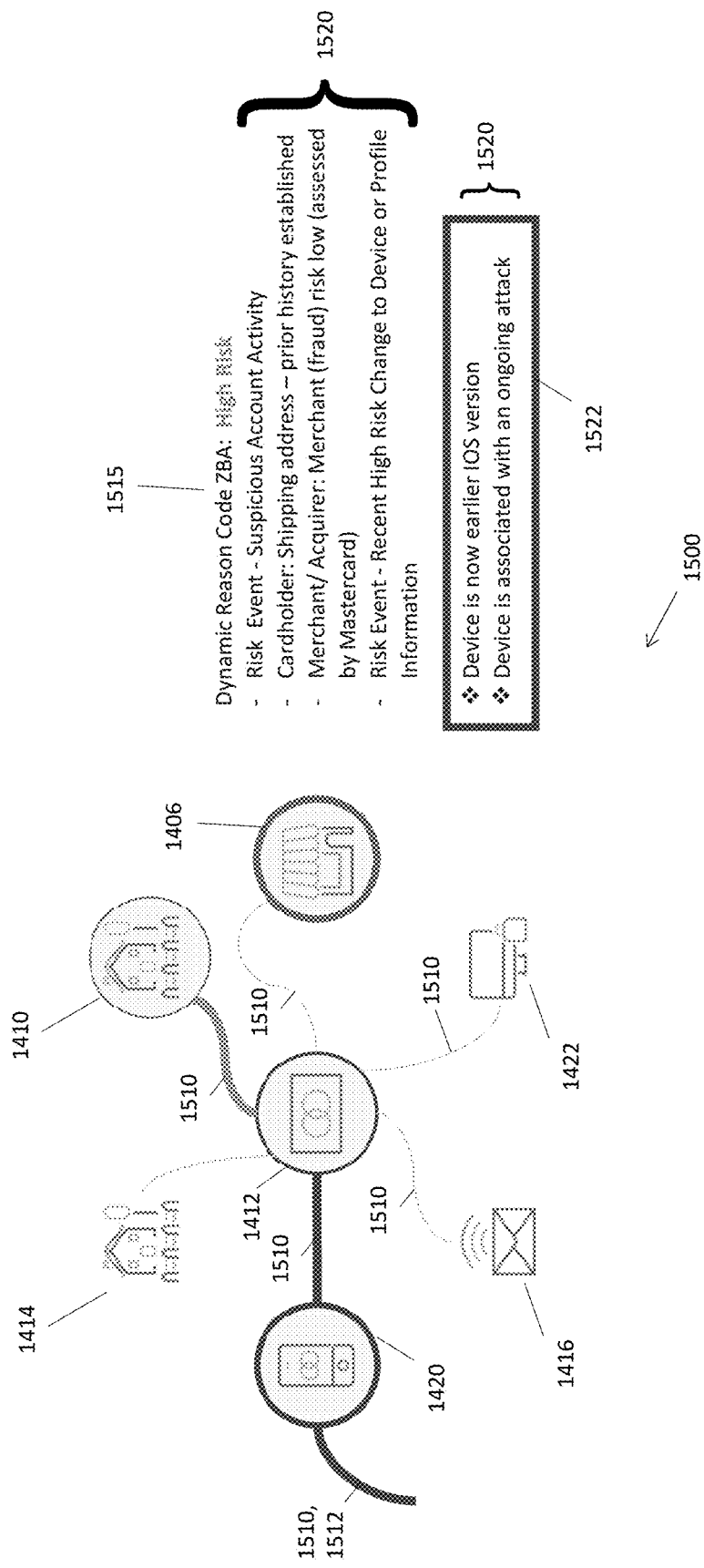
FIG. 15B is another example of the graphic visualization shown in FIG. 15A.

FIG. 15B is another example of graphic visualization 1500 shown in FIG. 15A. In the illustrated example, the stored RBA result data for the transaction selected for display includes the enhanced reason code having a value of "ZBA." The activated/verified anchors and detected risk events associated with ZBA are similar to those for the value ZAA shown in FIG. 15A, except ZBA further reflects that RBA engine 1312 detected not just a change in device or device profile information as compared to previous transactions, but specifically that the device operating system changed to an earlier version as compared to previous transactions, which is more serious risk event (i.e., changed device information as in ZAA may be innocuous if the authentic user installed an update, but it is comparatively rare that an authentic user update would change a device to an earlier version of the operating system as in ZBA). Graphic visualization 1500 is configured to present the summary caption 1520 for this more serious risk event in a separate area 1522 highlighted in the second highlight mode.

In addition, ZBA further reflects that RBA engine 1312 detected that the device used in the transaction was associated with an ongoing coordinated fraud attack at the time of the transaction. Graphic visualization 1500 is likewise configured to present the summary caption 1520 for this serious risk event in the separate area 1522 highlighted in the second highlight mode. Moreover, in some embodiments, graphic visualization 1500 is configured to represent this connection of the device to activity outside the displayed transaction by adding an additional connector 1512 to the displayed connectors 1510. More specifically, connector 1512 extends from device profile icon 1420, corresponding to the risk event, towards an outside edge of the graph to reflect the connection to other transaction activity. Graphic visualization 1500 is further configured to highlight connector 1512 in the second highlight mode. Thus, in the example embodiment, visualization engine 1310 is configured to dynamically update the displayed graph in graphic visualization 1500 to include more, fewer, and/or different graphic elements.

Graphic visualization 1500 caused to be displayed by visualization engine 1310 provides a technical advantage by dynamically updating the displayed graphic elements to focus on the most important anchors and risk events encoded in the enhanced reason code for the particular selected transaction. For example, this enables an analyst using the analyst computing device to quickly focus on the factors that were most relevant to the authentication analysis for each historical transaction. The ability of graphic visualization 1500 to dynamically focus on the most relevant information from among a wide array of information regarding a transaction within a single-screen, easily comprehensible icon-based (and, in some embodiments, connector-based) graphic format is a technical improvement over conventional transaction-dispute analysis systems, which require the user to scroll through individual pieces of data and mentally reconstruct the underlying factors represented by the data. Moreover, those of skill in the art will appreciate that the enhanced reason codes that encode this variety and depth of information require, in the example embodiment, only three bytes of storage for each historical transaction, which provides a further technical advantage in the comparatively small amount of database storage space required to support the provision of graphic visualization 1500 for particular transactions, or sets of transactions, on demand from among an extremely large number of historical transactions processed by authentication platform 1314.

Figure 16:
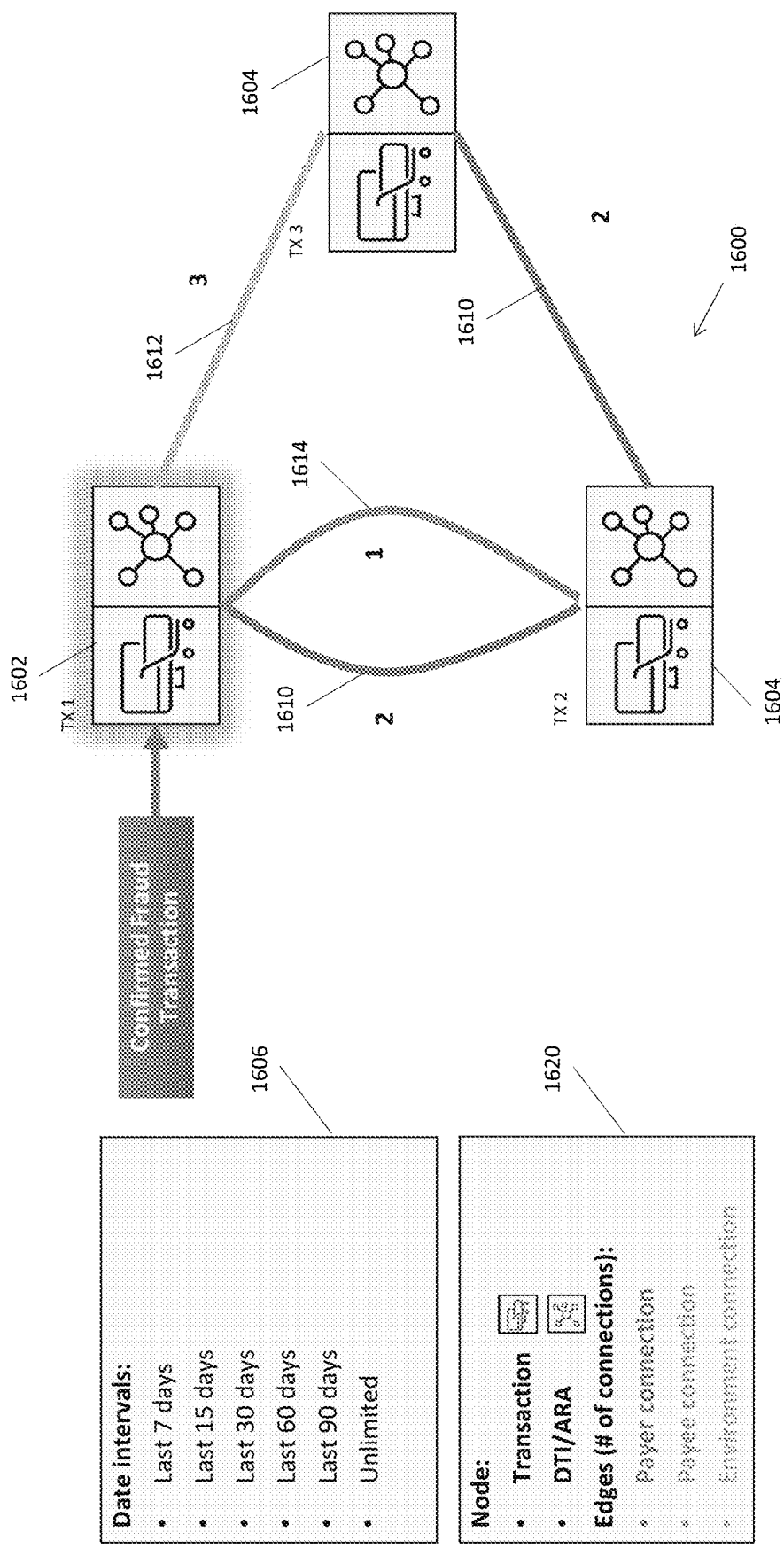

FIG. 16 is another example graphic visualization 1600 generated by visualization engine 1310 in communication with authentication platform 1314 and/or payment network 522. With reference to FIGS. 13 and 16, in some embodiments, as noted above, the server application implementing visualization engine 1310 provides API functionality available to be invoked via API calls from the client application executable on the analyst computing device of any of issuer 514, merchant environment 1304, acquirer 520, payment network 522, or another party to cause graphic visualization 1600 to be displayed on the client computing device. The API architecture provides a technical advantage as discussed above with respect to FIG. 15A.

Graphic visualization 1600 enables an analyst using the client application executing on the analyst computing device to investigate links between stored authentication data for a transaction of interest and stored authentication data for other transactions processed by authentication platform 1314. For example, the analyst may select a particular transaction that was confirmed (e.g., via an investigation after a cardholder complaint) to be fraudulent after the authentication process was completed. In some embodiments, the user interface provided by graphic visualization 1600 provides a technical advantage by facilitating an identification by the analyst of other transactions that may have been fraudulent, and/or a determination by the analyst as to where and when the cardholder's account information was fraudulently obtained, i.e., as to a source of a breach of cardholder account information. Thus, other potentially fraudulent completed transactions may be identified, and/or future fraudulent transactions may be prevented from being authenticated and authorized.

In the example embodiment, the client application sends an API call to invoke graphic visualization 1600 in response to the analyst selecting a historical transaction (e.g., a historical transaction that was subsequently confirmed to be fraudulent) for link investigation. For example, the analyst selects the transaction by selecting a control provided on graphic visualization 1400 or graphic visualization 1500 while the analyst is viewing the transaction therein. In response, visualization engine 1310 causes graphic visualization 1600 to display, on the client computing device, a selected-transaction icon 1602 corresponding to the selected transaction. In addition, in some embodiments, graphic visualization 1600 also includes a list 1606 of selectable time intervals for the link analysis. When the analyst "clicks" or otherwise selects a time interval from the list 1606, the client application generates an API call to visualization engine 1310. In response to the API call, visualization engine 1310 retrieves stored authentication data previously generated by RBA engine 1312 for transactions occurring within the selected time interval. Alternatively, graphic visualization 1600 does not include time interval list 1606 and/or visualization engine 1310 automatically applies a default time interval for retrieving the data. Visualization engine 1310 analyzes the retrieved data to identify "linked" transactions, i.e., transactions in the applicable time interval that have values in one or more anchor fields that match the values in the corresponding anchor fields for the selected transaction.

In some embodiments, graphic visualization 1600 includes a respective linked-transaction icon 1604 for each of the identified linked transactions. Alternatively, e.g., if a number of linked transactions is too large, graphic visualization 1600 includes the respective linked-transaction icon 1604 solely for a subset of the identified linked transactions. For example, visualization engine 1310 selects the subset to include the linked transactions having the most data fields in common with the selected transaction. In the illustrated embodiment, each transaction icon 1602, 1604 is accompanied by an icon labelled DTI/ATA to illustrate that stored RBA result data is available for the transaction.

In the example embodiment, graphic visualization 1600 displays selected-transaction icon 1602 and linked-transaction icons 1604 as nodes in a connected graph. The connections or "edges" between each pair of nodes represent the number of common values in the anchor fields for the corresponding pair of transactions, aggregated with respect to each of the reason code categories. For example, in the illustrated embodiment, the reason code categories are again cardholder (or payor), environment (or device), and merchant (or payee), and thus there are up to three connections displayed between each pair of nodes: payor connections 1610, environment connections 1612, and payee connections 1614. Alternatively, graphic visualization 1600 includes any suitable number and/or types of connections. For example, a single type of connection may be used between each node to represent a total number of common values in anchor fields aggregated across all reason code categories.

In some embodiments, the types of connections 1610, 1612, and 1614 are distinguished visually, for example by using different colors, line types, and/or thicknesses for each type of edge 1610, 1612, and 1614. Graphic visualization 1600 may include a legend or key 1620 to identify the distinguishing visual characteristics. Moreover, a numeric value, representing the number of common values in each category, appears next to each connection. Alternatively, the number of common values in the category corresponding to the connection is indicated in another suitable fashion, such as by a thickness of the connection, or is not indicated. In the example embodiment, if there are zero common values between a pair of transactions in a given reason code category, the connection 1610, 1612, or 1614 for that category is not displayed between the corresponding pair of nodes.

More specifically, in the illustrated embodiment, graphic visualization 1600 includes selected-transaction icon 1602, also labelled as "TX1" (i.e., transaction 1) and two linked-transaction icons 1604, also labelled as "TX2" and "TX3" respectively. Payor connection 1610 between TX1 and TX2 is labelled with a "2," indicating two common values in the anchor fields associated with the cardholder/payor reason code category. Payor connection 1610 between TX2 and TX3 is also labelled with a "2," indicating two common values in the anchor fields associated with the cardholder/payor reason code category. Payor connection 1610 is not displayed between TX1 and TX3, indicating zero common values in the anchor fields associated with the cardholder/ payor reason code category. Similarly, environment connection 1612 between TX1 and TX3 is labelled with a "3," indicating three common values in the anchor fields associated with the environment/device reason code category, and environment connection 1612 is not displayed between TX1 and TX2 or between TX2 and TX3, indicating zero common values in the anchor fields associated with the environment/device reason code category. Finally, payee connection 1614 between TX1 and TX2 is labelled with a "1," indicating one common value in the anchor fields associated with the merchant/payee reason code category, and payee connection 1614 is not displayed between TX1 and TX3 or between TX2 and TX3, indicating zero common values in the anchor fields associated with the merchant/payee reason code category. Based on the visual details provided by the connected graph format of graphic visualization 1600, an analyst might conclude that the high number of commonalities in the environment category between TX1 and TX3 suggests that TX3 was initiated by a fraudster using the same device/environment as the confirmed fraudulent transaction TX1. Accordingly, the analyst may initiate appropriate investigation and/or remedial action with respect to TX3. The ability of graphic visualization 1600 to pack a wide array of information regarding multiple linked transactions into a single-screen, easily comprehensible connected graph format is a technical improvement over conventional transaction-dispute analysis systems, which require the user to scroll through individual pieces of data and mentally re-construct the underlying factors represented by the data.

Figure 17:
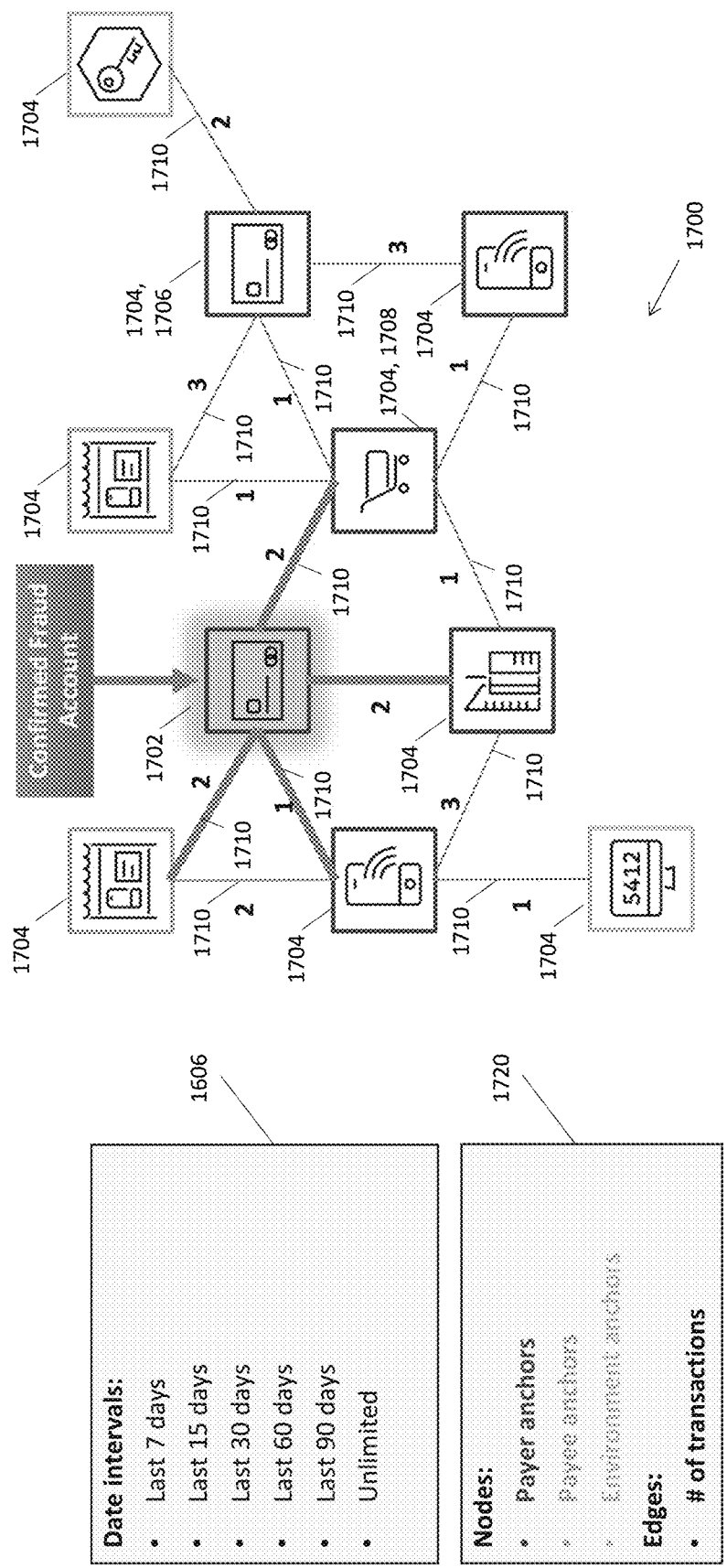

FIG. 17 is another example graphic visualization 1700 generated by visualization engine 1310 in communication with authentication platform 1314 and/or payment network 522. With reference to FIGS. 13 and 17, in some embodiments, as noted above, the server application implementing visualization engine 1310 provides API functionality available to be invoked via API calls from the client application executable on the analyst computing device of any of issuer 514, merchant environment 1304, acquirer 520, payment network 522, or another party to cause graphic visualization 1700 to be displayed on the client computing device. The API architecture provides a technical advantage as discussed above with respect to FIG. 15A.

Graphic visualization 1700 enables an analyst using the client application executing on the analyst computing device to investigate links between stored authentication data for transactions involving a payment account of interest and stored authentication data for other transactions processed by authentication platform 1314. For example, the analyst may select a particular payment account that was confirmed (e.g., via an investigation after a cardholder complaint) to be stolen. In some embodiments, the user interface provided by graphic visualization 1700 provides a technical advantage by facilitating an identification by the analyst of other transactions that may have been fraudulent, and/or a determination by the analyst as to where and when the payment account information was fraudulently obtained, i.e., as to a source of a breach of cardholder account information. Thus, other potentially fraudulent completed transactions may be identified, and/or future fraudulent transactions may be prevented from being authenticated and authorized.

In the example embodiment, the client application sends an API call to invoke graphic visualization 1700 in response to the analyst selecting a payment account (e.g., a payment account that has been confirmed as initiating fraudulent transactions) for link investigation. For example, the analyst selects the payment account by double-clicking or otherwise selecting PAN icon 1412 provided on graphic visualization 1400 or graphic visualization 1500 while the analyst is viewing a transaction therein. In response, visualization engine 1310 causes graphic visualization 1700 to display, on the client computing device, a selected-account icon 1702 corresponding to the selected payment account. In addition, in some embodiments, graphic visualization 1700 again includes list 1606 of selectable time intervals for the link analysis. When the analyst "clicks" or otherwise selects a time interval from the list 1606, the client application generates an API call to visualization engine 1310. In response to the API call, visualization engine 1310 retrieves stored authentication data previously generated by RBA engine 1312 for transactions occurring within the selected time interval. Alternatively, graphic visualization 1700 does not include time interval list 1606 and/or visualization engine 1310 automatically applies a default time interval for retrieving the data. Visualization engine 1310 analyzes the retrieved data to identify "linked" transactions for the selected payment account, including transactions initiated by the selected payment account in the applicable time interval, as well as transactions in the applicable time interval that have values in one or more anchor fields that match the values in the corresponding anchor fields for the transactions initiated by the selected payment account.

In the example embodiment, graphic visualization 1700 displays, as a node in a connected graph, anchor-value icons 1704 corresponding to values that appear in the anchor fields of the linked transactions. In some embodiments, graphic visualization 1700 includes a respective anchor-value icon 1704 for each of the distinct values that appear in the anchor fields of the stored authentication data for the linked transactions. Alternatively, e.g., if a number of distinct values is too large, graphic visualization 1700 includes the respective anchor-value icon 1704 solely for a subset of the identified distinct values. For example, visualization engine 1310 selects the subset to include the distinct values that appear across the greatest number of transactions.

The connections 1710 or "edges" between each pair of nodes represent the number of common transactions for the pair of nodes, i.e., the number of transactions in which the values represented by the pair of nodes both appear in the stored authentication data for the transaction. Moreover, a numeric value, representing the number of common transactions between the two nodes, appears next to each connection 1710. Alternatively, the number of common transactions corresponding to the connection 1710 is indicated in another suitable fashion, such as by a thickness of the connection 1710, or is not indicated. In the example embodiment, if there are zero common transactions between a pair of values, the connection 1710 is not displayed between the corresponding pair of nodes.

In some embodiments, the connected graph embodied by graphic visualization 1700 may facilitate the analyst in tracing second- and third-order connections between selected-account icon 1702 and other anchor-value icons 1704, in order to quickly locate other values that may be compromised along with the payment account corresponding to selected-account icon 1702. For example, in the illustrated embodiment, an anchor-value icon 1706 associated with another payment account is a second-order connection of selected-account icon 1702 via anchor-value icon 1708. More specifically, the number "2" displayed along connection 1710 between selected-account icon 1702 and anchor-value icon 1708 indicates the selected payment account was used in two transactions involving anchor-value icon 1708, and the number "1" displayed along connection 1710 between anchor-value icon 1706 and anchor-value icon 1708 indicates the other payment account was also used in a transaction involving anchor-value icon 1708, which indicates that the other payment account may have been exposed in a common account breach with the selected payment account.

In the example embodiment, connections 1710 emanating from selected-account icon 1702 are visually highlighted relative to other connections 1710. For example, the highlighting of direct connections to selected-account icon 1702 may further facilitate the analyst in tracing second- and third-order connections between selected-account icon 1702 and other anchor-value icons 1704.

In some embodiments, the anchor-value icons 1704 for anchors in different reason code categories are distinguished visually, for example by using different fill colors, border colors, and/or border line types for anchor-value icons 1704. For example, in the illustrated embodiment, the reason code categories are again cardholder (or payor), environment (or device), and merchant (or payee), and anchor-value icons 1704 for anchors in the payor category are displayed with a red border, anchor-value icons 1704 for anchors in the environment category are displayed with a yellow border, and anchor-value icons 1704 for anchors in the payee category are displayed with a green border. Graphic visualization 1700 may include a legend or key 1720 to identify the distinguishing visual characteristics. This additional information conveyed by graphic visualization 1700 may further aid the analyst in tracing sources and progress of fraudulent activity.

The ability of graphic visualization 1700 to pack a wide array of information regarding multiple linked transactions into a single-screen, easily comprehensible connected graph format is a technical improvement over conventional transaction-dispute analysis systems, which require the user to scroll through individual pieces of data and mentally reconstruct the underlying factors represented by the data.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing transaction and authentication data, and detecting and analyzing risk.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for authenticating an online user, the method implemented using a computing system including at least one processor and a memory device, the method comprising steps performed by the at least one processor of:
    receiving, at a risk-based authentication enabled (RBA-enabled) directory server, from a requestor server in communication with a merchant website, an authentication request message, including authentication data collected from a user computing device during a transaction with the merchant website, wherein the RBA-enabled directory server is communicatively coupled between the requestor server and an access control server (ACS) over a computer network;
    extracting, using the RBA-enabled directory server, the authentication data from the authentication request message;
    applying a risk-based authentication (RBA) engine to the authentication data, wherein the RBA engine has access to more transaction data than the ACS;
    generating, by the RBA engine, RBA result data including an enhanced reason code, the enhanced reason code including no more than three bytes of data, wherein the enhanced reason code includes multiple characters and is generated by:
        establishing, using the RBA engine, a plurality of different reason code categories, each reason code category including a plurality of anchors, wherein the plurality of different reason code categories includes at least a cardholder category, a merchant category, and an environment category;
        activating, using the RBA engine, based on a comparison of the extracted authentication data to at least one long term variable stored in the database, a plurality of activated anchors, wherein at least one of the plurality of activated anchors is in the cardholder category or the merchant category; and
        generating, using the RBA engine, the enhanced reason code based on connections between the plurality of activated anchors by:
            when at least one anchor in the cardholder category is activated, generating a positive enhanced reason code indicating a low risk of fraud;
            when at least one anchor in the cardholder category is activated and at least one anchor in the merchant category is activated, generating a stronger positive enhanced reason code indicating a lower risk of fraud; and
            when at least one anchor in the cardholder category is activated, at least one anchor in the merchant category is activated, and at least one anchor in the environment category is activated, generating an even stronger positive enhanced reason code indicating an even lower risk of fraud; and
    determining, using the RBA-enabled directory server, based on the RBA result data, that the transaction associated with the authentication request message is a low risk transaction; and
    based on the determination that the transaction is a low risk transaction, using the RBA-enabled directory server, bypassing the ACS by fully authenticating the transaction and transmitting an authentication response message to the requestor server without transmitting the authentication request message to the ACS, thereby reducing overall message volume on the computer network, increasing availability of network resources on the computer network, and improving transmission speed over the computer network.

2. The computer-implemented method according to claim 1, wherein applying the RBA engine to the authentication data comprises:
    identifying, based on the extracted authentication data, at least one of i) one or more verifications of the plurality of anchors, and ii) one or more risk events associated with one or more of the anchors; and
    generating the enhanced reason code based on the identified at least one of the one or more verifications and the one or more risk events.

3. The computer-implemented method according to claim 2, further comprising:
    storing the RBA result data in a database accessible by a visualization engine;
    receiving, by the visualization engine from a client application executing on an analyst computing device, a request identifying a transaction associated with the extracted authentication data;
    retrieving the RBA result data from the database; and causing, in response to the request, the client application to display a graphic visualization including icons that represent the reason code categories and the plurality of anchors, wherein the icons corresponding to the identified at least one of the one or more verifications and the one or more risk events are highlighted.

4. The computer-implemented method according to claim 2, further comprising:
storing the RBA result data and the authentication data in a database accessible by a visualization engine;
receiving, by the visualization engine from a client application executing on an analyst computing device, an API call identifying a selected transaction associated with the extracted authentication data;
retrieving, in response to the API call, the RBA result data and the authentication data from the database;
identifying, in the database, linked transactions, wherein the linked transactions comprise historical transactions in an applicable time interval that have values in fields corresponding to one or more of the plurality of anchors that match values in the corresponding fields for the selected transaction; and
causing, in response to the API call, the client application to display a graphic visualization comprising a connected graph including node icons that represent the identified transaction and the linked transactions, and connections between the node icons corresponding to a number of common values in the fields for the transactions represented by the node icons.

5. The computer-implemented method according to claim 2, further comprising:
storing the RBA result data and the authentication data in a database accessible by a visualization engine;
receiving, by the visualization engine from a client application executing on an analyst computing device, an API call identifying a selected account associated with the extracted authentication data;
retrieving, in response to the API call, the RBA result data and the authentication data from the database;
identifying, in the database, linked transactions, wherein the linked transactions comprise a first set of historical transactions in an applicable time interval that were initiated by the selected account, plus a second set of historical transactions in the applicable time interval that have values in fields corresponding to one or more of the plurality of anchors that match values in the corresponding fields for the first set of historical transactions; and
causing, in response to the API call, the client application to display a graphic visualization comprising a connected graph including node icons that represent the values in the fields corresponding to one or more of the plurality of anchors, and connections between the node icons corresponding to a number of the linked transactions in which the values represented by the nodes appear in the corresponding stored authentication data.

6. A computing system for authenticating an online user, said computing system comprising at least one processor and a memory device, said at least one processor programmed to perform steps including:
receiving, at a risk-based authentication enable (RBA-enabled) directory server, from a requestor server in communication with a merchant website, an authentication request message including authentication data collected from a user computing device during a transaction with the merchant website, wherein the RBA-enabled directory server is communicatively coupled between the requestor server and an access control server (ACS) over a computer network;
extracting, using the RBA-enabled directory server, the authentication data from the authentication request message;
applying a risk-based authentication (RBA) engine to the authentication data, wherein the RBA engine has access to more transaction data than the ACS;
generating, by the RBA engine, RBA result data including an enhanced reason code, the enhanced reason code including no more than three bytes of data, wherein the enhanced reason code includes multiple characters and is generated by:
establishing, using the RBA engine, a plurality of different reason code categories, each reason code category including a plurality of anchors, wherein the plurality of different reason code categories includes at least a cardholder category, a merchant category, and an environment category;
activating, using the RBA engine, based on a comparison of the extracted authentication data to at least one long term variable stored in the database, a plurality of activated anchors, wherein at least one of the plurality of activated anchors is in the cardholder category or the merchant category; and
generating, using the RBA engine, the enhanced reason code based on connections between the plurality of activated anchors by:
when at least one anchor in the cardholder category is activated, generating a positive enhanced reason code indicating a low risk of fraud;
when at least one anchor in the cardholder category is activated and at least one anchor in the merchant category is activated, generating a stronger positive enhanced reason code indicating a lower risk of fraud; and
when at least one anchor in the cardholder category is activated, at least one anchor in the merchant category is activated, and at least one anchor in the environment category is activated, generating an even stronger positive enhanced reason code indicating an even lower risk of fraud; and
determining, using the RBA-enabled directory server, based on the RBA result data, that the transaction associated with the authentication request message is a low risk transaction; and
based on the determination that the transaction is a low risk transaction, using the RBA-enabled directory server, bypassing the ACS by fully authenticating the transaction and transmitting an authentication response message to the requestor server without transmitting the authentication request message to the ACS, thereby reducing overall message volume on the computer network, increasing availability of network resources on the computer network, and improving transmission speed over the computer network.

7. The computing system according to claim 6, wherein said at least one processor is further programmed to apply the RBA engine to the authentication data by:
identifying, based on the extracted authentication data, at least one of i) one or more verifications of the plurality of anchors, and ii) one or more risk events associated with one or more of the anchors; and
generating the enhanced reason code based on the identified at least one of the one or more verifications and the one or more risk events.

8. The computing system according to claim 7, wherein said at least one processor is further programmed to perform additional steps including:
  storing the RBA result data in a database accessible by a visualization engine;
  receiving, by the visualization engine from a client application executing on an analyst computing device, a request identifying a transaction associated with the extracted authentication data;
  retrieving the RBA result data from the database; and
  causing, in response to the request, the client application to display a graphic visualization including icons that represent the reason code categories and the plurality of anchors, wherein the icons corresponding to the identified at least one of the one or more verifications and the one or more risk events are highlighted.

9. The computing system according to claim 7, wherein said at least one processor is further programmed to perform additional steps including:
  storing the RBA result data and the authentication data in a database accessible by a visualization engine;
  receiving, by the visualization engine from a client application executing on an analyst computing device, an API call identifying a selected transaction associated with the extracted authentication data;
  retrieving, in response to the API call, the RBA result data and the authentication data from the database;
  identifying, in the database, linked transactions, wherein the linked transactions comprise historical transactions in an applicable time interval that have values in fields corresponding to one or more of the plurality of anchors that match values in the corresponding fields for the selected transaction; and
  causing, in response to the API call, the client application to display a graphic visualization comprising a connected graph including node icons that represent the identified transaction and the linked transactions, and connections between the node icons corresponding to a number of common values in the fields for the transactions represented by the node icons.

10. The computing system according to claim 7, wherein said at least one processor is further programmed to perform additional steps including:
  storing the RBA result data and the authentication data in a database accessible by a visualization engine;
  receiving, by the visualization engine from a client application executing on an analyst computing device, an API call identifying a selected account associated with the extracted authentication data;
  retrieving, in response to the API call, the RBA result data and the authentication data from the database;
  identifying, in the database, linked transactions, wherein the linked transactions comprise a first set of historical transactions in an applicable time interval that were initiated by the selected account, plus a second set of historical transactions in the applicable time interval that have values in fields corresponding to one or more of the plurality of anchors that match values in the corresponding fields for the first set of historical transactions; and
  causing, in response to the API call, the client application to display a graphic visualization comprising a connected graph including node icons that represent the values in the fields corresponding to one or more of the plurality of anchors, and connections between the node icons corresponding to a number of the linked transactions in which the values represented by the nodes appear in the corresponding stored authentication data.

11. At least one non-transitory computer-readable medium comprising instructions stored thereon for authenticating an online user, the instructions executable by at least one processor to cause the at least one processor programmed to perform steps including:
  receiving, at a risk-based authentication enabled (RBA-enabled) director server, from a requestor server in communication with a merchant website, an authentication request message including authentication data collected from a user computing device during a transaction with the merchant website, wherein the RBA-enabled directory server is communicatively coupled between the requestor server and an access control server (ACS) over a computer network;
  extracting, using the RBA-enabled directory server, the authentication data from the authentication request message;
  applying a risk-based authentication (RBA) engine to the authentication data, wherein the RBA engine has access to more transaction data than the ACS;
  generating, by the RBA engine, RBA result data including an enhanced reason code, the enhanced reason code including no more than three bytes of data, wherein the enhanced reason code includes multiple characters and is generated by:
    establishing, using the RBA engine, a plurality of different reason code categories, each reason code category including a plurality of anchors, wherein the plurality of different reason code categories includes at least a cardholder category, a merchant category, and an environment category;
    activating, using the RBA engine, based on a comparison of the extracted authentication data to at least one long term variable stored in the database, a plurality of activated anchors, wherein at least one of the plurality of activated anchors is in the cardholder category or the merchant category; and
    generating, using the RBA engine, the enhanced reason code based on connections between the plurality of activated anchors by:
      when at least one anchor in the cardholder category is activated, generating a positive enhanced reason code indicating a low risk of fraud;
      when at least one anchor in the cardholder category is activated and at least one anchor in the merchant category is activated, generating a stronger positive enhanced reason code indicating a lower risk of fraud; and
      when at least one anchor in the cardholder category is activated, at least one anchor in the merchant category is activated, and at least one anchor in the environment category is activated, generating an even stronger positive enhanced reason code indicating an even lower risk of fraud; and
  determining, using the RBA-enabled directory server, based on the RBA result data, that the transaction associated with the authentication request message is a low risk transaction; and
  based on the determination that the transaction is a low risk transaction, using the RBA-enabled directory server, bypassing the ACS by fully authenticating the transaction and transmitting an authentication response message to the requestor server without transmitting the authentication request message to the ACS, thereby reducing overall message volume on the computer network, increasing availability of network resources on the computer network, and improving transmission speed over the computer network.

12. The at least one non-transitory computer-readable medium according to claim 11, wherein said instructions further cause the at least one processor to apply the RBA engine to the authentication data by:
    identifying, based on the extracted authentication data, at least one of i) one or more verifications of the plurality of anchors, and ii) one or more risk events associated with one or more of the anchors; and
    generating the enhanced reason code based on the identified at least one of the one or more verifications and the one or more risk events.

13. The at least one non-transitory computer-readable medium according to claim 12, wherein said instructions further cause the at least one processor to perform additional steps including:
    storing the RBA result data in a database accessible by a visualization engine;
    receiving, by the visualization engine from a client application executing on an analyst computing device, a request identifying a transaction associated with the extracted authentication data;
    retrieving the RBA result data from the database; and
    causing, in response to the request, the client application to display a graphic visualization including icons that represent the reason code categories and the plurality of anchors, wherein the icons corresponding to the identified at least one of the one or more verifications and the one or more risk events are highlighted.

14. The at least one non-transitory computer-readable medium according to claim 12, wherein said instructions further cause the at least one processor to perform additional steps including:
    storing the RBA result data and the authentication data in a database accessible by a visualization engine;
    receiving, by the visualization engine from a client application executing on an analyst computing device, an API call identifying a selected transaction associated with the extracted authentication data;
    retrieving, in response to the API call, the RBA result data and the authentication data from the database;
    identifying, in the database, linked transactions, wherein the linked transactions comprise historical transactions in an applicable time interval that have values in fields corresponding to one or more of the plurality of anchors that match values in the corresponding fields for the selected transaction; and
    causing, in response to the API call, the client application to display a graphic visualization comprising a connected graph including node icons that represent the identified transaction and the linked transactions, and connections between the node icons corresponding to a number of common values in the fields for the transactions represented by the node icons.

* * * * *